US007416186B2

(12) United States Patent
Walker et al.

(10) Patent No.: US 7,416,186 B2
(45) Date of Patent: Aug. 26, 2008

(54) METHODS AND SYSTEM FOR FACILITATING A SECONDARY CARD GAME

(75) Inventors: Jay S. Walker, Ridgefield, CT (US); James A. Jorasch, New York, NY (US); Stephen C. Tulley, Fairfield, CT (US); Robert C. Tedesco, Fairfield, CT (US); Magdalena M. Fincham, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 335 days.

(21) Appl. No.: 11/073,896

(22) Filed: Mar. 7, 2005

(65) Prior Publication Data

US 2005/0173863 A1 Aug. 11, 2005

Related U.S. Application Data

(63) Continuation-in-part of application No. 11/039,613, filed on Jan. 20, 2005, now abandoned.

(60) Provisional application No. 60/537,615, filed on Jan. 20, 2004.

(51) Int. Cl.
*A63F 1/00* (2006.01)
*A63F 13/00* (2006.01)
*A63F 9/24* (2006.01)

(52) U.S. Cl. ........................................ 273/292; 463/13

(58) Field of Classification Search ................. 273/292; 463/13
See application file for complete search history.

(56) References Cited

U.S. PATENT DOCUMENTS 4,743,022 A 5/1988 Wood .......................... 273/85
5,322,295 A 6/1994 Cabot et al. ................. 273/292
5,377,973 A 1/1995 Jones et al. ............. 273/85 CP
5,393,057 A * 2/1995 Marnell, II ................... 463/13
5,401,023 A 3/1995 Wood ..................... 273/85 CP (Continued)

OTHER PUBLICATIONS

Poole, David, "Letter from Charlotte: Vegas perfect for racing", Las Vegas Review-Journal, Jun. 22, 1997, Section C, p. 2C, 2 pages.*

(Continued)

*Primary Examiner*—Gene Kim
*Assistant Examiner*—Alyssa M Hylinski
(74) *Attorney, Agent, or Firm*—Walker Digital Management, LLC

(57) ABSTRACT

According to an embodiment, a player of a game (e.g., video poker) wagers on a game in which a first set of cards represents a bonus hand having a high value (e.g., royal, straight). The player is also dealt a second set of cards. In one embodiment, an indication of a first set of cards may be output by a first display device and an indication of a second set of cards may be output by a second display device.

The player selects one or more cards from the second set of cards that are to be discarded, and the player is dealt a replacement card for each such discarded card.

Each card in the first set which matches a replacement card is removed. The value of each hand of the modified first set of cards is then determined. A credit balance is adjusted based on the determined values of the modified first set of cards.

32 Claims, 26 Drawing Sheets

U.S. PATENT DOCUMENTS

| | | | | | |
|---|---|---|---|---|---|
| 5,411,257 | A | | 5/1995 | Fulton | 273/85 CP |
| 5,531,441 | A | | 7/1996 | Dabrowski et al. | 463/12 |
| 5,542,669 | A | | 8/1996 | Charron et al. | 463/13 |
| 5,732,950 | A | | 3/1998 | Moody | 273/292 |
| 5,769,716 | A | | 6/1998 | Saffari et al. | 463/20 |
| 5,772,506 | A | | 6/1998 | Marks et al. | 463/13 |
| 5,816,914 | A | | 10/1998 | Wichinsky | 463/13 |
| 5,823,873 | A | | 10/1998 | Moody | 463/13 |
| 5,868,619 | A | | 2/1999 | Wood et al. | 463/13 |
| 6,004,207 | A | * | 12/1999 | Wilson et al. | 463/20 |
| 6,045,129 | A | | 4/2000 | Cooper et al. | 273/292 |
| 6,048,267 | A | | 4/2000 | Wichinsky | 463/13 |
| 6,050,568 | A | | 4/2000 | Hachquet | 273/292 |
| 6,135,883 | A | | 10/2000 | Hachquet | 463/13 |
| 6,179,711 | B1 | | 1/2001 | Yoseloff | 463/25 |
| 6,257,979 | B1 | | 7/2001 | Walker et al. | 463/13 |
| 6,270,405 | B1 | * | 8/2001 | Ferguson | 463/13 |
| 6,334,613 | B1 | | 1/2002 | Yoseloff | 273/292 |
| 6,474,645 | B2 | | 11/2002 | Tarantino | 273/274 |
| 6,547,242 | B1 | * | 4/2003 | Sugiyama et al. | 273/142 R |
| 6,568,680 | B1 | | 5/2003 | Moody et al. | 273/292 |
| 6,605,001 | B1 | * | 8/2003 | Tarantino | 463/22 |
| 6,669,198 | B2 | * | 12/2003 | Wichinsky | 273/292 |
| 6,749,501 | B2 | * | 6/2004 | Crawford | 463/13 |
| 7,153,205 | B2 | * | 12/2006 | Baerlocher | 463/16 |
| 2001/0023199 | A1 | * | 9/2001 | Walker et al. | 463/13 |
| 2002/0034974 | A1 | * | 3/2002 | Wood et al. | 463/13 |
| 2002/0160829 | A1 | * | 10/2002 | Webb et al. | 463/16 |
| 2003/0042676 | A1 | * | 3/2003 | Crawford | 273/292 |
| 2005/0056999 | A1 | * | 3/2005 | Roemer et al. | 273/273 |
| 2006/0252517 | A1 | * | 11/2006 | Walker et al. | 463/25 |

OTHER PUBLICATIONS

Grochowski, John, “Royal is worth taking a risk”, Chicago Sun-Times, Apr. 5, 1998, Seciton:SHO, Casinos, p. 18,NC, 3 pages.*

Cook, Melissa; “The Best New Slots”, Casino Player, Apr. 1998 at p. 4, 6 pages.*

“The Game King”, Casino Journal (http://www.casinocenter.com/journal/cot97/html/igt.html), download date Jun. 4, 1998, 5 pages.*

“A new Generation”, Casino Journal (http://www.casinocenter.com/journal/oct97/html/ac_coin.html) download date Jun. 4, 1998, 5 pages.*

“The Interactive Experience”, Casino Journal (http://www.casinocenter.com/journal/oct97/html/ac_coin.html), download date Jun. 4, 1998, 3 pages.*

Brochure: “Double Play Black Jack”, PDS Gaming, undated.

Website: “Blackjacks Online Casino—Paigow Poker”, (http //www blackjacksonlinecasino com/paigow html), download date: Sep. 7, 2001.

Website: “Hustler How-To For Lowball”, (http //www hustlergaming com/lowNoFlash html), download date: Oct. 4, 2001.

Website: “Wireplay Poker”, (http www wireplay com au/scripts/Games asp?GameID2=56&I=2), download date: Oct. 4, 2001.

Website: “Pick’em Video Poker”, Video Poker 1, (http //www videopoker1 com), copyright 2002.

Smolen, Don, “Cpoker”, (http //conjelco com/software html), download date: Feb. 14, 2003.

Website: “Rules of the Game—3.4 Splitting Pairs”, (http //www blackjackinfo com/bjrules htm), download date: Feb. 14, 2003.

Website: “Rules of the Game—3.1 Surrender”, (http //www blackjackinfo com/bjrules htm), download date: Feb. 14, 2003.

* cited by examiner

| OUTCOME | PAYOUT | | | | | DISCARD HAND BONUS |
|---|---|---|---|---|---|---|
| | 1 COIN WAGER | 2 COIN WAGER | 3 COIN WAGER | 4 COIN WAGER | 5 COIN WAGER | |
| ROYAL FLUSH | 250 | 500 | 750 | 1000 | 4000 | 200 |
| STRAIGHT FLUSH | 50 | 100 | 150 | 200 | 250 | 50 |
| FOUR OF A KIND | 25 | 50 | 75 | 100 | 125 | 25 |
| FULL HOUSE | 9 | 14 | 27 | 36 | 45 | 20 |
| FLUSH | 6 | 12 | 18 | 24 | 30 | 15 |
| STRAIGHT | 4 | 8 | 12 | 16 | 20 | 10 |
| THREE OF A KIND | 3 | 6 | 9 | 12 | 15 | 5 |
| TWO PAIR | 2 | 4 | 6 | 8 | 10 | 0 |

FIG. 3

METHODS AND SYSTEM FOR FACILITATING A SECONDARY CARD GAME

The present application is a continuation-in-part of commonly-owned, U.S. application Ser. No. 11/039,613, filed Jan. 20, 2005 now abandoned in the name of Walker et al., which application claims the benefit of priority of U.S. Provisional Patent Application No. 60/537,615, filed Jan. 20, 2004. The entirety of each of these applications is incorporated by reference herein for all purposes.

The present application is also related to commonly-owned, co-pending U.S. application Ser. No. 10/619,066, filed Jul. 14, 2005 in the name of Walker et al.; which is a continuation-in-part of U.S. application Ser. No. 09/858,987, filed May 16, 2001 in the name of Walker et al. and issued on Jul. 15, 2003 as U.S. Pat. No. 6,592,456; which in turn is a continuation of U.S. application Ser. No. 09/165,184, filed Oct. 2, 1998 in the name of Walker et al. and issued on Jul. 10, 2001 as U.S. Pat. No. 6,257,979. The entirety of each of these applications is incorporated by reference herein for all purposes.

BRIEF DESCRIPTION OF THE DRAWINGS

FIG. 3 is a sample of a payout schedule associated with the video poker gaming device of FIG. 2 and arranged in accordance with an embodiment described herein;

DETAILED DESCRIPTION

Figure 1:
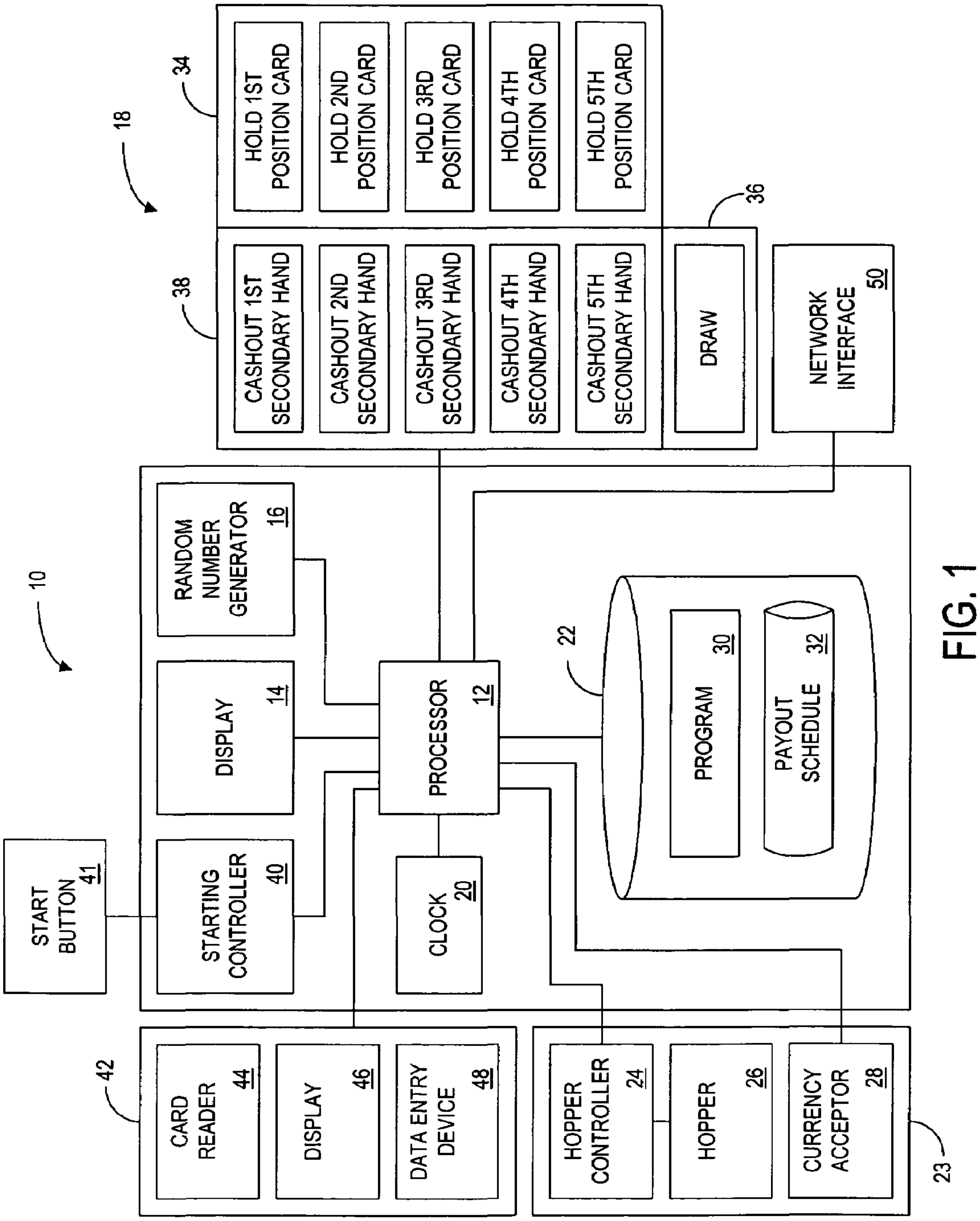
FIG. 1 is a schematic representation of a video poker gaming device configured in accordance with an embodiment described herein.

Described herein are various methods and systems for facilitating play of primary card games and secondary card games. As a preliminary matter, various terms and concepts used herein are described.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. Those skilled in the art will recognize that the disclosed invention(s) may be practiced with various modifications and alterations. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Neither the Title (set forth at the beginning of the first page of this patent application) nor the Abstract (set forth at the end of this patent application) is to be taken as limiting in any way as the scope of the disclosed invention(s).

The terms "an embodiment", "embodiment", "embodiments", "the embodiment", "the embodiments", "one or more embodiments", "some embodiments", "one embodiment" and the like mean "one or more (but not all) embodiments of the disclosed invention(s)", unless expressly specified otherwise.

The terms "including", "comprising" and variations thereof mean "including but not limited to", unless expressly specified otherwise.

The enumerated listing of items (which may or may not be numbered) does not imply that any or all of the items are mutually exclusive, unless expressly specified otherwise. Likewise, the enumerated listing of items (which may or may not be numbered) does not imply that the items are comprehensive of any category, unless expressly specified otherwise.

The terms "a", "an" and "the" mean "one or more", unless expressly specified otherwise.

The terms "plurality" mean "two or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention(s).

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Each process/method includes one or more steps, and therefore a reference to a "step" of a method has an inherent antecedent basis.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media in a number of well-known manners. In some embodiments, hard-wired circuitry or custom hardware may be used in place of, or in combination with, software instructions for implementation of the processes of the present invention. Thus, embodiments are not limited to any specific combination of hardware and software When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed.

The terms "cashless gaming ticket", "ticket", and "cashless gaming receipt" are used interchangeable herein and may refer, unless specified otherwise, to a substrate (e.g., a small piece of paper) that may be output and/or received by a gaming device (e.g., via a "ticket-in/ticket-out" slot of a gaming device or its peripheral). The substrate may comprise (i) machine-readable indicia (e.g., a bar code) or other machine-readable substance (e.g., magnetically encoded material). The substrate may also comprise (ii) an identifier (e.g., a unique series of numeric digits or alphanumeric characters). In one or more embodiments, machine-readable indicia may indicate an identifier (e.g., a printed barcode encodes a ticket identifier). A cashless gaming ticket typically entitles its bearer to an amount of credits or currency equal to an indicated face value. For example, a gaming device player may have a balance of thirty-five credits. Upon cashing out, the player may be provided with a ticket indicating a face value of thirty-five credits. The ticket may then be used to (i) establish a balance of thirty-five credits at a gaming device (e.g., the player inserts a ticket output from a first machine into a second machine); (ii) receive an equivalent amount of currency (e.g., if each credit is worth one dollar, a cashier provides the player with $35 in cash in exchange for the ticket); and/or (iii) provide another benefit, as disclosed herein.

The terms "cash out" and "cashout" are used interchangeable herein and may refer to a process by which a player of a gaming device is provided with payment. Such payment is typically provided by the gaming device, e.g., in the form of coins, tokens, transfer of funds to an account associated with a player or a cashless gaming ticket.

The terms "controller", "central controller", "slot server", "computer server", "computer server device" and "server device" are used interchangeable herein and may refer, unless specified otherwise, to one or more electronic devices (e.g., a computer, two distinct servers) that are operable to communicate with one or more gaming devices. A controller may manage, direct or otherwise affect the actions of gaming devices, such as by providing a random number to a gaming device, by reading data about a player playing a gaming device. A controller may also contain or otherwise be configured to read data from and/or write data to one or more (local or remote) databases regarding, among other things, (i) data associated with a particular cashless gaming ticket or coupon, (ii) player data, (iii) payout data, (iv) probability data, etc.

The terms "credit balance", as used herein unless specified otherwise, may refer to an indication of an amount of currency (or other value) that is due to a player and/or that is available for wagering (e.g., a wager may be drawn from a credit balance). In some embodiments, a balance may be associated with a gaming device being operated by a player. Such an indication may be output via a gaming device display, such as an LED "credit meter." In some embodiments, a player wishing to cash out is provided with payment (e.g., a cashless gaming ticket) equal to his credit balance, or otherwise based on his credit balance (e.g., the integer amount of a credit balance, such as $5.00 for a balance of $5.50).

The term "game", as used herein unless specified otherwise, may refer to a wagering activity whereby a player posts consideration, usually monetary in form, in exchange for a chance at winning a payout (which is typically a monetary payout). The definition is intended to include basic games and bonus games. The definition is further intended to include both primary games and secondary games.

The terms "game device", "gaming device", "game machine", "gaming machine" are used interchangeable herein and may refer, unless specified otherwise, to any electrical, electromechanical and/or mechanical device that (in a manner well known in the art) accepts wagers, determines an outcome and pays winnings (if any) based on the outcome. The outcome may be randomly generated (as with a slot machine); may be generated through a combination of randomness and player skill (as with video poker); or may be generated entirely through player skill. Gaming devices may include slot machines (both video and mechanical reel slot machines), video poker machines, video blackjack machines, video roulette machines, video keno machines, video bingo machines, pachinko machines, video lottery terminals, table-top devices for table card game (e.g., a card counting device for a game of blackjack), pachinko gaming devices, handheld gaming devices, and the like.

Regarding player tracking cards and player tracking systems, most casinos issue plastic cards (typically resembling frequent shopper cards) to players as a way of identifying the player at a slot machine or table game. As is well known in the art, such cards typically have encoded thereon (e.g., in machine-readable and/or human readable form) a player identifier (e.g., a six digit number) which uniquely identifies the player (e.g., because the number is associated with a record in a player database that includes corresponding player information). At a slot machine or other device, the player inserts the card into a corresponding reader device and the player identifier is read (e.g., magnetically or optically ) from the card. From the player identifier which the reader device reads, the corresponding player information may in turn be determined (e.g., read from the database, typically via a network connection between the reader device and a device hosting the database).

Applicants have recognized that conventional card games (e.g, poker, whether a table or video version) and other gambling games have several disadvantages. For example, little enticement is provided to a player to deviate from traditional strategies. Additionally, there is little enticement to encourage players to extend their play sessions.

Accordingly, there is a need in the art of card games (e.g., video poker system) as well as other gambling games to further engage a player during game play. There is also a need in the art for a system and method that encourages a player to play longer play sessions while at the same time maintaining acceptable payback percentages for casinos. Further, there is a need in the art for systems and methods that enable players to develop a variety of gaming strategies so as to generate more interesting and exciting playing action. These and other unique features of the systems and methods described herein will become more readily apparent from the following description.

In accordance with one embodiment, novel and unique systems and methods for operating a video poker machine are described. The present systems and methods are adapted and configured to enhance and prolong a gaming session, thereby improving the gambling experience as well as the profitability of the video poker machine.

In accordance with one embodiment, the system includes a memory storage device adapted and configured to store a primary payout schedule associated with a primary poker hand and a secondary payout schedule associated with a secondary poker hand. The system further includes a processor in communication with the memory storage device which is adapted and configured to populate a primary poker hand with a plurality of playing cards, identify discard cards to be discarded from the populated primary poker hand, populate a secondary poker hand with the discard cards, and populate the primary poker hand to replace the discard cards discarded therefrom; thereby forming a final primary poker hand. In an embodiment, the processor is adapted and configured to determine a payout based upon the playing cards in the final primary poker hand and the secondary poker hand utilizing the primary payout schedule and the secondary payout schedule, respectively.

In accordance with one embodiment, an apparatus comprises (i) a processor, (ii) a first display device in communication with the processor, (ii) a second display device in communication with the processor, (iii) an input device in communication with the processor, and (iv) a memory in communication with the processor. The memory may store a program which, when executed by the processor, directs the processor to perform a method. The method may provide for (i) receiving a wager, (ii) generating a first set of hands of cards, in which each hand of the first set represents a bonus hand having a high value, (iii) displaying a representation of the first set of hands on the first display device, (iv) dealing a second set of hands of cards from a deck of cards, (v) displaying a representation of the second set of hands on the second display device, (vi) receiving, via the input device, at least one player selection, each such player selection indicating a card from the second set of hands that is to be discarded, (vii) dealing a replacement card for each such card from the second set of hands that is to be discarded, (viii) removing, from the first set of hands, each card in the first set which matches a replacement card, thereby yielding a modified first set of hands, (ix) determining a value of each hand of the modified first set of hands, and (x) adjusting a credit balance based on the determined values of the modified first set of hands.

In one embodiment, the first display device of the above-described apparatus may be positioned above the second display device.

In one embodiment, a computer readable medium may store a program which, when executed by a processor, directs the processor to perform the method comprising the steps (i) through (x) described above.

A method of operating a video poker machine in accordance with an embodiment includes the steps of populating a primary poker hand with a plurality of playing cards each having a respective card position, identifying discard cards to be discarded from the populated primary poker hand, populating a secondary poker hand associated with each card position with the playing cards discarded from such card position, populating the primary poker hand to replace the discard cards discarded therefrom so as to form a final primary poker hand, and determining a payout based at least upon the playing cards in the final primary poker hand. In addition, the method includes the step of determining a payout based upon the playing cards in at least one of the secondary poker hands.

In one embodiment, the step of populating a secondary poker hand associated with each card position of the primary poker hand may comprise randomly populating a card position or only populating an unpopulated card position in such secondary poker hand. In the former case, the method would include the step of replacing a playing card in the secondary poker hand with a discarded playing card from the primary poker hand if the card position is already filled with a playing card. In either instance, the method may further include the step of determining a payout based upon the playing cards in at least one fully populated secondary poker hand. Preferably, the method may further include the step of receiving a request to analyze the playing cards in at least one of the secondary poker hands to determine a payout based thereupon.

It should be noted that a description of a set of cards, hand of cards, and/or bonus hand as being a “winning” set of cards, hand of cards or bonus hand is not meant to imply that any payout or prize has been output or will necessarily be output therefore. Similarly, a description of a payout or other prize being “associated with” or “corresponding to” a set of cards, hand of cards and/or bonus hand is not meant to imply that the corresponding or associated payout or prize has been output or will necessarily be output. For example, in one embodiment a bonus hand comprising a royal flush may be output as being associated with a bonus payout of fifty credits in the sense that the bonus payout of fifty credits will be output to a player if the player plays twenty game plays of the primary game without causing deactivation of any of the cards in the bonus hand.

These and other unique features of the systems and methods described herein will become more readily apparent from the description of the drawings, below.

In accordance with one or more embodiments, novel and unique systems and methods are provided for playing video poker or other card games, the systems and methods serving to prolong gaming sessions, thereby increasing the profitability of the casino.

Throughout the specification that follows, the term "video poker machine" includes, but is not limited to, the various programmable video-game apparatus including a video lottery terminal. In addition, the term "standard deck of playing cards" refers to a collection of fifty-two (52) cards comprising four (4) sets of cards identified by the characters 2 through 10, jack ("J"), queen ("Q"), king ("K"), and ace ("A"). Each of the four (4) sets of cards is differentiated by one of four (4) suits, namely, a spade ("s"), club ("c"), heart ("h"), or diamond ("d"). One or more jokers or deuces may also be included for use as the highest card or as a wild card. Reference to a deck of playing cards, unless specified otherwise, shall include one or more decks of playing cards. One or more decks can also be used in a single game. An "infinite" deck of playing cards refers to a deck wherein any single playing card can be dealt a repeated number of times. In one or more embodiments, a game play of a primary card game may include a plurality of hands (e.g., as in Triple Play Draw Poker™ from Action Gaming™) that may be dealt from a plurality of deckss (e.g., each hand may be dealt from a respective deck).

Also throughout the specification, unless specified otherwise, the term "primary poker hand" shall refer to a collection of cards that receive playing cards directly from a standard deck of playing cards (e.g., a five-card hand of a draw video poker game, which contains cards dealt and drawn randomly from a virtual deck). A card is discarded and becomes a "discard card" when a game player decides not to retain or "hold" the card in the primary poker hand.

In accordance with some embodiments, discard cards are not eliminated from the game, but instead create one or more "secondary poker hands." Each secondary poker hand includes one or more discard cards. In one embodiment, discard cards can replace cards previously placed into a secondary poker hand. Cards that are replaced in a secondary poker hand may either be eliminated from the poker game or create one or more third, or "tertiary," poker hands. Each tertiary poker hand includes one or more replaced cards from a secondary poker hand. Additional poker hands, e.g., a fourth group of playing cards that are collected from the tertiary poker hand(s), may be created in a similar manner.

In accordance with some embodiments, discard cards are used to eliminate or deactivate cards in one or more sets of secondary cards previously output (e.g., as a plurality of winning poker hands). Similarly, in one or more embodiments drawn or dealt cards may be used to eliminate or deactivate cards in one or more sets of secondary cards that had been previously output (e.g., a plurality of "winning poker hands" for which a player may receive a payout if no cards thereof are eliminated or deactivated).

Various alternate embodiments that are within the spirit and scope of the present invention are possible but, for simplicity, will not be described in detail herein. For example, the cards discarded from the primary poker hand by the player may not necessarily drop down into a secondary poker hand. Rather, they may be discarded in the conventional manner by simply being replaced in the primary poker hand without at all contributing to any of the secondary poker hands. Alternatively, a discard card may knock out a whole secondary poker hand, rather than a single card of the secondary poker hand. I one embodiment, a discard card may knock out cards in more than one discard hand. For example, a card of a particular rank and/or suit may cause all cards of that suit and/or rank in all discard hands to be knocked out.

The process of adding cards to a poker hand is described herein as "populating" the poker hand, and poker hands having had playing cards added to them are said to have been "populated." For example, a primary poker hand is populated when the hand receives playing cards from the standard deck of playing cards. Also, for example, a secondary poker hand is populated when it receives a discard card from the primary poker hand.

Referring now to the drawings wherein like reference numerals identify similar elements of the present invention, there is illustrated in FIG. 1 a video poker system 10 in the form of a slot machine constructed in accordance with an embodiment of the present invention. Video poker system 10 includes a processor 12 which may comprise one or more commercially available microprocessors, such as Intel Corporation's (Santa Clara, Calif.) Pentium® microprocessor or the like. A video display 14 in the form of a cathode ray tube (CRT), liquid crystal display (LCD), or light emitting diode (LED) display is operably connected to processor 12, along with a random number generator 16, player controls 18, a clock 20, and a data storage device 22. In addition, a set of currency handling devices 23, a starting controller 40 to which is connected a start button 41, a player card interface 42, and a network interface 50 are operably connected to processor 12.

The random number generator 16 is adapted and configured to generate a random or a pseudo-random number to determine, for example, the random selection of cards to form a playing card hand or the position of a playing card within a hand. These aspects will be more fully described hereinbelow. Alternatively, random number generator 16 can be implemented in software and thus random numbers would be generated by the software controlling processor 12. The structure and operation of random number generator 16 is well known in the art.

The currency handling devices 23 include a currency acceptor 28 that is operably connected to processor 12 for signaling the processor upon receipt of currency such as coins, bills, or tokens from a player. Currency acceptor 28 may also be configured to accept forms of non-currency payment such as credit cards, debit cards, smart cards, or the like. A hopper controller 24 is adapted and configured to control the dispensing of money from a hopper 26, typically in the form of coins or tokens, to return change or disperse winnings to a player. The terms coins and tokens are used interchangeably throughout the specification and simply represent a monetary amount. It should be readily understood that a player's winnings may take other forms as well, for example, as credits or points. The structure and operation of hopper controller 24, hopper 26, and currency acceptor 28 are well known in the art.

Data storage device 22 comprises at least one of a selected semiconductor, magnetic, or optical memory components as are well known in the art. The data storage device 22 contains at least a program 30 providing instructions for the operation of processor 12 and a payout schedule 32 for providing an appropriate payout corresponding to the outcome of a particular card game. Player controls 18 and start button 41 are utilized to play a video poker game, to be described in greater detail hereinbelow, by a game player during operation of video poker system 10. Player card interface 42 enables a game player to save and reload information related to the player.

Player controls 18 include primary card hold controls 34, a card draw control 36, and secondary poker hand cashout control buttons 38 each of which are operably connected to processor 12. Each control 34, 36, and 38 is accessible to a player during game participation for furthering game play or altering game strategies as will be described further hereinbelow. Although five (5) primary card hold controls 34 and five (5) secondary poker hand cashout control buttons 38 are shown, an embodiment of the present invention may include more or fewer of each control type.

The starting controller 40 is provided for sending a signal to processor 12 indicating that video poker system 10 has been enabled for play, as is well known in the art. A game player activates starting controller 40 by actuating start button 41. Player card interface 42 is operably associated with processor 12 and includes a card reader 44 for reading a player tracking card (not shown). Player tracking cards of this type may comprise magnetic storage media or optical storage media as is well known in the art. Each player tracking card may include a code stored thereon that identifies the player for various purposes. For example, such purposes may include a code to restart a playing session where a player earlier left off, to credit bonus points to the player during off-peak playing hours, or to credit bonus points for having played for a predetermined amount of time. Such bonus points may subsequently be exchanged for casino merchandise or services, as is well known in the art.

Player card interface 42 further includes a display 46 for providing information to the player and an associated data entry device 48 for enabling a player to communicate with system 10. Display 46 may be in the form of an LCD or LED device and can be used to display bonus information or other targeted messages to a player. Data entry device 48 may be in the form of a numeric keypad, touch screen, or other similar input device. Network interface 50 is operably connected to processor 12 and preferably comprises a communication port or card for enabling communication between multiple video poker systems 10 and a server as will be discussed hereinbelow.

Figure 2:
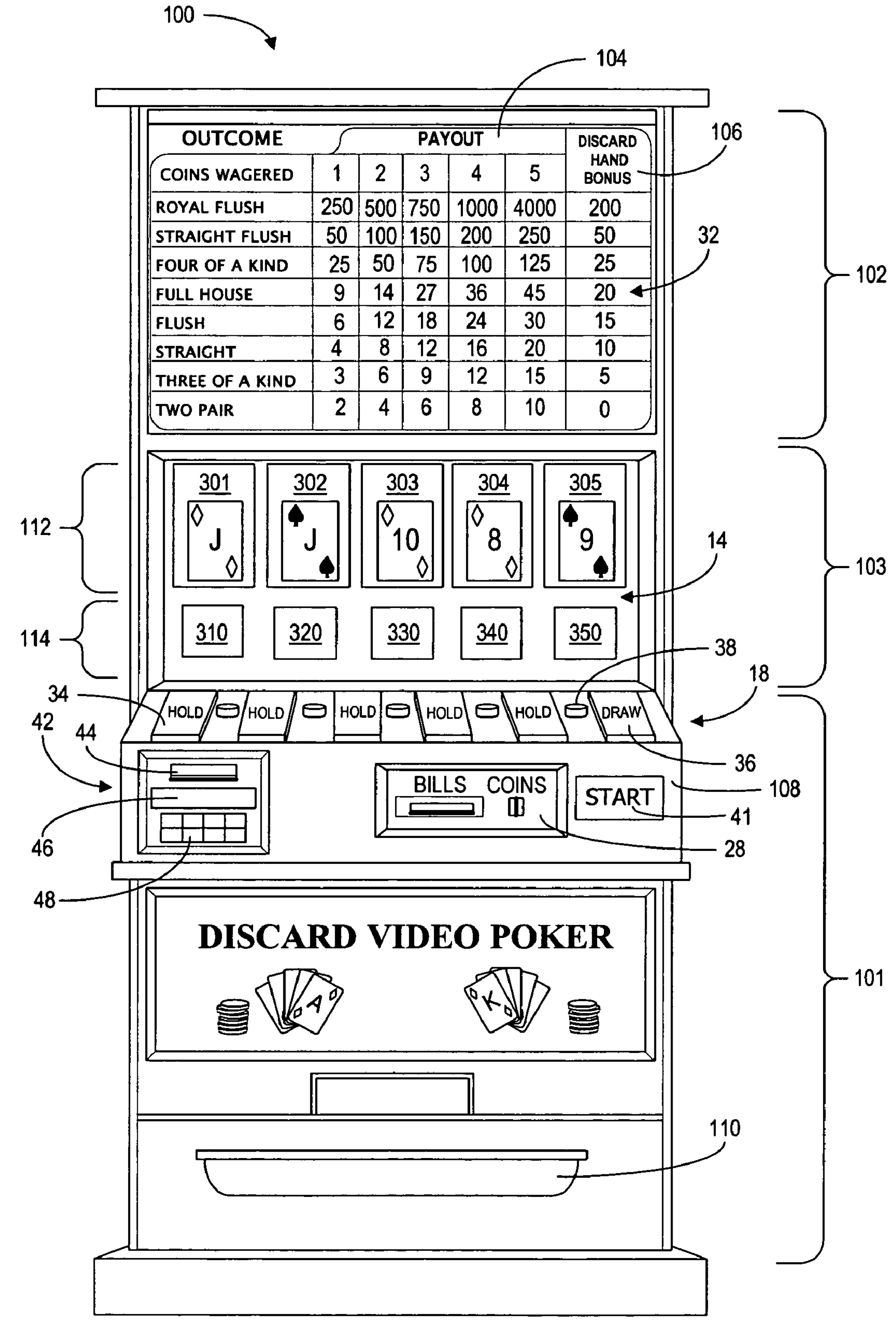
FIG. 2 is a front elevational view of a video poker gaming device configured in accordance with an embodiment described herein.

Referring now to FIG. 2, a video poker machine 100 is illustrated comprising the components illustrated in FIG. 1 and described hereinabove. A lower panel 101 of video poker machine 100 supports player controls 18. Below player controls 18 is a front panel 108 supporting player card interface 42, currency acceptor 28, and start button 41. A coin tray 110 is provided below front panel 108 for collecting coins or tokens dispensed from hopper 26.

An upper panel 102 of video poker machine 100 displays the contents of payout schedule 32 which includes a primary poker hand payout schedule 104 (entitled "payout") and a secondary poker hand payout schedule 106 (entitled "discard hand bonus") as illustrated. As noted above, payout schedule 32 is stored in data storage device 22.

Referring to FIG. 3, payout schedule 32 includes a column depicting winning-hand combinations, or "outcomes" (e.g., royal flush, straight flush, four of a kind, etc.), and corresponding payouts for achieving the outcomes. The size of the payout depends on the number of coins wagered as is currently implemented in existing video poker games.

To illustrate payout schedule 32, a player inserting the minimum wager of one (1) coin and ultimately obtaining two pair in his primary poker hand and two pair in one of his secondary poker hands (e.g., "discard hands") will receive a total payout of two (2) coins (2+0=2 coins). And, as another example, a player who wagers three (3) coins and obtains a full house in his primary poker hand and a straight flush in one of his secondary poker hands will receive a total payout of seventy-seven (77) coins (27+50=77 coins). In another embodiment, the player may not be eligible to receive a payout for a secondary poker hand unless he had wagered the maximum number of coins on the primary poker hand. Payout schedule 32, for example, has a maximum wager of five coins. In yet another embodiment, the amount of the discard hand bonus for any of the secondary poker hands may vary as a function of the number of coins wagered in a similar manner to that illustrated by the payouts for the primary poker hand in payout schedule 32. The method of game play, method by which primary and secondary poker hands are developed, and payout variations related thereto will be described and discussed in detail hereinbelow.

Referring again to FIG. 2, a center panel 103 of video poker machine 100 includes display 14 which includes an image as shown thereon. The upper portion of display 14 includes a graphical representation of a primary poker hand 112 having five (5) card positions, 301 through 305. The lower portion of display 14 includes five (5) secondary poker hands 114 identified as 310 through 350. Each secondary poker hand 310 through 350 is associated with a card position of primary poker hand 112. For example, secondary poker hand 310 is associated with card position 301 and secondary poker hand 320 is associated with card position 302 of primary poker hand 112. In an alternate embodiment of the present invention the secondary poker hands 112 are not associated with any particular card position of primary poker hand 112. Another embodiment of the present invention comprises a primary poker hand 112 having more or less than five (5) card positions and an associated secondary poker hand for each card position. Yet another embodiment comprises a primary poker hand 112 having more or less secondary poker hands 114 associated with each card position of primary poker hand 112. For example, a primary poker hand 112 may have five (5) card positions and one (1) secondary poker hand associated with the primary poker hand 112. In another alternate embodiment, the player may choose which of the possible secondary poker hands, or which position at a particular secondary poker hand, any given discard card will fall into.

Card positions 301 through 305 of primary poker hand 112 are populated by video poker system 10 in any number of ways. For example, each card position 301 through 305 may be populated from a single deck of cards, from five (5) decks of cards that are each dedicated to feeding a different card position, or from an infinite deck of playing cards. Of course, a card having a particular character and suit may turn up several times when more than one deck or when an infinite deck of cards is used. Cards are dealt or distributed under the control of processor 12 and random number generator 16.

An example of a playing session follows to better illustrate a method of playing a secondary game in accordance with an embodiment described herein and, in addition, to demonstrate a number of its variations. This example is not meant to limit the way in which a game may be played, but only for exemplifying some basic concepts of one embodiment described herein. As will become apparent to one skilled in the art, there are a multitude of variations that can be made from the embodiments described and claimed herein.

Figure 4:
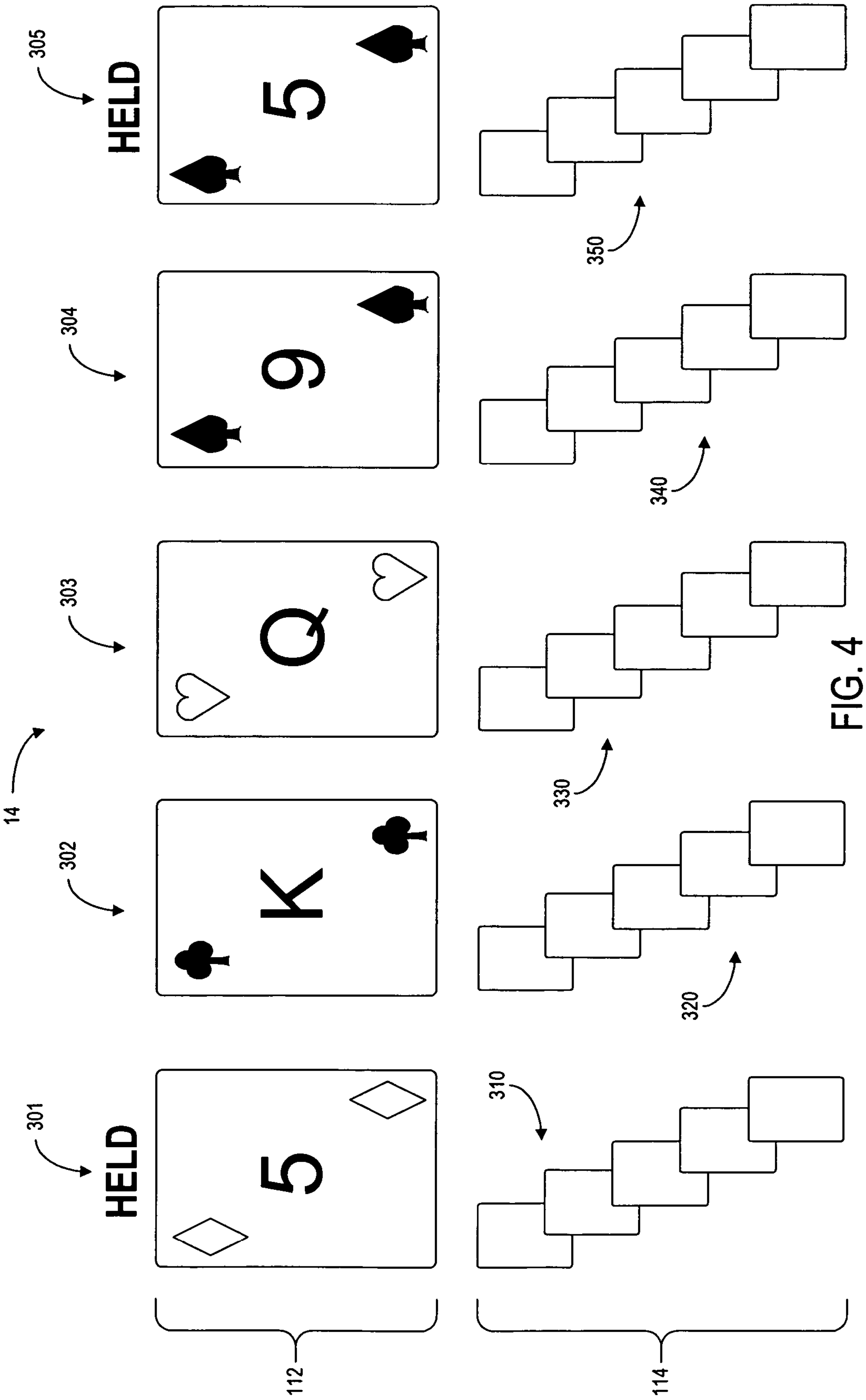
FIGS. 4-19 are successive views of the video display of the video poker gaming device of FIG. 2 during a gaming session, in accordance with en embodiment described herein.

Referring now to FIGS. 2 and 4, an embodiment operates generally as follows. The embodiment described comprises a primary poker hand 112 of five (5) card positions, 301 through 305, and secondary poker hands 114, identified as 310 through 350, for each of the five (5) primary poker hand card positions, 301 through 305. Each secondary poker hand consists of five (5) cards. In addition, each card that is not held (i.e., retained) in primary poker hand 112 is discarded into the secondary poker hand associated therewith. Thus, each of the discard cards populate the secondary poker hands with which they are associated.

In the embodiment that follows, discard cards are randomly discarded from the primary poker hand 112 to the secondary poker hand 114 associated therewith to either fill an empty card position or replace a playing card that already fills a card position. In an alternate embodiment, discard cards are discarded either randomly or sequentially into empty secondary poker hand card positions until all of the empty card positions are filled. Once the secondary poker hand is filled, the discard cards are either randomly or sequentially discarded into the filled secondary poker hand 114. Other various discard combinations including, for example, the above described random and sequential discard techniques, are envisioned. Those cards in the secondary poker hand that are replaced are either eliminated from the game or, as described above, fill additional poker hands (e.g., a tertiary poker hand).

A player activates machine 100 by, for example, feeding bills, coins, or tokens into currency acceptor 28 and actuating start button 41. In the alternative, a player inserts a player tracking card into card reader 44 to register "credits" received either from an earlier game playing session or from a card crediting device (not shown). Such "credits" may be stored on a casino server in association with the code that identifies the player. The machine 100 may read the code off of the player tracking card and retrieve the associated credits from the casino server via network interface 50. Using, for example, data entry device 48, the player may indicate prior to each new primary poker hand 112 being dealt the number of coins that are to be wagered.

Initially, primary poker hand card positions 301 through 305 and secondary poker hands 310 through 350 are devoid of playing cards. The player presses draw control button 36 signaling processor 12 to deal a hand of cards to card positions 301 through 305 of primary poker hand 112.

After pressing draw control button 36, an initial hand is dealt populating all five (5) card positions of primary poker hand 112. As illustrated in FIG. 4, the primary poker hand 112 includes 5d, Kc, Qh, 9s, and 5s. As is conventional in the art of five card draw poker, the player determines which cards are to be held and, thereby, which are to be discarded. This decision is conveyed to video poker machine 100 by the player pressing the hold control buttons 34 that are associated with each card that is to be held in the primary poker hand 112. In this example, the player holds the 5d and 5s in card positions 301 and 305, respectively. The Kc, Qh, and 9s in card positions 302, 303, and 304, respectively, are discarded.

Figure 5:
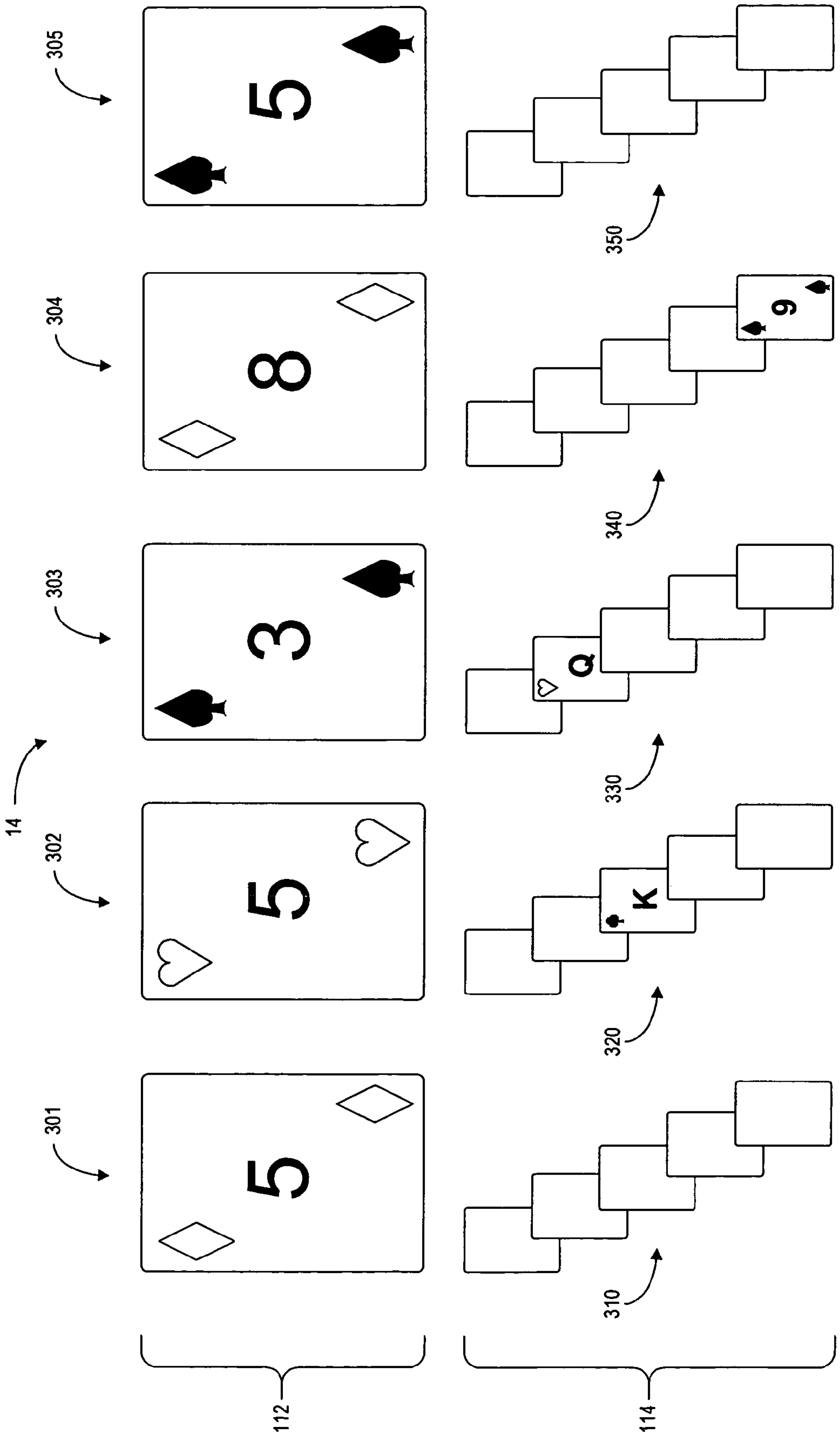

Referring to FIG. 5, upon pressing draw control button 36, the Kc, Qs, and 9s are discarded into random positions of secondary poker hands 320, 330 and 340, respectively. Of course, an alternate embodiment contemplates that the cards may be discarded into sequential positions of the secondary poker hands. In yet another alternate embodiment, cards discarded from the primary poker hand do not fill the secondary poker hand unless the player has wagered the maximum number of coins. Primary poker hand 112 is again populated, replacing the cards that were discarded therefrom with the 5h, 3s, and 8d in card positions 302, 303, and 304, respectively. The primary poker hand 112 is completed, and therefore, a payout for primary poker hand 112 and any completed secondary poker hands 114 is determined using payout schedule 32.

In this example, the payout is calculated for three of a kind in the primary poker hand 112 which amounts to, for example, nine (9) coins if three (3) coins were wagered. To continue play, the player activates machine 100, for example, by actuating start button 41, and actuates draw control button 36 signaling processor 12 to deal a new hand of cards to primary poker hand 112. The cards in secondary poker hands 320, 330, and 340 remain.

Figure 6:
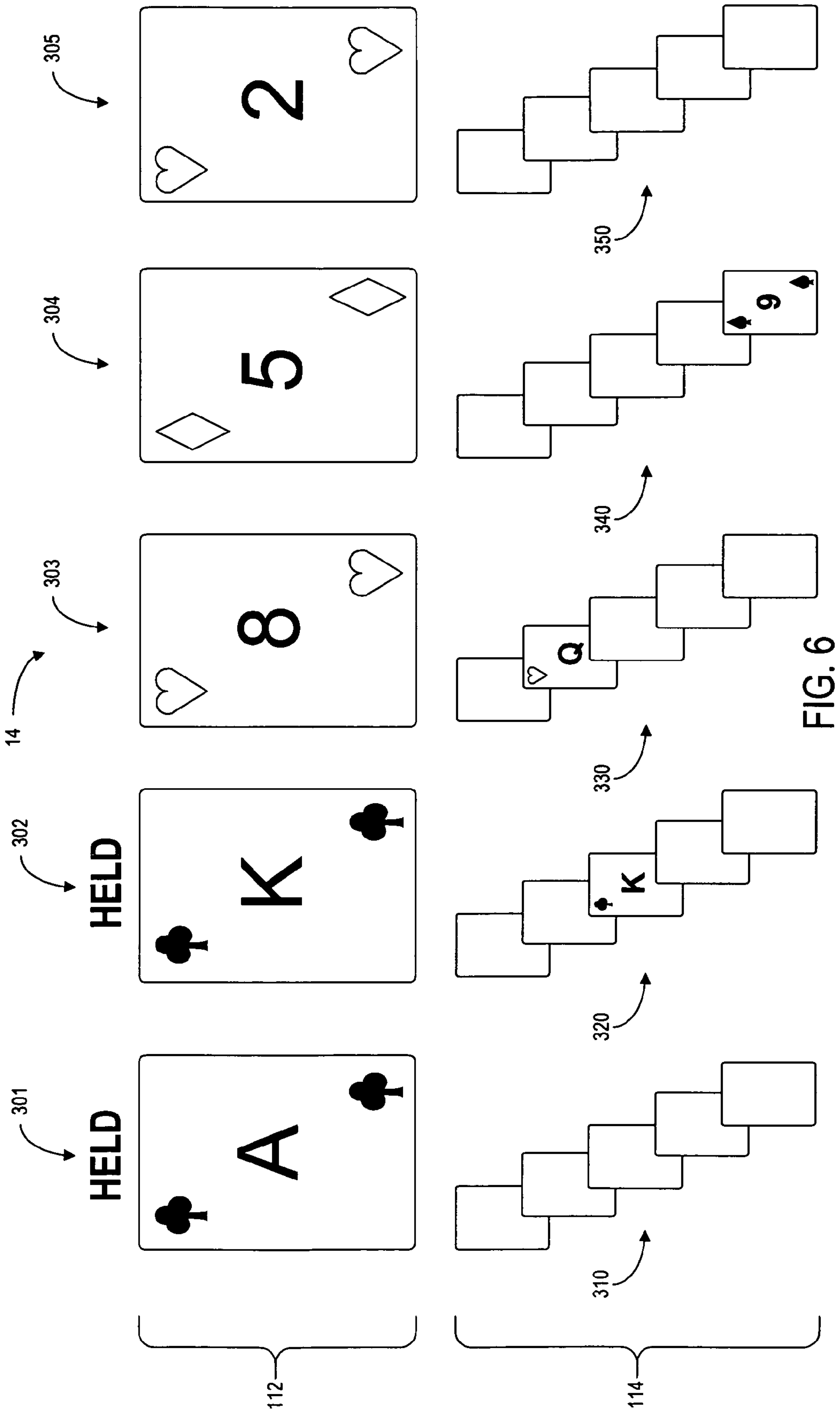

FIG. 6 shows a new primary poker hand 112. In this example, the player decides to hold the Ac and Kc in card positions 301 and 302, respectively, of primary poker hand 112. Thus, the player indicates that the 8h, 5d, and 2h in card positions 303, 304, and 305, respectively, are to be discarded by actuating the appropriate hold control buttons 34.

Figure 7:
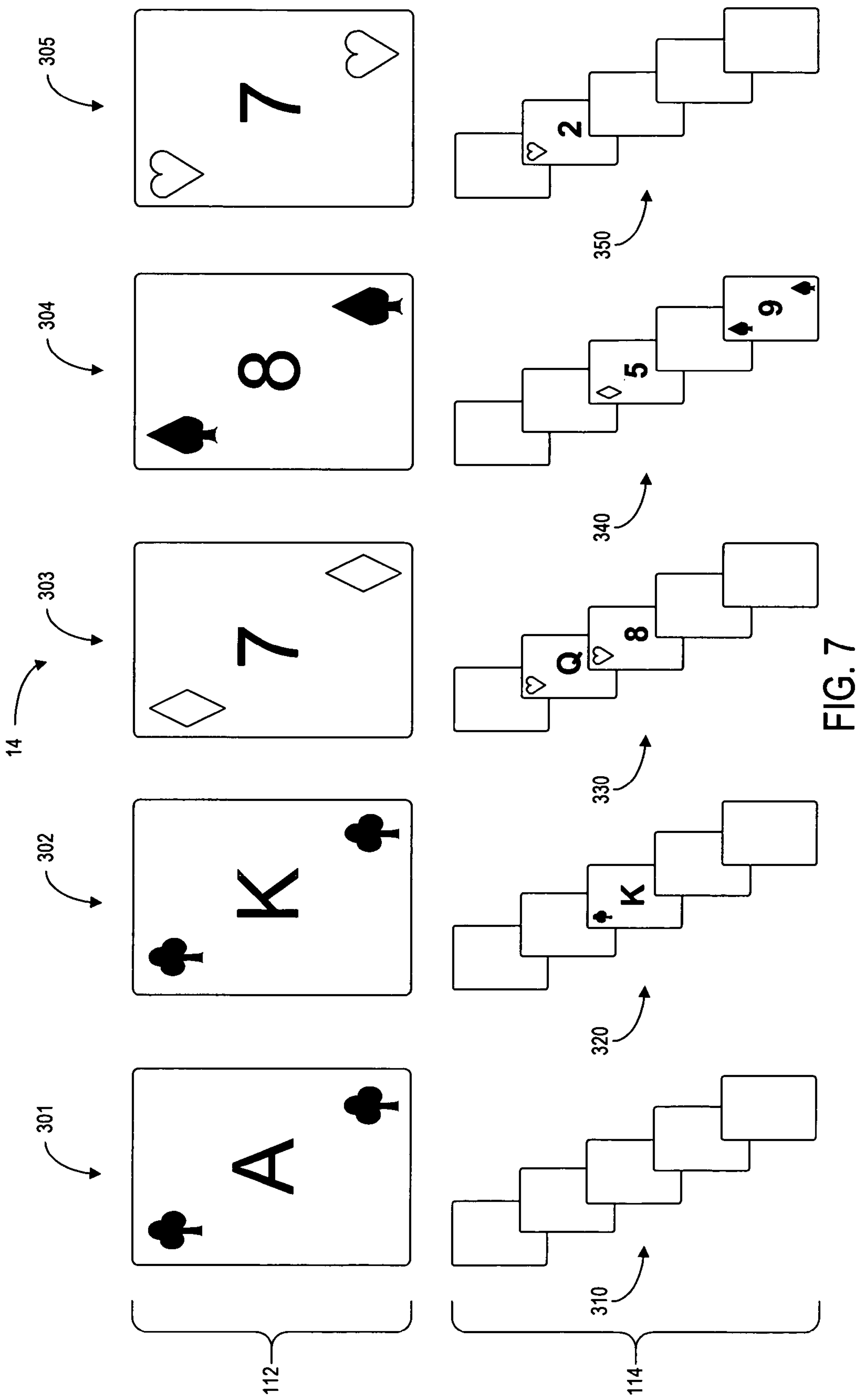

Referring to FIG. 7, upon actuating draw control button 36, the 8h, 5d, and 2h are discarded into random positions of secondary poker hands 330, 340, and 350, respectively. Primary poker hand 112 is again populated, replacing the cards that were discarded with the 7d, 8s, and 7h in card positions 303, 304, and 305, respectively. The primary poker hand 112 is completed, and therefore, a payout for the primary poker hand 112 and any completed secondary poker hands 114 is determined. In this example, there is no payout because the final primary poker hand 112 does not match any of the designated "outcomes" in payout schedule 32 (i.e., two pair or better are required for a payout) and none of the secondary poker hands 114 are complete. To continue play, the player activates machine 100 and presses draw control 36 signaling processor 12 to deal a new hand of cards to primary poker hand 112.

Figure 8:
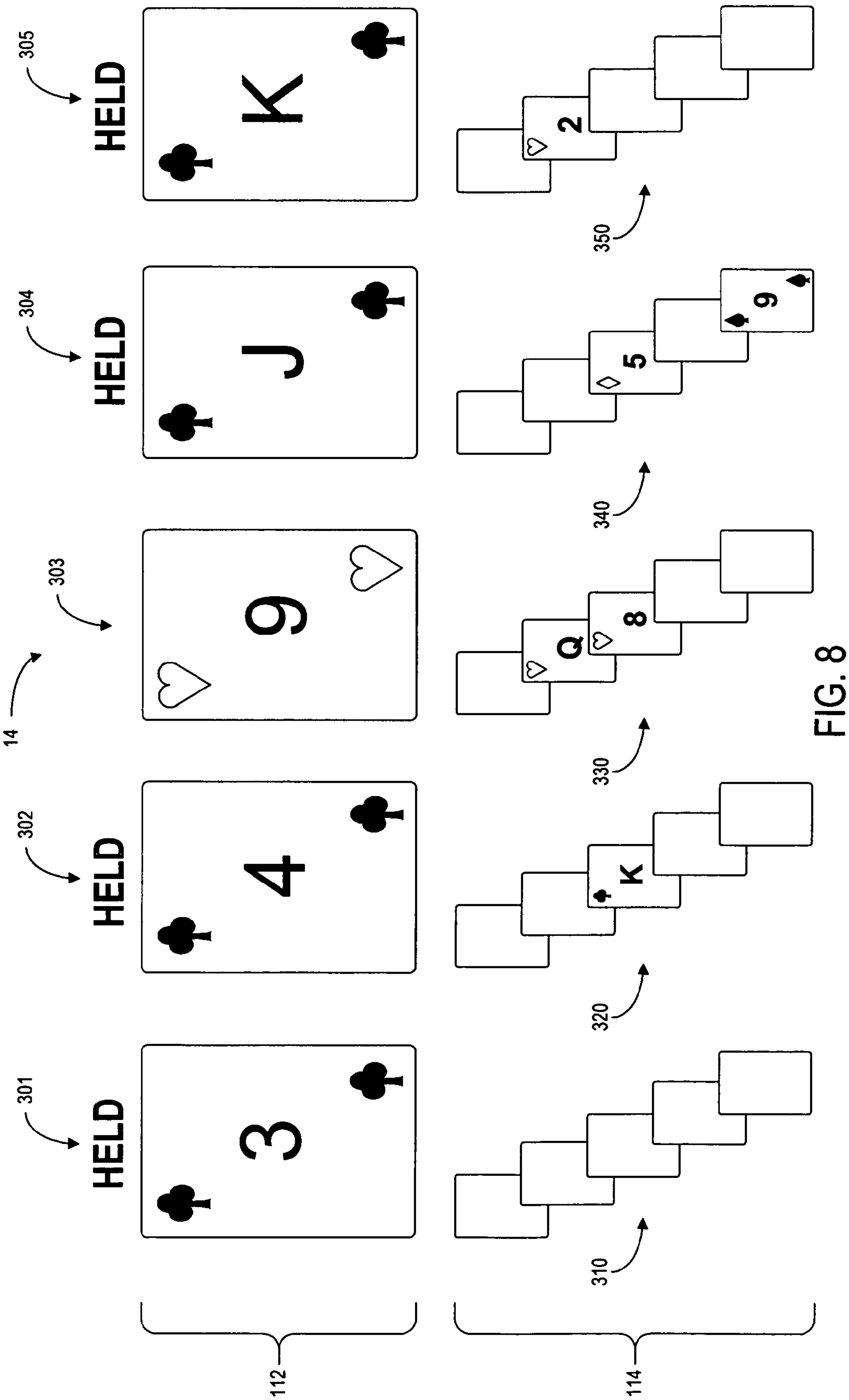
Figure 9:
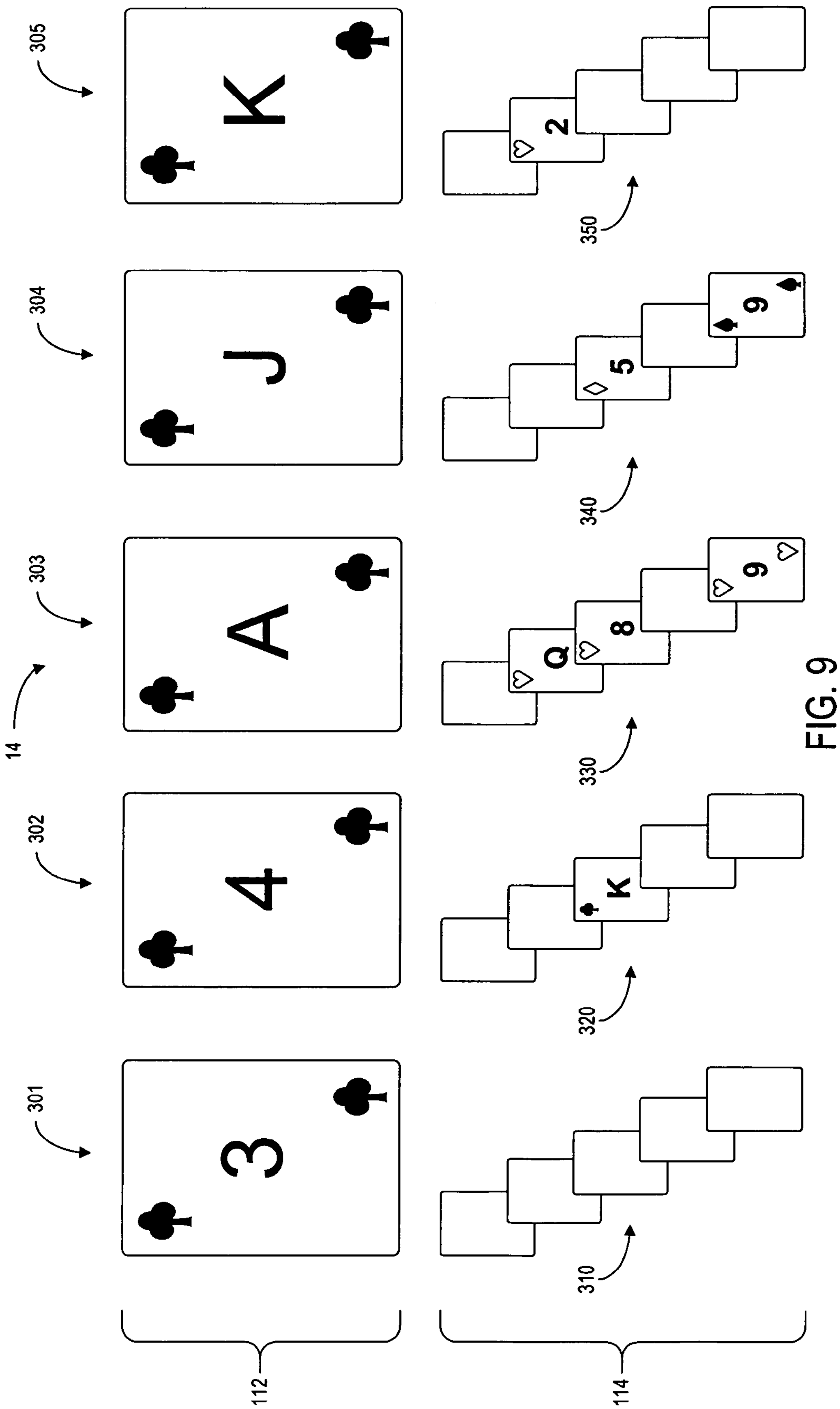

Referring to FIG. 8, the new primary poker hand 112 is shown, in which the player decides to hold the 3c, 4c, Jc, and Kc in card positions 301, 302, 304, and 305, respectively. Thus, the 9h in card position 303 is to be discarded. FIG. 9 shows that after the appropriate hold control buttons 34 are actuated, and upon actuating draw control button 36, the 9h is discarded into a random position of secondary poker hand 330. Primary poker hand 112 is again populated, replacing the card that was discarded therefrom with the Ac in card position 303. The primary poker hand 112 is completed, and therefore, a payout for the primary poker hand 112 and any completed secondary poker hands 114 is determined. The payout for the flush in the primary poker hand 112 amounts to, for example, eighteen (18) coins if three (3) coins were wagered. There is no payout for the secondary poker hands 114. To continue play, the player activates machine 100 and actuates draw control button 36 signaling processor 12 to deal a new hand of cards to primary poker hand 112.

Figure 10:
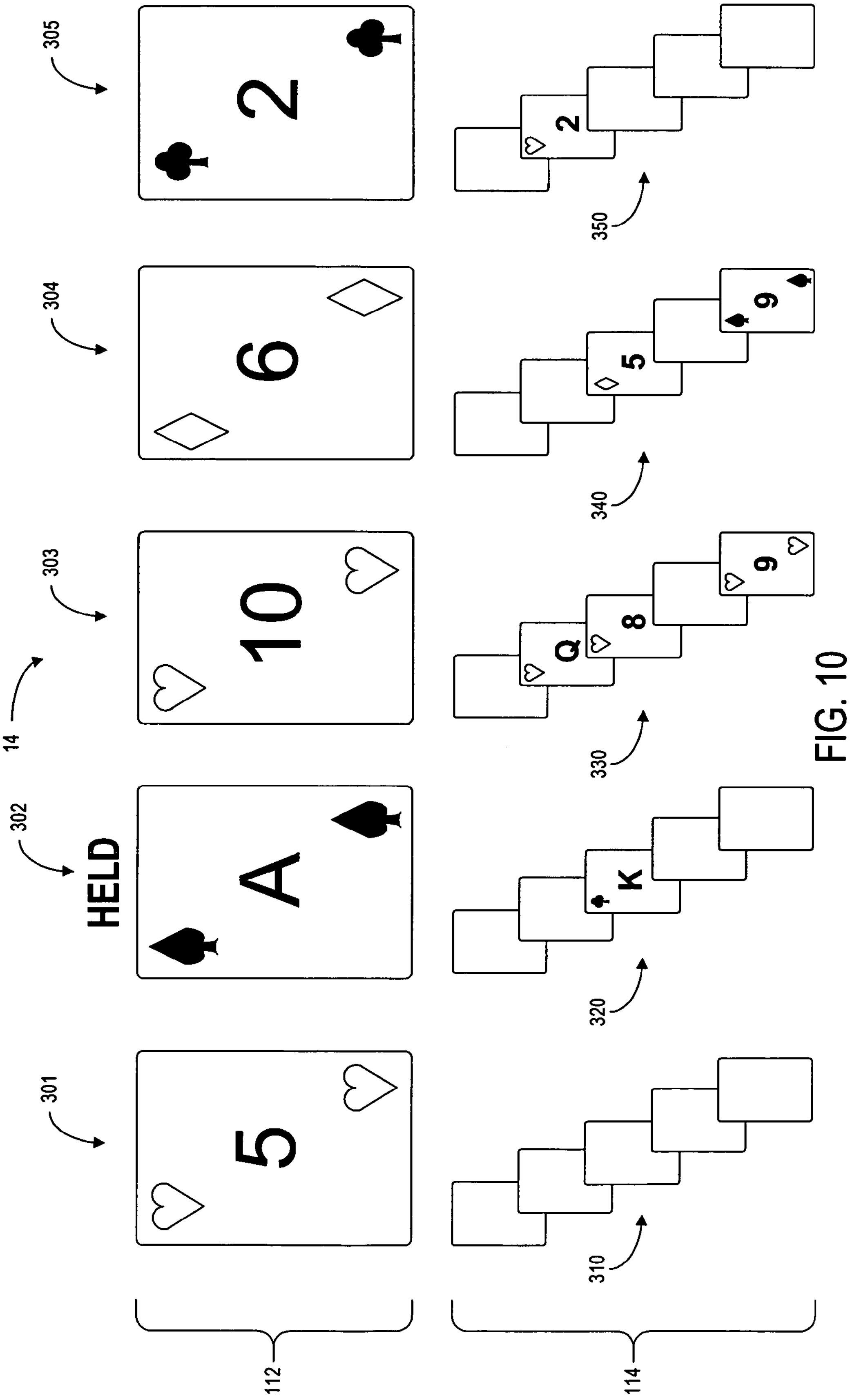
Figure 11:
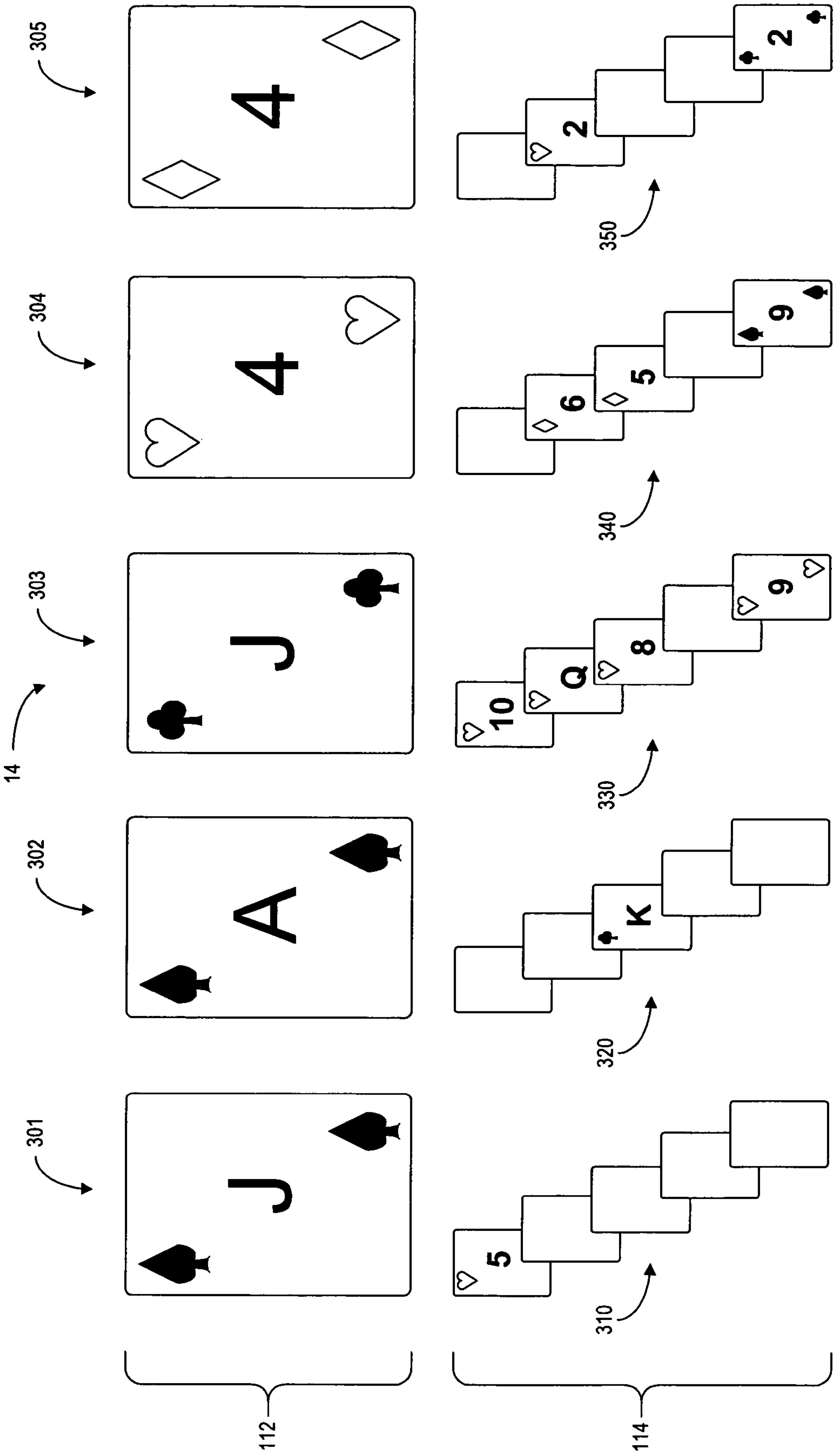

Referring to FIG. 10, the new primary poker hand 112 is shown, in which the player determines that it is best to hold the As in card position 302. Thus, the 5h, 10h, 6d, and 2c in card positions 301, 303, 304, and 305 are to be discarded to the secondary poker hands. Referring to FIG. 11, after determining which cards to hold and actuating the appropriate hold control buttons 34, the player actuates draw control button 36, and the 5h, 10h, 6d, and 2c are discarded into random card positions of secondary poker hands 310, 330, 340, and 350, respectively. Primary poker hand 112 is again populated, thereby replacing the cards that were discarded therefrom with the Js, Jc, 4h, and 4d in card position 301, 303, 304, and 305, respectively. The primary poker hand 112 is completed, and therefore, a payout for the primary poker hand 112 and any completed secondary poker hands 114 is determined. The payout is for two pair in the primary poker hand 112, which amounts to six (6) coins if three (3) coins were wagered. No winning outcomes were achieved in any of the secondary poker hands 114. To continue play, the player activates machine 100 and actuates draw control button 36.

Figure 12:
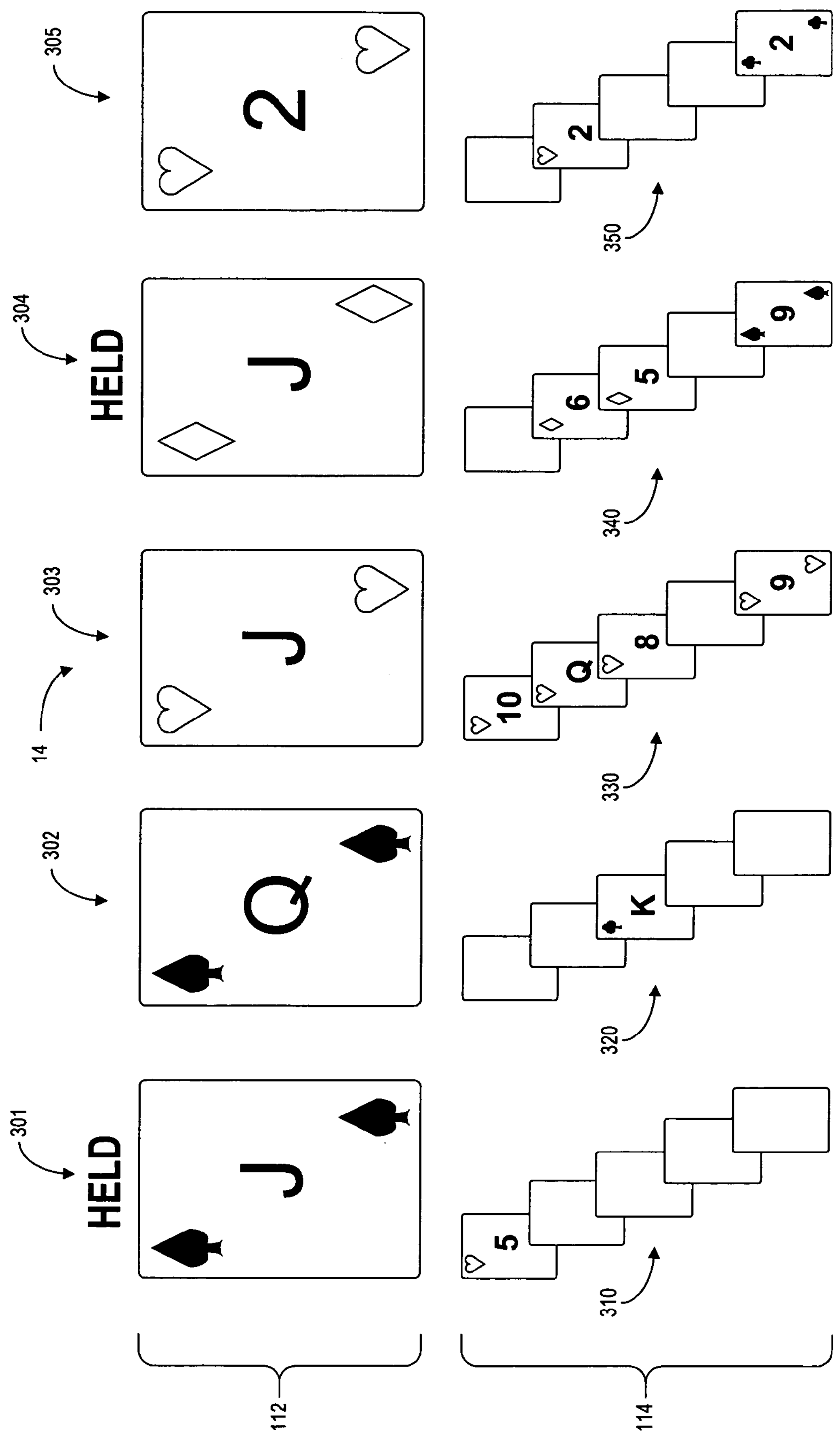

Referring to FIG. 12, a new primary poker hand 112 is dealt. In this example, the player has drawn three of a kind, i.e., Js, Jh, and Jd in card positions 301, 303, and 304, respectively. Ordinarily, the player would hold all three cards to earn a guaranteed payoff, e.g., nine (9) coins if three (3) coins were wagered.

However, there is a possibility that the Jh, if discarded, will drop into the empty position of secondary poker hand 330 resulting in a straight flush which has a higher payoff, i.e., fifty (50) coins. In this example, the player takes this chance by actuating the appropriate hold control buttons 34 in order to hold only the Js and Jd in card positions 301 and 304, respectively. Thus, the Qs, Jh, and 2h in card positions 302, 303, and 305, respectively, are to be discarded.

Figure 13:
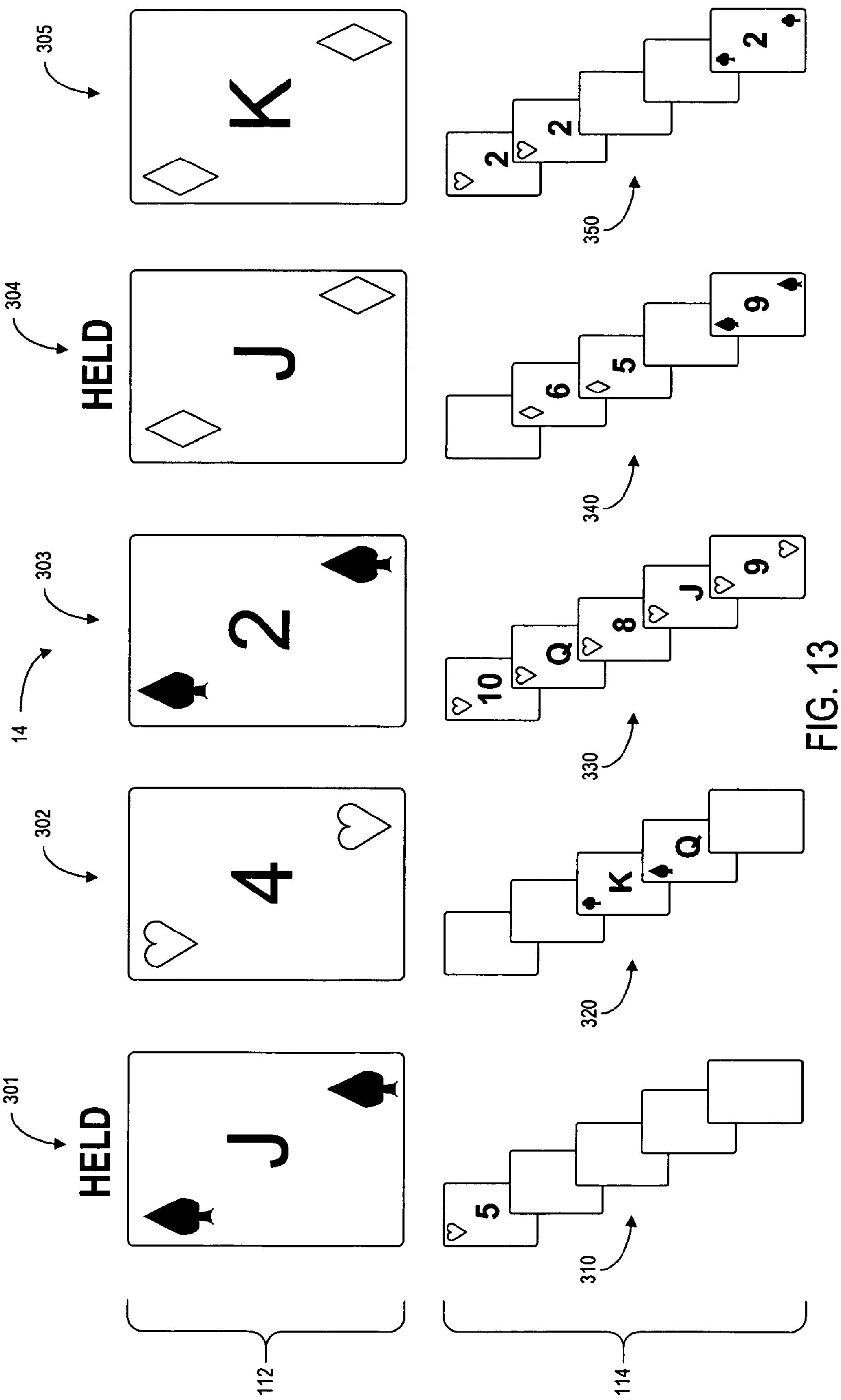

Referring to FIG. 13, upon actuating draw control button 36, the Qs, Js, and 2h are discarded into random positions of their respective secondary poker hands 320, 330, and 350. Primary poker hand 112 is again populated, replacing the cards that were discarded therefrom with the 4h, 2s, and Kd in card positions 302, 303, and 305, respectively. The primary poker hand 112 is completed, and therefore, a payout for the primary poker hand 112 and secondary poker hands 114 is determined. Here, there is no payout for the primary poker hand 112, but there is a payout of fifty (50) coins for the straight flush in secondary poker hand 114 as anticipated. To continue play, the player activates machine 100, wagers, and actuates draw control button 36.

With continued reference to FIG. 13, it is seen that secondary poker hand 350 includes three of a kind, i.e., 2h, 2h, and 2s. As described above, an alternate embodiment of the present invention includes cashout control buttons 38 (see FIG. 2) permitting a player to have the option of taking a "discard bonus" before a particular secondary poker hand is completed (i.e., while a secondary poker hand has less than a full hand). Therefore, the player in this example may actuate the cashout control button 38 associated with secondary poker hand 350 at this time and receive a secondary hand bonus payout of five (5) coins for the three of a kind, i.e., 2h, 2h, and 2s. If the player chooses to "cash out" secondary poker hand 350 at this time, the playing cards in that hand are removed. In this example, the player decides not to cash out in the hopes of building a more profitable secondary hand 350, such as four of a kind or a full house.

Another embodiment of video poker machine 100 includes a single cashout control button (not shown) which, if activated, would signal the machine to poll all secondary poker hands 114 each time a set of new cards are dealt to the primary poker hand 112 and to make a payout for any ranking hands achieved. The payout would be made even if the winning combination of cards is acquired before the secondary poker hand is complete.

Figure 14:
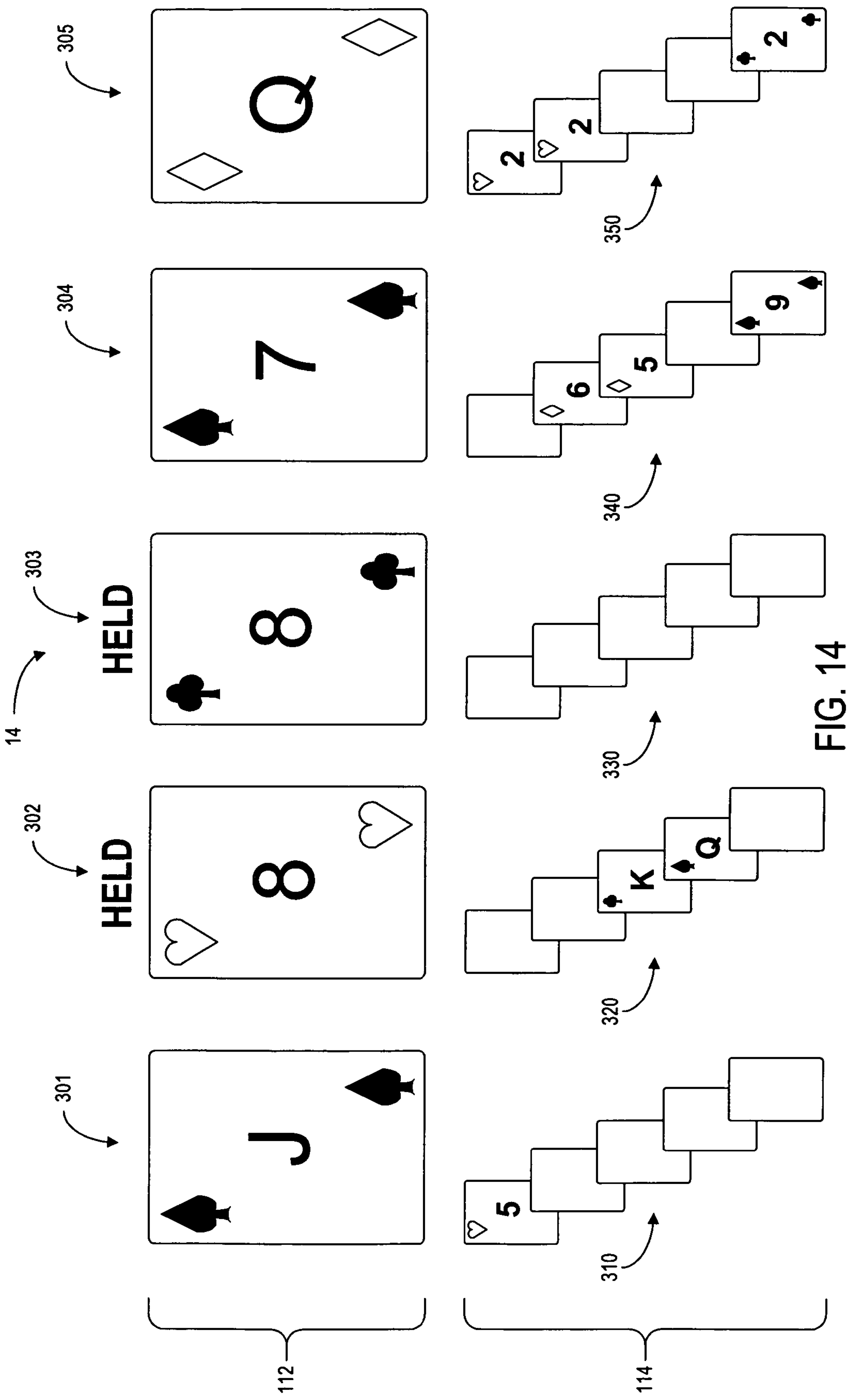

Rerring now to FIG. 14, a player is dealt a new primary poker hand 112 and decides to hold the 8h and 8c in card positions 302 and 303, respectively. Thus, the Js, 7s, and Qd in card positions 301, 304, and 305, respectively, are to be discarded by actuating the appropriate hold control buttons 34.

Figure 15:
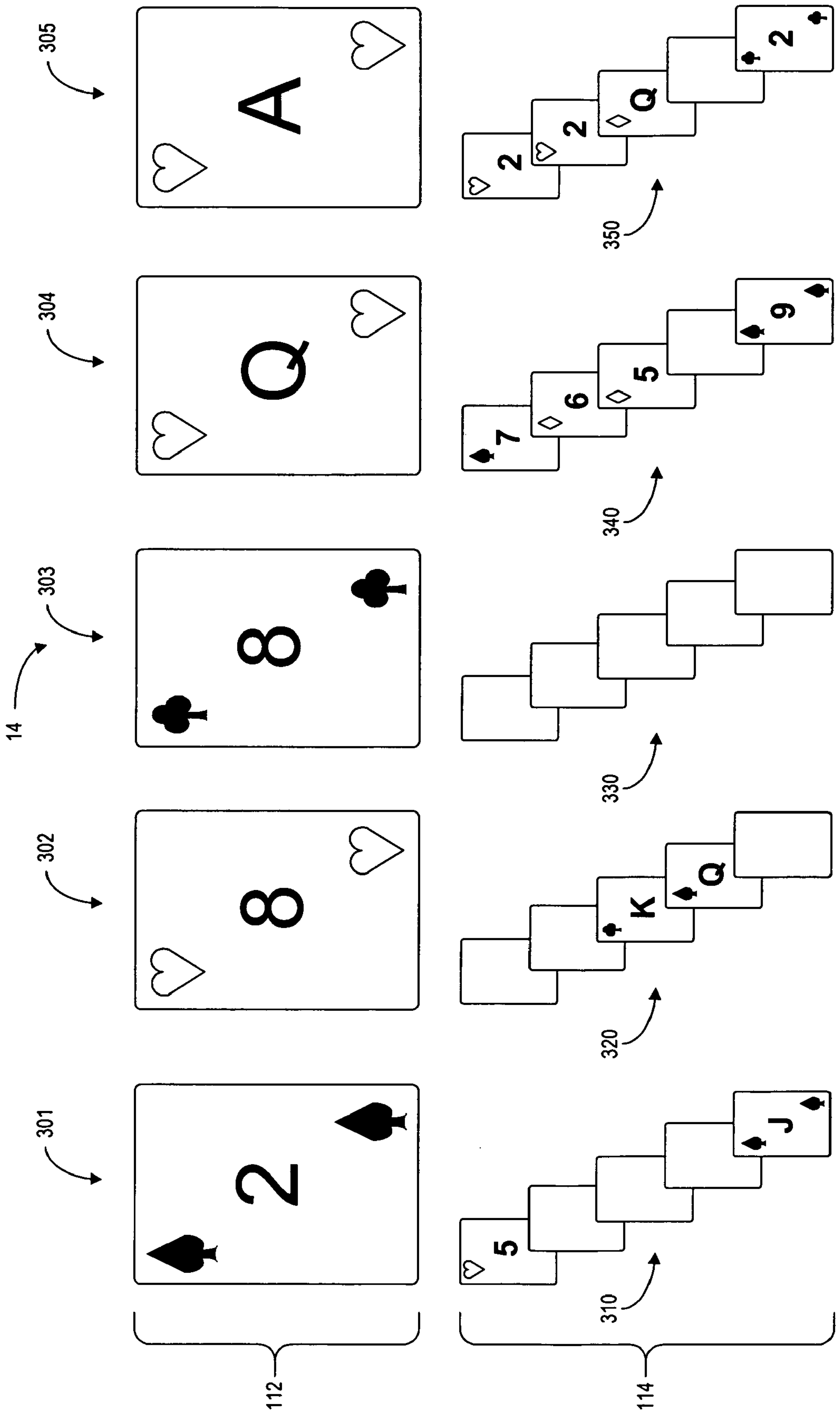

Referring now to FIG. 15, upon actuating draw control button 36, the Js, 7s, and Qd are discarded into random positions of secondary poker hands 310, 340, and 350, respectively. Primary poker hand 112 is again populated, replacing the cards that were discarded therefrom with the 2s, Qh, and Ah in card positions 301, 304, and 305, respectively. The primary poker hand 112 is completed, and therefore, a payout for primary poker hand 112 and secondary poker hand 114 is determined. In this example, there is no payout for primary poker hand 112 or for secondary poker hand 114. However, the player is encouraged to extend play because secondary poker hand 340 is close to earning a payout of ten (10) coins for a straight and secondary poker hand 350 is close to earning a payout of twenty-five (25) coins for a four of a kind or twenty (20) coins for a full house. To continue play, the player activates machine 100, wagers, and actuates draw control button 36.

Figure 16:
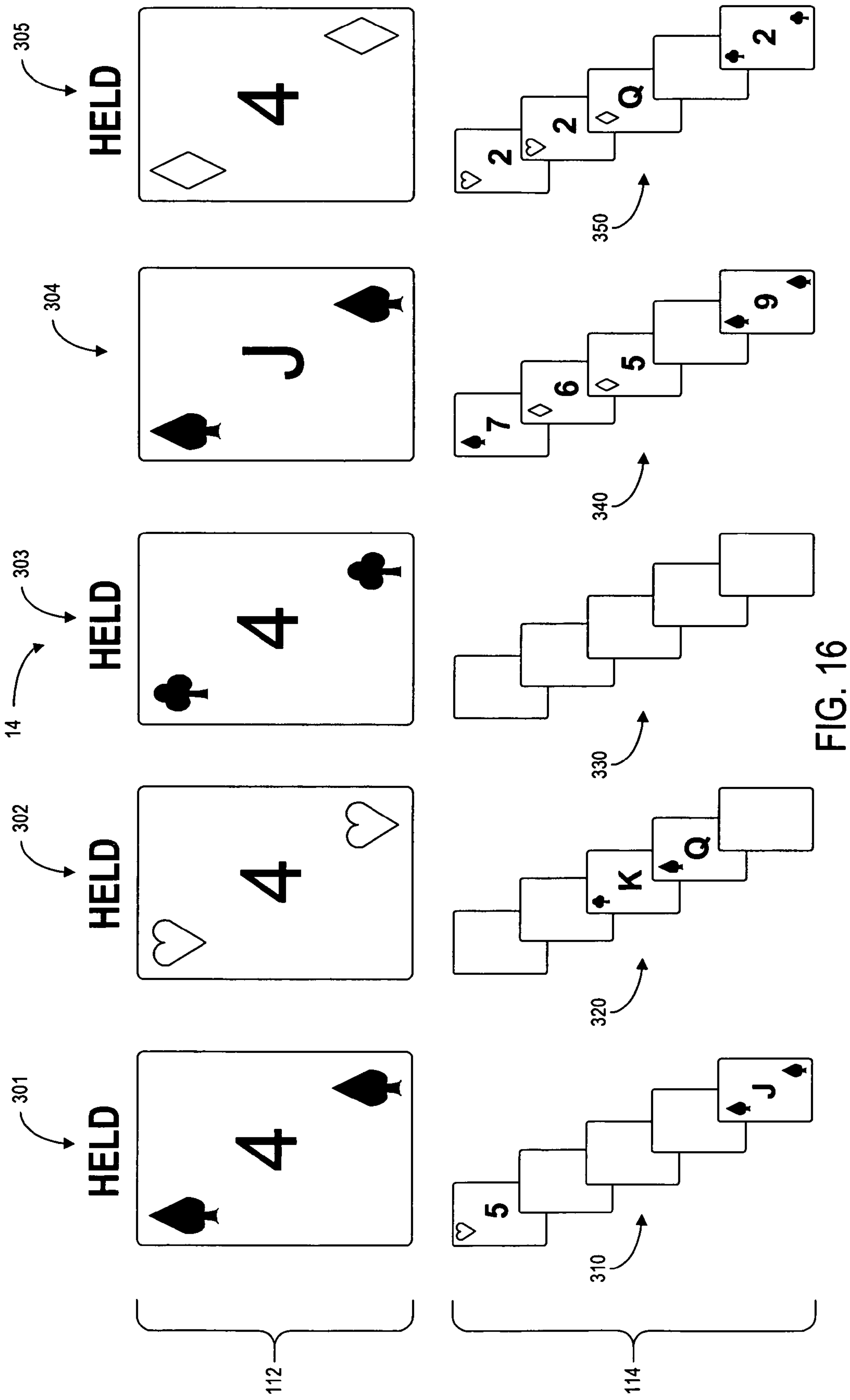
Figure 17:
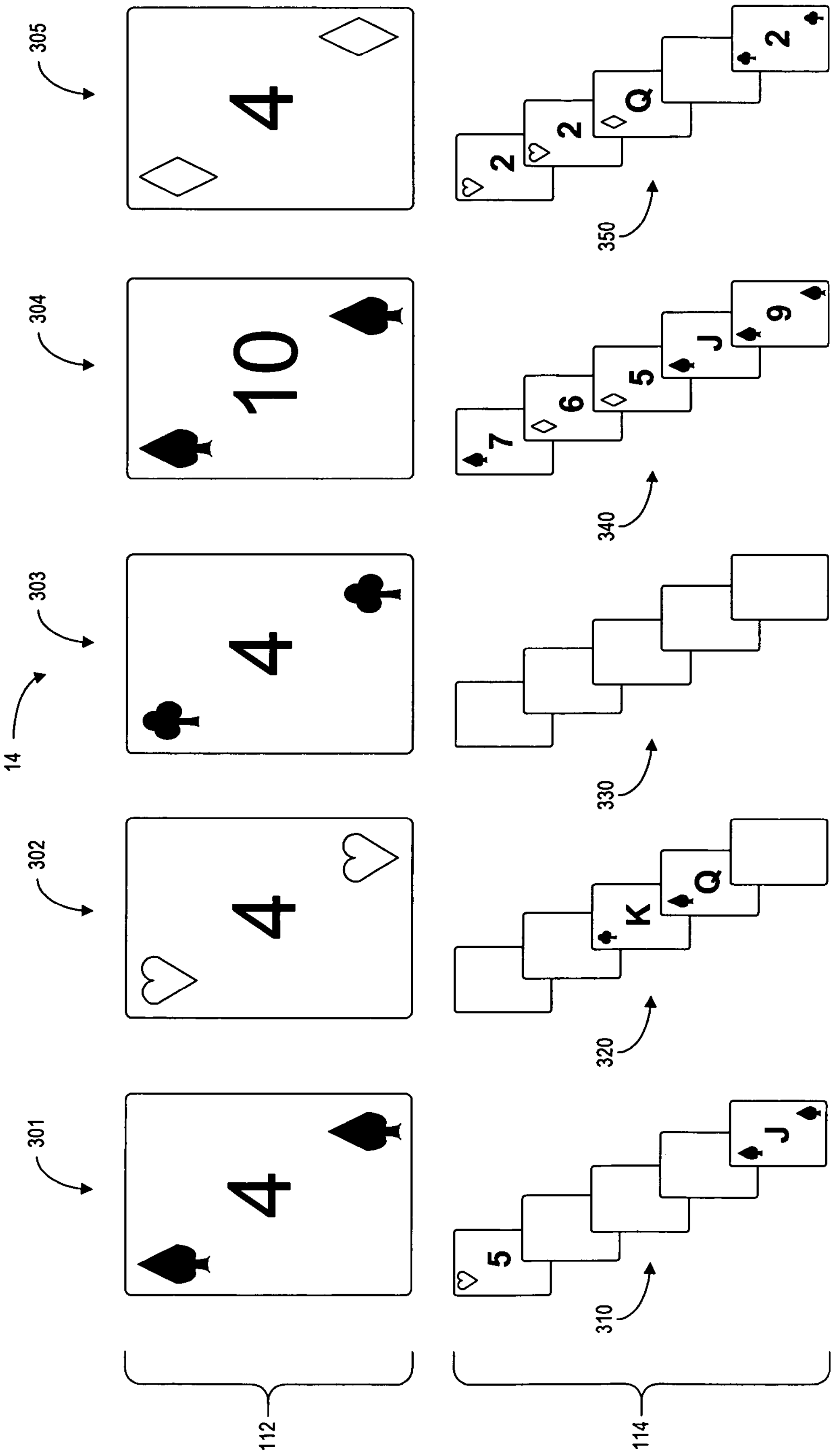

Referring now to FIG. 16, a player receives a new primary poker hand 112 and decides to hold the 4s, 4h, 4c, and 4d in card positions 301, 302, 303, and 305, respectively. Thus, the Js in card position 304 is to be discarded by actuating the appropriate hold control buttons 34. Referring to FIG. 17, the player actuates draw control button 36, and the Js is discarded into a random position of secondary poker hand 340. Primary poker hand 112 is again populated, replacing the card that was discarded therefrom with the 10s in card position 304. The primary poker hand 112 is completed, and therefore, a payout for the primary and secondary poker hands 112 and 114 is determined. The payout is for four of a kind in primary poker hand 112, which equates to seventy-five (75) coins if three (3) coins were wagered. No payout has been achieved for any of the secondary poker hands 114. To continue play, the player activates machine 100, wagers, and actuates draw control button 36.

Figure 18:
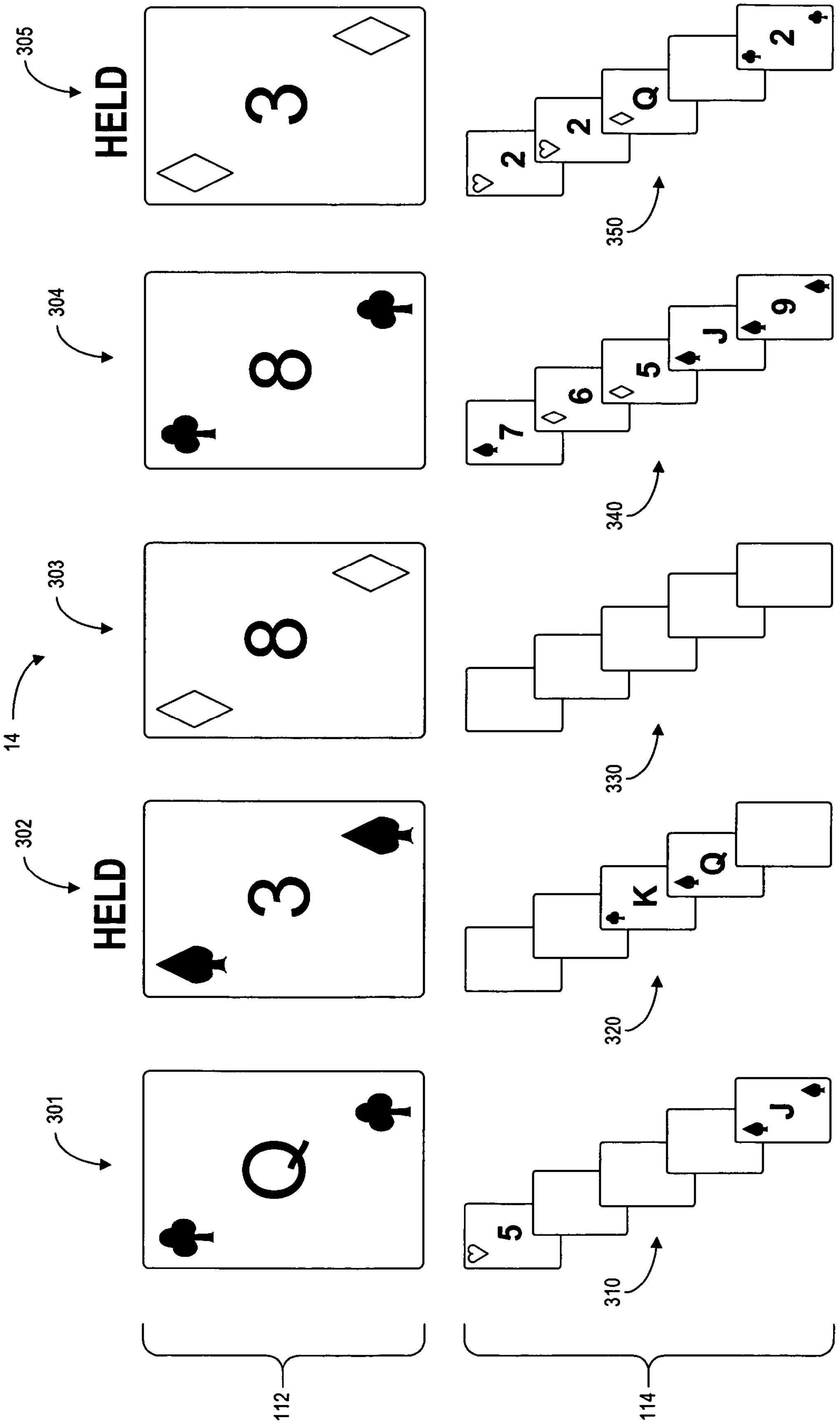

Referring to FIG. 18, a new primary poker hand 112 is dealt, which shows that the player has drawn two pairs, i.e., a pair of threes (3s and 3d) and a pair of eights (8d and 8c). With two pairs the player is guaranteed to receive a payout, e.g., six (6) coins if three (3) coins were wagered. However, the player may decide to try an alternative strategy by discarding the 8c into secondary poker hand 340, thus taking the chance that it will replace the Js. If the player executes this strategy, it may result in a straight and, therefore, a higher payout of ten (10) coins. Those skilled in the art will recognize that the player has a one-in-five chance of obtaining the straight. In this example, the player chooses the alternative strategy by holding the 3s and 3d in card positions 302 and 305, respectively, of primary poker hand 112. The Qc, 8d, and 8c in card positions 301, 303, and 304 are discarded.

Figure 19:
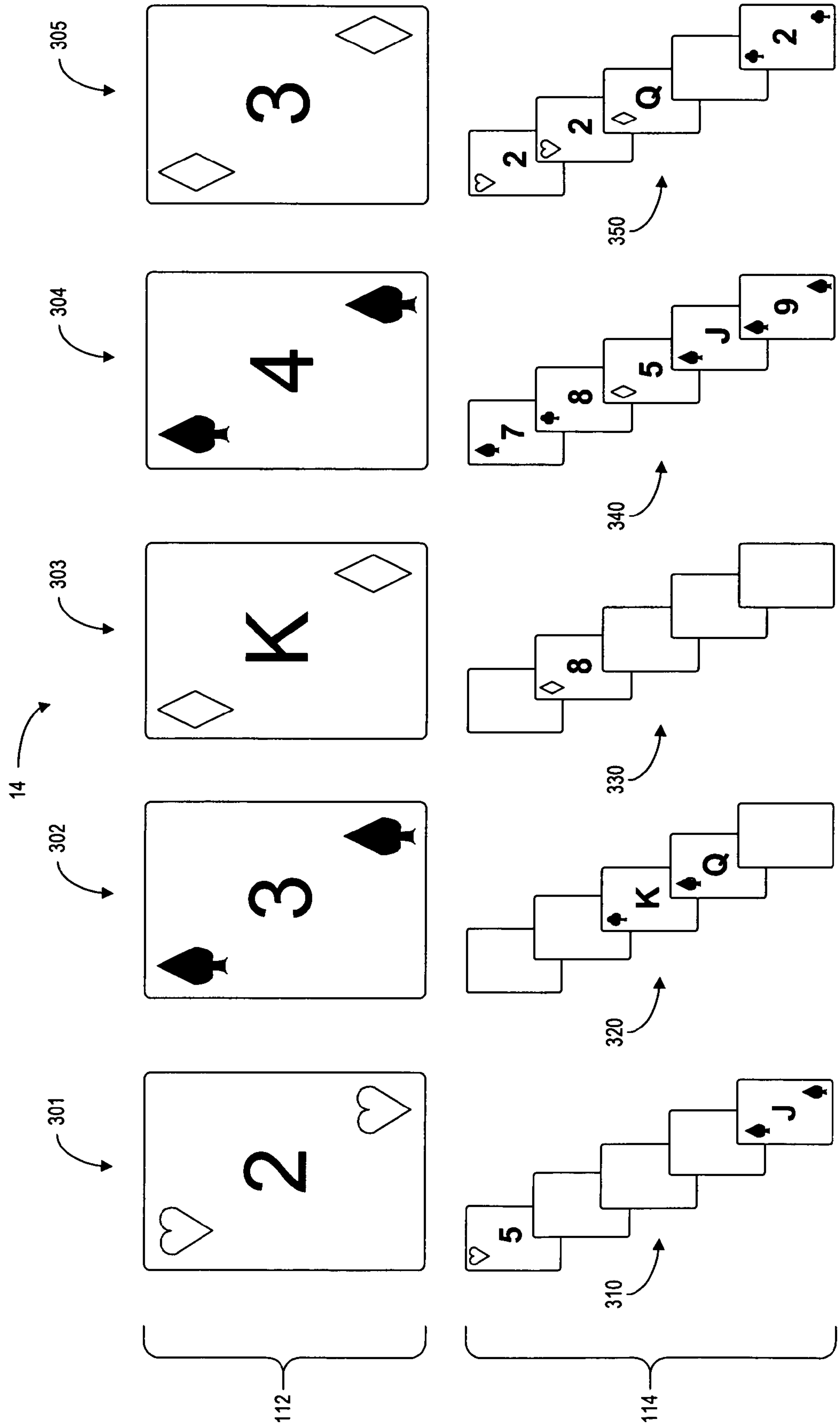

Referring now to FIG. 19, upon actuating the appropriate hold control buttons 34 and draw control button 36, the Qc, 8d, and 8c are discarded into random positions of secondary poker hands 310, 330, and 340, respectively. Primary poker hand 112 is again populated, replacing the cards that were discarded therefrom with the 2h, Kd, and 4s in card positions 301, 303, and 304, respectively. Much to the player's chagrin, the 8c did not replace the Js as desired, but instead replaced the 6d. With the primary poker hand 112 completed, the payout is determined. There is no payout for primary poker hand 112 and there is no payout for any of the secondary poker hands 114. It is readily apparent that the player gave up the "guaranteed" payout in primary poker hand 112 to take a chance on a straight in secondary poker hand 340.

Another embodiment comprises subsequent derivative poker hands, for example a third or even a fourth level of poker hands that receive playing cards from the secondary and tertiary poker hands, respectively. For example, each secondary poker hand may have a third, or tertiary, poker hand which receives the cards discarded from the secondary poker hand. When a playing card in a secondary poker hand is replaced by a discard card from the primary poker hand, the replaced playing card is placed into one of the card positions in the tertiary poker hand. Similar to the examples provided above and illustrated in FIGS. 4 through 19, there may be a tertiary poker hand associated with each of the secondary poker hands. In addition, the playing cards discarded from each secondary poker hand may be randomly discarded into the associated tertiary poker hand. When, for example, the poker game includes tertiary poker hands, the secondary poker hand payout schedule 106 of payout schedule 32 (see FIG. 2) may apply to the tertiary poker hand in the same manner as it applies to the secondary poker hand as described above. Of course, other payout schemes may be used. Any playing cards replaced in a tertiary poker hand is either deleted or falls into a pile of cards on the bottom of the display. Alternatively, a further level of poker hands may be used in a similar manner as the tertiary poker hands. Yet another embodiment provides for extra bonuses in the event a winning hand is achieved in one hand of play or for achieving a winning hand in at least one secondary poker hand in a predefined number of sequential games.

Figure 20:
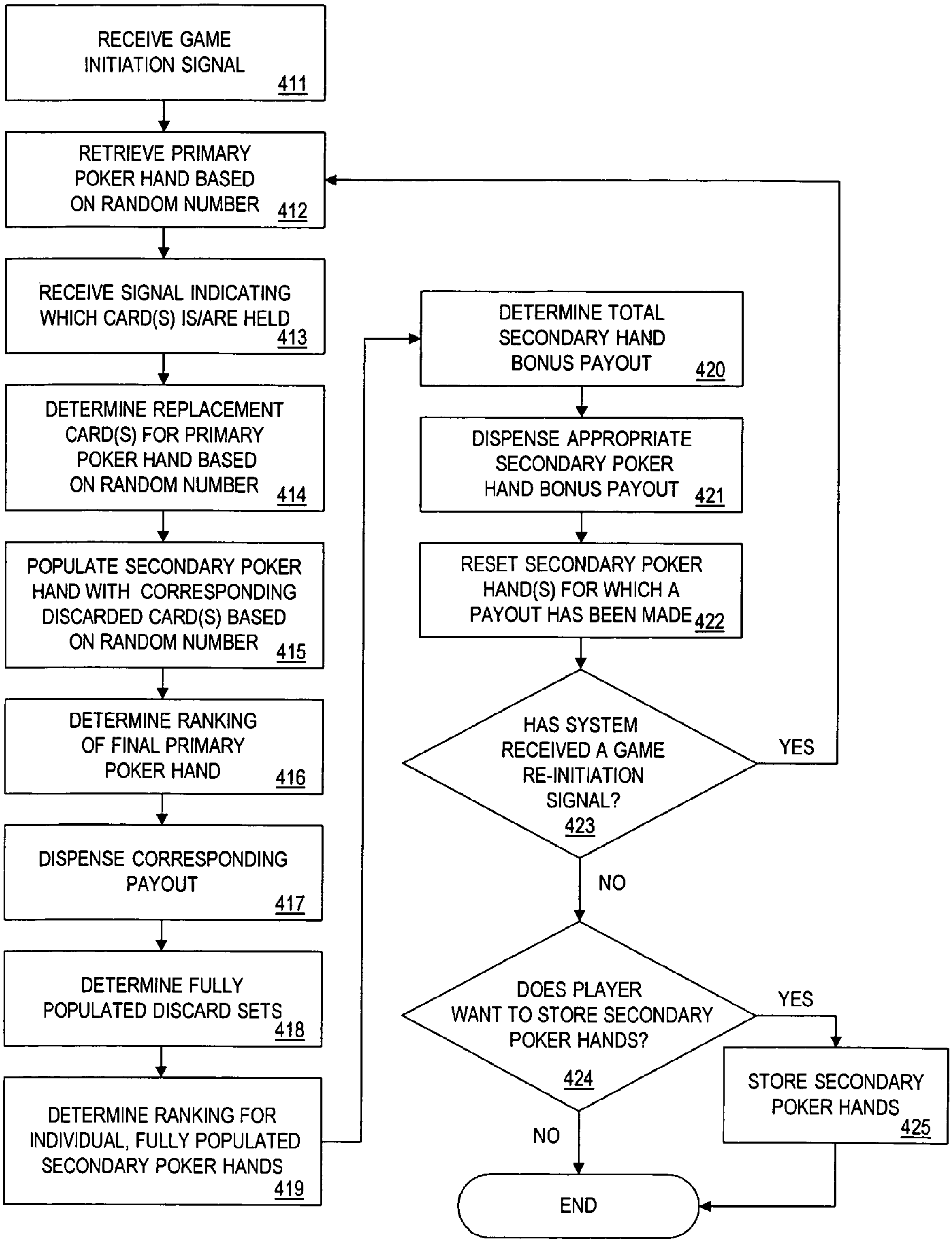
FIG. 20 is a flowchart depicting a process in accordance with an embodiment described herein.

Referring now to FIG. 20, a flowchart illustrates a process which functions according to an embodiment of the present invention. FIGS. 1 and 2 should be considered in conjunction with FIG. 20 for the description that follows. The process followed during a typical game play is controlled by program 30 and includes the step 411 of receiving a game initiation signal from starting controller 40. This occurs when a player inserts a coin into currency acceptor 28 or, alternatively, inserts a player tracking card into card reader 44 of player card interface 42 and actuates start button 41. Step 412 of the process includes generating a primary poker hand 112 by dealing playing cards from one or more decks of cards under the control of random number generator 16 and processor 12.

At step 413, the player's choice of cards in the primary poker hand 112 that are to be "held" is received, for example, when the player actuates one or more hold control buttons 34. The determination represents the player's discard strategy and signals processor 12 to move the cards not held, i.e., the discard cards, from the primary poker hand 112 to a temporary memory. Step 414 includes determining cards that are to replace those cards in the primary poker hand 112 that, as part of the discard strategy, were not held. At step 415, the cards that were placed in temporary memory are transferred into random positions of the associated secondary poker hands 114. More specifically, each card that is discarded from the primary poker hand 112 is placed in random position of a secondary poker hand that corresponds to the card position in primary poker hand 112. For example, a playing card discarded from card position 301 will be randomly placed in secondary poker hand 310, a playing card from card position 302, will be randomly placed in secondary poker hand 320, etc. (see FIG. 4.)

During step 416, the ranking of the final primary poker hand 112 is determined so as to establish the payout, based on payout schedule 32, due to the player. After the payout has been established, processor 12 signals hopper controller 24 to actuate hopper 26 for dispensing the proper number of coins or tokens into tray 110 for the player's receipt at step 417. Alternatively, processor 12 stores the payout in temporary memory and the player has the option of using these winnings as wagers in future game play.

At step 418, the processor 12 determines which secondary poker hands 114 are fully populated (e.g., which secondary poker hands have five (5) cards). During step 419, the ranking of each fully populated secondary poker hand (310 through 350) is determined so as to establish the payout due to the player for each hand based on payout schedule 32. After each payout has been established, the total secondary poker hand payout is determined in step 420 by summing all individual secondary poker hand 114 payouts. Similar to payouts based on the primary poker hand 112, processor 12 signals hopper controller 24 to actuate hopper 26 for dispensing the proper number of coins or tokens into tray 110 for the player's receipt at step 420. Alternatively, processor 12 may store the payout in temporary memory and the player has the option of using these winnings as wagers in future game play.

At step 421, processor 12 resets (i.e., removes) the secondary poker hands for which a payout has been made in preparation for a new game. At step 423, the player has the option of continuing or discontinuing game play. The player continues game play by depositing the number of coins representing his wager or, if he has sufficient credits earned from earlier game play, transferring a wager from temporary memory through, for example, the actuation of start button 41. Thereafter, the player is returned to step 412 and is dealt a new primary poker hand of playing cards.

If the player chooses not to continue game play, processing proceeds to step 424 to give the player the option to store all secondary poker hands 114. If the player chooses the option to store the secondary poker hands 114, the secondary poker hands are stored at step 425. The secondary poker hands 114 can be stored, for example, onto a player tracking card or the data storage device 22. This option allows the player to resume game play at a later time, such as after the player has had time to rest or eat a meal.

Figure 21:
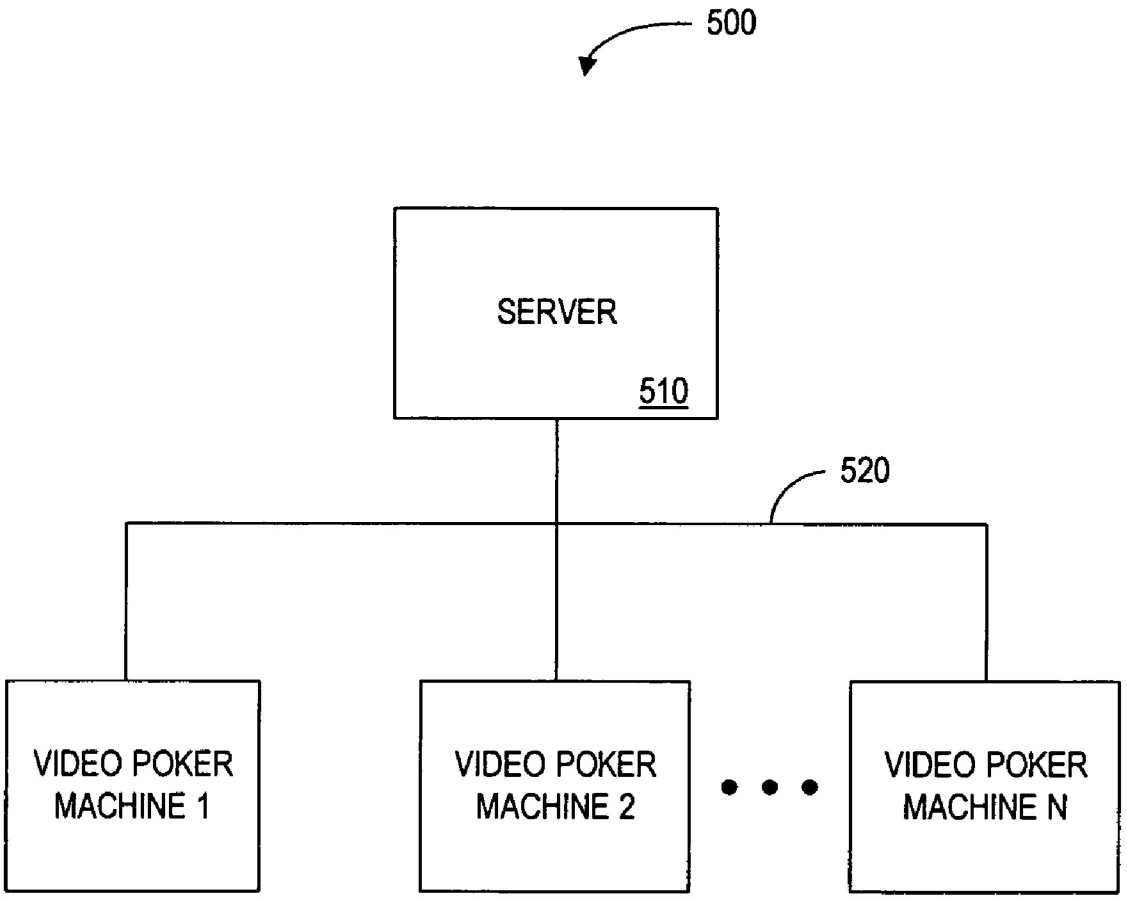
FIG. 21 is a schematic representation of a computer network configured in accordance with an embodiment described herein.

Referring to FIG. 21, another embodiment of the present invention is schematically shown to include a gaming network 500 which comprises a network server 510 interconnected with a plurality of video poker machines through their network servers 50 (see FIG. 1). Network server 510 comprises a commercially available computer server, such as an IBM RS 6000 or the like. A data communications system 520, which may take the form of a local or wide area network, links the video poker machines to the server. Those skilled in the art will readily appreciate that the precise type of network is not of import and that the network may be wired or wireless. Server 510 allows central processing and storage of data related to the operation of each video poker machine. For example, instead of including a player card interface 42 on each video poker machine for storing a player's secondary poker hands 114 as described hereinabove, the player's secondary poker hands 114 may be stored in the network server 510 under a file name that identifies the player. When storing a player's secondary poker hands 114, the data may be stored in a specific database or under a player identifier, such as the code stored on the player's player tracking card, that is dedicated to that particular player. In this way, the stored data is readily retrievable for use by the player at a later time.

It is envisioned that the gaming network 500 can be expanded so that all or some of the data manipulation that is normally carried out by the video poker machine 100 is carried out by the network server 510, for example, data processing, random number generation, and data storage. In addition, instead of including currency handling devices 23, a player can be given credits by the casino that are deductible from the player's account stored in the memory of server 510. Such an embodiment can utilize more simplified video poker machines that include only the basic components necessary for game play, e.g., display 14, starting controller 40, player controls 18, network interface 50, and a minimal amount of processing power and memory.

It is further envisioned that expanded gaming services can be incorporated through the use of gaming network 500 which would provide greater convenience for players and larger profits for casinos. For example, network server 510 can include individualized player payout schedules, player gaming attribute variations, and player activity tracking.

It is clear from the foregoing disclosure, that the present inventive system and method for playing video poker engages a player during game play. In addition, the system and method encourages a high amount of game play while at the same time maintains acceptable payback percentages. Further, the system and method enables players to develop a variety of gaming strategies so as to generate more interesting and exciting playing action.

Of course, other systems and methods for enabling players to develop a variety of gaming strategies and/or encourage extended play sessions may be implemented. In one embodiment, a card game may be provided such that play of a primary game causes deactivation of cards in a secondary game.

For example, in accordance with one embodiment a method may provide for outputting at least one card comprising an initial hand of a primary card game and outputting at least one plurality of cards associated with at least one payout, wherein each card of the at least one plurality of cards is active, thereby outputting at least one initial set of secondary cards for a secondary card game. The method may further provide for facilitating play of the primary card game for a duration of a play session, wherein play of the primary card game causes, in accordance with at least one rule, deactivation of at least one card included in the at least one initial set of secondary cards. The method may further provide for determining an end of the play session and determining the cards, if any, of the at least one initial set of secondary cards that remain active at the end of the play session, thereby determining at least one final set of secondary cards. The method may further provide for determining at least one payout associated with the at least one final set of secondary cards, thereby determining at least one final payout for the secondary card game, and causing the at least one final payout to be provided.

In one embodiment, an active card may comprise a card that is taken into account in determining whether a set of cards in which the card is included corresponds to a payout. Deactivation of a card may comprise causing the card to become an inactive card. An inactive card may comprises a card that is not taken into account in determining whether a set of cards in which the card is included corresponds to a payout.

To illustrate one particular implementation of the above embodiment, assume a player playing a primary and secondary game in accordance with embodiments of the present invention is dealt a primary poker hand consisting of five cards as well as five winning poker hands referred to as bonus hands. Each of the five bonus hands correspond to a payout. For example, one of the bonus hands may be a royal flush, one may be a flush, one may be a full house, one may be a straight flush, and one may be four of a kind. As the player plays the primary game by indiciating which cards to hold (and thus to discard) from the initial hand dealt, drawing replacement cards for the discarded cards to determine the final hand, and being dealt a subsequent initial hand for the next game play, one or more cards from one or more of the bonus hands may be eliminated or deactivated in accordance with rules of the game. For example, if the rules for the game provide for eliminating or deactivating a card from a bonus hand if a matching card (e.g., a card of the same suit and rank) is dealt for an initial hand of the primary game, the processor of the video poker device being played may analyze the bonus hands and the cards dealt for each initial hand during the play session to determine whether there are any matching cards and, if there are, may deactivate or eliminate those matching cards from the bonus hands. At the end of the play session, the processor may determine which cards remain active (or remain present) in each bonus hand. The processor may further determine, for each bonus hand, whether the cards remaining active or present correspond to a payout (e.g., based on a bonus payout schedule for the bonus hands or based on the regular payout schedule for the primary card game). The processor may then cause any such payouts to be provided to the player.

A “play session”, “playing session”, “game session”, “gaming session”, and “gambling session”, as the terms are interchangeably used herein, is a gambling event with a beginning and end that may encompass one or more game plays. The end of the session may be determined voluntarily (e.g., in which the player elects to stop play) or involuntarily (e.g., in which a gaming device or dealer terminates play). In some embodiments, a play session may be associated with a particular cashless gaming ticket or a particular player tracking card. For example, an associated play session may begin when a player inserts a particular cashless gaming ticket or player tracking card into a gaming device (or presents such to a dealer), and end when the player cashes out and/or removes the player tracking card.

In one embodiment, a play session may span a single game play of the primary card game. In another embodiment, the play session spans a plurality of game plays of the primary card game.

A “game play”, “play” or “handle pull”, as the terms are interchangeably used herein unless specified otherwise, is a play of a game (e.g., at a gaming device) that generates a singular, corresponding outcome (e.g., a player pulls the handle of a slot machine and the reels resolve to “Bar-Bar-Bar” or a player discards cards from, and thus draws cards to, an initial hand of video poker to obtain a final hand of “As-Ks-Qs-Js-10s). In one embodiment, a player wagers a number of credits in accordance with each game play (or a number of credits are wagered on behalf of the player for each game play). In some embodiments, one or more game plays may be associated with a particular cashless gaming ticket and/or a particular player identifier (e.g., via a player tracking card associated with the game play).

Figure 22A:
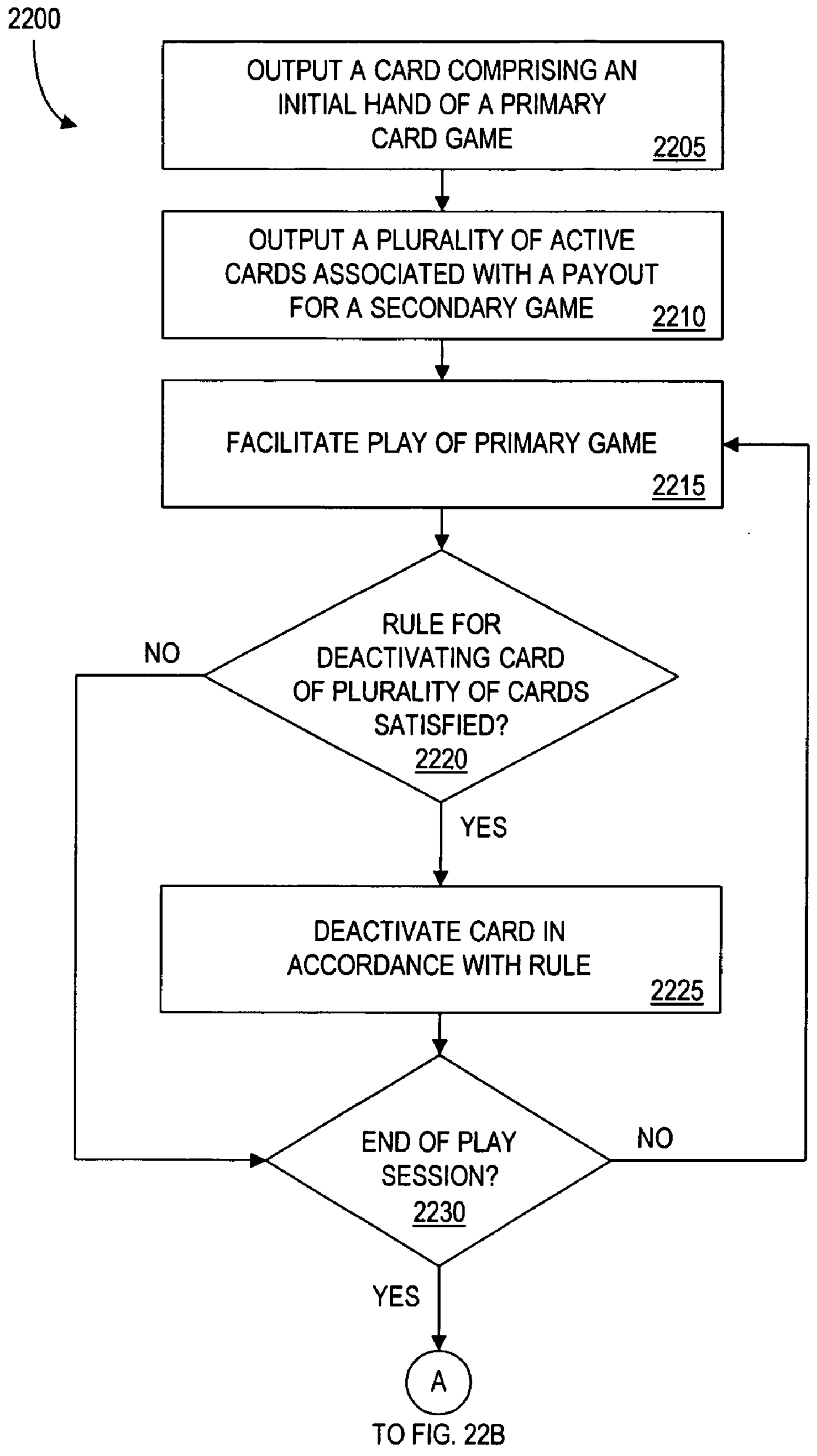
FIGS. 22A and 22B together are a flowchart depicting a process in accordance with an embodiment described herein.

Referring now to FIG. 22, illustrated therein is a flowchart depicting a process 2200 in accordance with at least one embodiment. The process 2200 is a process for facilitating play of a secondary game in accordance with an embodiment in which play of a primary game causes deactivation of one or more cards in the secondary game. The process 2200 may be performed, for example, by a gaming device, a server in communication with a gaming device, another computing device, a dealer, or a combination thereof.

For example, as described herein, in one embodiment a controller may be in communication with one or more gaming devices in a manner known in the art. Further, in an embodiment the controller may comprise two distinct computers or servers, such as a first server that manages player-related functionality (e.g., managing comp points, identifying players by their player tracking cards) and a second server that manages game-related functionality (e.g., providing random numbers, providing game software, executing instructions for directing game play). A controller may include a processor in communication with a set of known components, such as a clock, communications port, input and output device(s), and a storage device that stores a program and databases. Thus, in one or more embodiments, one or more of the steps of process 2200 (or any other process described herein) may be performed at least partially by a controller.

In one embodiment, a gaming device may be used to implement one or more steps of process 2200 (or one or more steps of any other process described herein). Such a gaming device may be implemented as a system controller, a dedicated hardware circuit, an appropriately programmed general-purpose computer, or any other equivalent electronic, mechanical or electro-mechanical device. The gaming device may comprise, for example, a slot machine, a video poker machine, a video blackjack machine, a video keno machine, a video lottery machine, a pachinko machine or a table-top game (e.g., blackjack played at a gaming table with a dealer).

In various embodiments, a gaming device may comprise, for example, a personal computer (e.g., which communicates with an online casino Web site), a telephone (e.g., to communicate with an automated sports book that provides gaming services), or a portable handheld gaming device (e.g., a PDA). The gaming device may comprise any or all of the gaming devices of the aforementioned systems. In some embodiments, a user device such as a PDA or cell phone may be used in place of, or in addition to, some or all of the gaming device components. For example, in one or more embodiments, a set of secondary cards or information associated with a set of secondary cards may be output to a player via a PDA or cell phone associated with the player. Further, a gaming device may comprise a personal computer or other device operable to communicate with an online casino and facilitate game play at the online casino. In one or more embodiments, the gaming device may comprise a computing device operable to execute software that simulates play of a reeled slot machine game, video poker game, video blackjack game, video keno game, video roulette game, or lottery game.

As described above with reference to FIGS. 1 and 2, a gaming device according to an embodiment comprises a processor, such as one or more Intel® Pentium® processors. The processor is operable to communicate with a random number generator, which may be a component of the gaming device, the processor itself, or a remote device that is not a component of the gaming device. The random number generator, in accordance with at least one embodiment, may generate data representing random or pseudo-random values (referred to as "random numbers" herein). The random number generator may generate a random number, for example, every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout.

A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor may also be operable to communicate with an output device, which may be a component of gaming device. The output device may comprise one or more devices for outputting a benefit to a player of the gaming device. For example, in one embodiment the gaming device may provide coins and/or tokens to a player as a benefit. In such an embodiment the output device may comprise a hopper and hopper controller, for dispensing coins and/or tokens into a coin tray of the gaming device.

As described herein, in some embodiments the gaming device may provide a substrate (e.g., ticket, coupon, ticket or other document) upon which there is printed an indication of a benefit (e.g., a cashless gaming ticket that has printed thereon a monetary value redeemable for cash or gaming credits; a cashless gaming coupon, which when combined with a cashless gaming ticket, provides the bearer with a benefit such as promotional credits). In such an embodiment, the output device may comprise a substrate printing and dispensing mechanism. An exemplary substrate, manufactured by Slot-Tickets™ of Memphis, Tenn., is a paper ticket measuring approximately 2.5" by 6". In one embodiment, such a substrate may store an indication of information associated with a secondary game (e.g., a number of "undo" indicia associated with a secondary game, as described in more detail below). In one embodiment, the substrate may include an indication of the status of a secondary game (e.g., an indication of which cards remained active and which cards were deactivated in one or more sets of secondary cards at a time a player terminated a play session).

In some embodiments, a gaming device may comprise or otherwise communicate with an input/output device. Such a "ticket-in/ticket-out" device may be capable of both printing and receiving cashless gaming tickets. Input/output devices may also be operable to perform various accounting functions (e.g., ticket validation and redemption). For example, both a gaming device and a personal computer maintained at a cashier cage may communicate with a central ticket validation server. One example of such ticket-in/ticket-out technology, the EZ Pay™ system, is manufactured by International Gaming Technology, headquartered in Reno, Nev.

In one embodiment, a ticket database may be stored (e.g., on the controller), and such a ticket database may be employed to track the value(s) of each of a plurality of cashless gaming tickets. For example, according to an embodiment, each ticket is denoted by a unique ticket identifier (e.g., a series of digits). Accordingly, a ticket database may include a plurality of records, each of which represents a cashless gaming ticket and each of which is identified by the corresponding unique ticket identifier.

In an embodiment of a ticket database each of a plurality of records can indicate (i) a unique ticket identifier, (ii) a value of the ticket, and/or (iii) whether the ticket has been redeemed. In accordance with various embodiments, each record may indicate a plurality of values of the ticket (e.g., in an embodiment where a ticket may be redeemed for more than one benefit). Each record may also indicate the value for which a ticket was redeemed.

In yet another example, the gaming device may provide electronic credits as a benefit (which, e.g., may be subsequently converted to coins and/or tokens and dispensed from a hopper into a coin tray). In such an embodiment the output device may comprise a credit meter balance and/or a processor that manages the amount of electronic credits that is indicated on a display of a credit meter balance. In yet another example, the gaming device may credit a monetary amount to a financial account associated with a player as a benefit provided to a player. The financial account may be, for example, a credit card account, a debit account, a charge account, a "smart card," a checking account, or a casino account (e.g., a "player account" accessible via a "player tracking card"). In such an embodiment the output device may comprise a device for communicating with a server on which the financial account is maintained. Note that, in one or more embodiments, the gaming device may include more than one output device. For example, the gaming device may include both a hopper and hopper controller combination and a credit meter balance; or, a hopper and hopper controller combination and a ticket-in/ticket-out device. Such a gaming device may be operable to provide more than one type of benefit to a player of the gaming device. A single output device may be operable to output more than one type of benefit. For example, an output device may be operable to increase the balance of credits in a credit meter and communicate with a remote device in order to increase the balance of a financial account associated with a player.

The processor is also operable to communicate with a display device, which may be a component of the gaming device. The display device may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device may comprise more than one display device. For example, a gaming device may comprise an LCD display for displaying electronic reels and a display area that displays rotating mechanical reels. In some embodiments, an LCD screen may perform both output and input functions (i.e. via "touch-screen" technology).

The processor may also be in communication with one or more other output devices besides the display device, for outputting information (e.g., to a player or another device). Such other one or more output devices may also be components of a gaming device. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming tickets and/or coupons), a product dispenser, an infrared port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device may comprise, for example, one or more display areas. For example, one of the display areas (e.g., a primary game screen) may display outcomes of primary card games played on the gaming device (e.g., electronic reels of a gaming device). Another of the display areas (e.g., a secondary game screen) may display rules for playing a game of the gaming device. Yet another of the display areas may display the benefits obtainable by playing a game of the gaming device (e.g., in the form of a payout table). Yet another of the display areas may display information associated with a secondary card game (e.g., one or more sets of secondary cards, payouts associated with the one or more sets of secondary cards, rules for playing the secondary game, etc.). In one or more embodiments, the gaming device may include more than one display device, one or more other output devices, or a combination thereof (e.g., two display devices and two audio speakers).

The processor may also be in communication with one or more input devices (devices that are capable of receiving an input, e.g., from a player or from another device). Such an input device may be a component of gaming device. An input device may communicate with or be part of another device (e.g., a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a ticket acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor may also be in communication with a payment system, which may be a component of the gaming device. The payment system is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e. coins or bills), and accordingly the payment system may comprise a coin or bill acceptor; (ii) receiving an alternate currency (e.g., a paper cashless gaming ticket, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

The processor may be in communication with a memory and a communications port (e.g., for communicating with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor.

The memory may store one or more databases including, for example, a probability database, a payout database, a play session database, a secondary game database, and/or a player database. Some or all of the data stored in each database is described herein by way of one or more example(s). The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

In an embodiment, in a probability database each of a plurality of possible random numbers (or other randomly generated output) is defined so as to correspond to an outcome (e.g., defined by three reel outcomes). Where appropriate, a prior art probability database may be utilized (modified or unmodified) in the performance of the processes described herein. A probability database may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. In one embodiment, the outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein.

In one embodiment, a memory may store a plurality of probability databases, each for determining different events. For example, a first probability database may be stored for determining outcomes of a primary card game (as described above), a second probability database may be stored for determining the cards to be included in a set of secondary cards, and a third database may be stored for determining whether an "undo" card (a concept described in detail below) or other benefit is to be provided to a player.

In an embodiment, in a payout database each of a plurality of possible outcomes can correspond to a payout. Where appropriate, a prior art payout database may be utilized (modified or unmodified) in the performance of the processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. In one embodiment, the outcomes are those obtained on a three-reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

In one embodiment, more than one payout database may be stored in memory. For example, a first payout database may be stored for determining payouts to be provided for outcomes of a primary card game and a second payout database may be stored for determining payouts for sets of secondary cards in a secondary card game. In one embodiment, a single payout database may be used to determined payouts for both the primary card game and the secondary card game.

Additionally, where appropriate, a player database may be utilized to store historical data associated with specific players. A player database may be used, for example, to store player wager data so that players wagering over a given threshold in a given amount of time may be rewarded for their patronage. The player database may also contain other information that may be useful in, for example, promoting and managing player behaviors (e.g., information about the player's outstanding debts, previous gaming activity, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor after receiving a "key" data point from the player, such as a unique identifier read from the player's player tracking card.

Note that, although these databases may be described as being stored in a gaming device, in other embodiments some or all of these databases (or copies thereof) may be partially or wholly stored in another device, such as one or more of the peripheral devices, the peripheral device server and/or the server computer. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the computer.

Referring now to process 2200, in step 2205 a card comprising an initial hand of a primary card game is output. For example, in a game of video poker, step 2205 may comprise outputting five cards face up. In another example, in a table game of blackjack, step 2205 may comprise outputting two cards face down. It should be noted that outputting cards may comprise outputting electronic or video representations of cards.

In one embodiment, the cards comprising the initial hand comprise cards dealt to a player of the primary game. In another embodiment, the cards comprising the initial hand may, alternately or additionally, comprise cards dealt to a dealer and/or opponent of a player playing the primary game.

In one embodiment, step 2205 may comprise determining the cards comprising the initial hand of the primary card game. For example, step 2205 may comprise determining on a random basis (e.g., via a random number generator, as is known in the art) a subset of cards from a deck of cards (e.g., from a standard deck of fifty two cards) to output as the card(s) comprising the initial hand of the primary game. In one embodiment, a card comprising an initial hand of the primary game may be determined in accordance with one or more rules (e.g., based on a player identifier associated with the play session, based on results of previous game plays, etc.).

In one embodiment, a time at which the card(s) comprising the intial hand is dealt is substantially the time of a beginning of a play session. In another embodiment, a play session may be considered to begin at another time. For example, a play session may begin when a player inserts a player tracking card, a cashless gaming ticket and/or requests to play a secondary game. As an example of the latter, in one embodiment a gaming device may be operable to play both in a conventional mode and a secondary game mode in which play of a primary game causes deactivation of cards in a secondary game. In one embodiment, a play session may begin upon an ending of a previous play session. For example, in one embodiment an end time for a play session is determined (a step described in more detail below). In one embodiment, a new play session may be determined to begin upon the determining of an end time of a previous play session.

In step 2210, a plurality of active cards associated with a payout are output for a secondary game. In other words, at least one initial set of secondary cards is output. It should be noted that the term "payout", as used herein unless specified otherwise, is a payout of a value greater than zero.

For example, step 2210 may comprise outputting four winning poker hands (e.g., four poker hands that each correspond to a respective payout under traditional rules of poker). In another embodiment, the active cards comprising the initial set of secondary cards may not be arranged into what would traditionally be recognized as a winning hand or hand of a rank that corresponds to a value or payout (e.g., a flush in poker). For example, all fifty two cards of a deck may be output in step 2210. In another example, a subset of the fifty two cards of a deck may be output (e.g., twenty cards may be output), without the cards being arranged into hands or organized into other subsets. In one embodiment, a player may be allowed (or required) to arrange the cards output in step 2210 into subsets (e.g., into hands of five cards each).

In one embodiment, the cards comprising the initial hand (output in step 2205) are output via a different display area than are the active cards comprising the initial set of secondary cards.

In one embodiment, step 2210 may comprise outputting the payout associated with the initial set of secondary cards. For example, if four winning hands are output in step 2210, step 2210 may further comprise outputting an indication of the respective payout associated with each of the winning hands (e.g., the first winning hand may be associated with a payout of ten credits, the second winning hand may be associated with a payout of five credits, the third winning hand may be associated with a payout of twenty credits, and the fourth winning hand may be associated with a payout of three credits). As described herein, play of the primary game may cause deactivation of one or more cards in one or more sets of cards output in step 2210. Thus, in accordance with one or more embodiments, as cards are deactivated in a set of cards for the secondary game (output in step 2210), the payout corresponding to the set of cards may decrease. In other words, in one or more embodiments the process 2200 may be characterized as a process for facilitating a "survival" type game, in which at least one bonus hand corresponding to a relatively large bonus payout is output to a player playing a primary card game, in which game the player attempts to "survive" one or more game plays of the primary game without having any cards of the bonus hand deactivated because if any cards of the bonus hand are deactivated the corresponding payout for that bonus hand will be decreased or eliminated altogether. In one embodiment, the more cards of the bonus hand that are deactivated, the lower the corresponding payout may be.

It should be noted that in most embodiments a payout corresponding to a set of secondary cards is not available for provision (e.g., not available to be added to a credit meter balance or otherwise available for provision to a player) until the end of the play session. Thus, in most embodiments the payout associated with a set of secondary cards may be characterized as a potential payout until the end of the play session. At the end of the play session, the payout associated with the cards that remain active in a secondary set of cards is provided to the player associated with the play session and is thus the final payout associated with the secondary set of cards, the final payout being a payout that is actually provided to a player. Thus, in most embodiments the payout associated with the initial set of secondary cards is only provided to a player if all of the cards that are active in the initial set of secondary cards remain active at the end of the play session.

In one embodiment, a payout schedule for bonus hands or other configurations of the one or more sets of secondary cards output in step 2210 may be output to a player. Such a payout schedule may be referred to as a bonus payout schedule (e.g., to distinguish it from a payout schedule for payouts achieved for game plays of the primary card game). A bonus payout schedule may be output, for example, at the initiation of a play session. In one embodiment, a bonus payout schedule is output irrespective of whether a play session has been initiated or is in progress (e.g., to entice players to initiate a bonus session). It should be noted that, in one embodiment, a payout for a set of secondary cards is provided based on the same payout schedule as the payouts for game plays of the primary card game. Accordingly, the bonus payout schedule and the payout schedule for game plays of the primary card game may be the same payouts schedule.

In one embodiment, a first bonus payout schedule is made available to a first player while a second bonus payout schedule is made available to a second player. For example, the different bonus payout schedules may be made available based on an input from a player (e.g., a duration of a play session that a player initiates, an amount per game play that a player wagers or commits to wager, etc). In one embodiment, the bonus payout schedule made available to a player may be based on data associated with the player (e.g., player identifier, player gambling history, player status, etc.). In one embodiment, a player may qualify for a more favorable bonus payout schedule (e.g., one having relatively higher bonuses) by performing one or more qualifying activities.

In one embodiment, both of the following may be output: (i) a bonus schedule that allows a player to determine what bonuses are possible to achieve as a result of a play session and (ii) the particular bonuses currently corresponding to each set of secondary cards based on the cards currently active in each set.

It should be noted that, in accordance with one embodiment, a bonus or payout associated with a set of secondary cards may decrease based on factors other than, or in addition to, deactivation of cards in the set. For example, a payout may be decreased (e.g., a second payout that is less than the first payout may be associated with a set of secondary cards as a replacement for the first payout) upon an occurrence of one or more of the following: (i) a predetermined time (e.g., a time that is a predetermined duration of time after an initiation of a play session), (ii) play of a predetermined number of game plays of the primary game, and (iii) play of a predetermined number of qualifying game plays of the primary game (e.g., game plays that result in a payout of at least a predetermined magnitude or game plays that do not result in a payout of at least a predetermined magnitude).

In one embodiment, a bonus payout schedule may be based on points that a player accumulates as a result of a secondary game. For example, in one embodiment a player may earn points based on how many (and/or which) cards remain active in at least one set of secondary cards. The bonus payout schedule may provide for various amounts of credits to be output to the player, each amount corresponding to a different number of points or range of points that a player may earn.

In one embodiment, step 2210 may comprise determining the payout associated with a secondary set of cards for the secondary game. For example, step 2210 may comprise accessing a bonus payout schedule or other database or memory to determine the payout corresponding to a set of secondary cards based on the cards currently active in the secondary set of cards. In one embodiment, determining a payout associated with a secondary set of cards may be performed via random number generator. In one embodiment, determining a payout associated with a secondary set of cards may be performed using one or more calculations (e.g., based on the cards remaining in a deck, a desired house advantage, a wager amount, etc.). In one embodiment, determining a payout associated with a secondary set of cards may be based on data associated with a player associated with the secondary set of cards. For example, a player with a gambling history found desirable by a casino or who is associated with a favorable status may be provided with a higher possible payout for a particular set of secondary cards than a player with a less desirable gambling history or a less favorable status.

In one embodiment, step 2210 may comprise determining the cards to output as the active cards for the secondary game. Such a determination may comprise, for example, determining the cards via a random number generator. In another embodiment, such a determination may comprise determining the cards based on one or more rules for determining initial sets of secondary cards. For example, a video poker gaming device may be programmed to always (or under particular circumstances) begin a play session with one or more particular types of winning bonus hands (e.g., a royal flush, a flush, a full house, and a two pair). In one or more embodiments, determining the cards for an initial set of secondary cards may be based on data associated with a player who is associated with a play session. For example, the determination may be based on a player identifier, player gambling history (e.g., cards previously dealt to a player, gambling decisions previously made by the player) and/or player preferences. In one or more embodiments, determining the cards for an initial set of secondary cards may be based on an input from a player (e.g., a player may request particular cards, a player may indicate a number of game plays to be included in a play session, a player may indicate a wager per game play, etc.).

In one embodiment, step 2210 may comprise determining the number of cards to output as active cards for an initial set of secondary cards. For example, in one embodiment the number of cards comprising an initial set of secondary cards may vary from one play session to another. A determination of the number of cards to be included in an initial set of secondary cards may comprise, for example, determining the number of cards via a random number generator. In another embodiment, such a determination may comprise determining the number of cards based on one or more operator or manufacturer-specifed rules for determining initial sets of secondary cards. For example, a video poker gaming device may be programmed to always (or under particular circumstances) begin a play session with a particular number of cards comprising an initial set of secondary cards. In one or more embodiments, determining the number of cards for an initial set of secondary cards may be based on data associated with a player who is associated with a play session. For example, the determination may be based on a player identifier, player gambling history and/or player preferences. In one or more embodiments, determining the number of cards for an initial set of secondary cards may be based on an input from a player (e.g., a player may request a particular number of cards, a player may indicate a number of game plays to be included in a play session, a player may indicate a wager per game play, etc.).

In one embodiment, step 2210 may comprise determining a number of initial sets of secondary cards. Such a determination may comprise, for example, determining the number of sets via a random number generator. In another embodiment, such a determination may comprise determining the number of sets based on one or more rules for determining initial sets of secondary cards. For example, a video poker gaming device may be programmed to always (or under particular circumstances) begin a play session with a particular number of sets of secondary cards. In one or more embodiments, determining the number of initial sets of secondary cards may be based on data associated with a player who is associated with a play session. For example, the determination may be based on a player identifier, player gambling history and/or player preferences. In one or more embodiments, determining the number of initial sets of secondary cards may be based on an input from a player (e.g., a player may request a particular number of cards, a player may indicate a number of game plays to be included in a play session, a player may indicate a wager per game play, etc.).

In one embodiment, the card(s) comprising the initial hand (output in step 2205) and the plurality of active cards for the secondary game (output in step 2210) are selected from the same deck of cards (e.g., a standard deck of fifty two cards). In another embodiment, the card(s) comprising the initial hand are selected from a first deck of cards while the plurality of active cards for the secondary game are selected from one or more decks of cards that are different from the first deck of cards. For example, in an embodiment in which the plurality of active cards are output as two or more winning hands (e.g., hands of a rank that traditionally corresponds to a value or payout), the cards for the first winning hand of the two or more winning hands may be selected from a deck of cards that is different from a deck of cards from which the cards comprising the initial hand of the primary game are selected. Similarly, the cards for the second winning hand of the two or more winning hands may be selected from a deck of cards that is both different from the deck from which the cards comprising the initial hand of the primary hand are selected and the deck from which the cards for the first winning hand are selected, and so on.

In step 2215, play of the primary game is facilitated. Facilitation of the primary card game may comprise facilitating play of the primary card game in accordance with conventional rules of the primary card game. For example, in a video poker card game, facilitating play of the primary card game may include determining which of the cards of an initial hand the player has selected to hold (thus determining which of the cards of the initial hand the player has selected to discard), removing the discarded cards from the initial hand, and providing replacement cards for the discarded cards.

In step 2220 it is determined whether a rule for deactivating a card of a secondary set of cards has been satisfied. For example, a gaming device may be programmed to deactivate cards from a secondary set of cards in accordance with one or more rules (e.g., stored in memory). In one embodiment, such a rule may specify that a card dealt to an initial hand of the primary card game causes deactivation of any matching card of the secondary set of cards. In another embodiment, a rule may specify that a card discarded from an initial hand of the primary card game causes deactivation of any matching card of the secondary set of cards. In yet another embodiment, a rule may specify that a card drawn to final hand of a primary card game causes deactivation of any matching card of the secondary set of cards. A "drawn" card, as the term is used herein unless specified otherwise, is a card output as a replacement card for a discarded card or a card otherwise output after an initial round of cards is dealt for a particular game play.

In one embodiment, a rule for deactivated cards in a secondary set of cards may be based on an identity of a player. For example, if certain data is associated with a player (e.g., the player has an associated status, associated gambling history, associated preferences, etc.), the rule may specify that under certain circumstances a card is not to be deactivated even if it otherwise would have been deactivated in accordance with the rule. Other rules in accordance with which cards in a secondary set of cards may be deactivated are described herein.

It should be noted that a matching card may comprise one or more of: (i) a card having a suit that is a suit of a card in a set of secondary cards; (ii) a card having a rank that is a rank of a card in a set of secondary cards; (iii) a card having a symbol that is a symbol of a card in a set of secondary cards; (iv) a card having a value that is a value of a card in a set of secondary cards; and/or (v) a card dealt to a location that corresponds to a location of a card in a set of secondary cards. As an example of (v), a card discarded from the third position of a primary hand may cause deactivation of the card in the third position of each set of secondary cards.

Returning now to process 2200, if it is determined in step 2220 that a rule for deactivating a card in a secondary set of cards has been satisfied, the process 2200 continues to step 2225, in which a card in a secondary set of cards is deactivated in accordance with the rules that was determined to be satisfied. Otherwise, the process 2200 proceeds to step 2230.

In one embodiment, deactivation of a card included in an initial set of secondary cards may comprise removal of the card from the initial set of secondary cards (e.g., the deactivated card may no longer be displayed in a display area in which the initial set of secondary cards are being displayed).

In one embodiment, deactivation of a card included in an initial set of secondary cards may comprise altering an appearance of the card. For example, the card being deactivated may be greyed out or shaded. In another example, a marking or message may be output to indicate that the card has been deactivated (e.g., an "X" may be placed on the card or the words "deactivated" may appear on the card). In another example, the card being deactivated may be placed face down or the rendering of it may be changed such that it appears to be face down. In yet another example, the card being deactivated may be changed to a different color or a background of the card may be changed to a different color. In yet another example, the card being deactivated may cease to be backlit or otherwise emphasized (e.g., only a dotted outline of the card appears).

As described herein, in one embodiment a plurality of secondary sets of cards may be output in step 2210. For example, a plurality of winning bonus hands may be output in step 2210. Thus, in one embodiment it may be determined that the rule for deactivating at least one card included in a set of secondary cards has been satisfied and it may further be determined that, in accordance with the rule, either or both of the following may be deactivated: (i) a card included in a first set of secondary cards, and (ii) a card included in a second set of secondary cards. For example, assume a rule specifies that any card of a secondary set of cards that matches a card dealt in a game play of the primary game is to be deactivated. Further assume that two sets of secondary cards were output in step 2210. Further assume that each of the two sets of secondary cards was dealt from a different deck and that both of these decks were different from a deck from which the cards of the primary game are dealt. Under such circumstances it is possible for a card dealt in a game play of the primary game to match both a card included in the first set of secondary cards and a card included in the second set of secondary cards.

Thus, in one or more embodiments, process 2200 may include determining whether the matching card included in the first set of secondary cards is to be deactivated, the matching card included in the second set of secondary cards is to be deactivated, or both matching cards are to be deactivated. In one embodiment, both cards may always be deactivated. In another embodiment, a determination of whether one or both cards are to be deactivated may be based on a player identifier or other data (e.g., a player of a more preferred status may only have one of the cards deactivated while a player of a less preferred status may have both cards deactivated), data associated with the play session (e.g., an amount the player prepaid for the play session, whether the player is wagering the maximum amount for each game play, etc.), and so on. If only one of the cards is to be deactivated, a determination of which card to deactivate may be based on, for example, (i) a random number, (ii) a player selection, or (iii) a rule specifying how such a determination is to be made. Examples of the latter may include, but are not limited to, the following: (i) selecting the set of secondary cards that currently corresponds to the highest value or payout, (ii) selecting the set of secondary cards that currently corresponds to the lowest value or payout, (iii) selecting the set of secondary cards that will have the greatest decrease in corresponding value or payout as a result of the deactivation, (iv) selecting the set of secondary cards that will have the least decrease in corresponding value or payout as a result of the deactivation, (v) selecting the set of secondary cards that has an associated designation or lacks an associated designation (e.g., is not designated as a "safe" set of secondary cards, a concept that is explained in more detail below), (vi) selecting a set of secondary cards based on position (e.g, left-to-right and/or top-to-bottom), and/or (vii) selecting a set of secondary cards based on association with a card position of a primary hand, and so on.

In one embodiment, a particular set of secondary cards may be associated with a particular position of a primary hand. For example, each of the five positions of a poker hand in a primary card game may have associated therewith a respective set of secondary cards. A set of secondary cards being associated with a particular position of a primary poker hand may, in one or more embodiments, mean that any card dealt or drawn to the position (or discarded from the position, depending on the rules of the game being played) causes deactivation of a card only in the set of secondary cards associated with the position and not in any other set of secondary cards. In one embodiment, a player may select which set of secondary cards is associated with which position. In another embodiment, such an association may be made on behalf of the player. For example, such an association may be made by a processor of a video poker device or by a dealer (e.g., on a random basis or based on one or more predetermined rules).

In step 2230, it is determined whether an end of the current play session has been achieved. In one embodiment a play session may be terminated in accordance with one or more rules for terminating a play session (e.g., in one embodiment an end of a play session may be determined to occur upon the satisfaction of one or more conditions for terminating a play session). For example, a play session may span a duration of a predetermined number of game plays of the primary card game and/or a predetermined amount of time from a time at which the play session began. Thus, a termination a play session may be determined to occur upon the completion of the final allowed game play for the play session and/or upon the occurrence of a time that is a predetermined period of time from a beginning time of the play session.

In one embodiment, one or more events associated with a game play and/or play session may cause termination of the play session. For example, one or more events associated with one or more sets of secondary cards may cause termination of a play session. For example, if all (or a number exceeding a threshold) cards of all (or a number exceeding a threshold) sets of secondary cards become deactivated, the session may be terminated. In another example, if no set of secondary cards corresponds to a payout (e.g., the cards remaining active in each of the at least one set of secondary cards do not correspond to any payout), the play session may be terminated.

In one embodiment, a play session may be terminated upon determining that a predetermined number of qualifying events have occurred during play of the primary game. For example, one or more of the following may cause termination of a play session: (i) a predetermined number (e.g., one) of qualifying outcomes occurring during play of the primary card game; (ii) a sum of payouts achieved during game plays of the play session exceeding a predetermined threshold, (iii) a threshold number of cards have been deactivated or eliminated from one or more sets of secondary cards, (iv) a threshold number of cards having been eliminated from one or more sets of secondary cards such that a corresponding bonus payout has been reduced to zero, etc. A qualifying outcome may comprise, for example, an outcome that corresponds to a payout, an outcome that corresponds to a payout of a minimum magnitude and/or an outcome that includes one or more predetermined game indicia.

In yet other embodiments, a credit meter balance being equal to or less than a predetermined amount (e.g., at zero or less than a minimum wager amount), may cause termination of a play session. In one embodiment, a player action (e.g., request to cash out, request to terminate a play session, withdrawal of a player tracking card) may cause a play session to be terminated.

It should be noted that in some embodiments, the satisfaction of any one of two or more conditions may cause termination of a play session. For example, a play session may be terminated upon either (i) the completion of twenty game plays of the primary game; or (ii) the win of a payout of 1,000 credits or more as a result of a game play of the primary game.

Figure 22B:
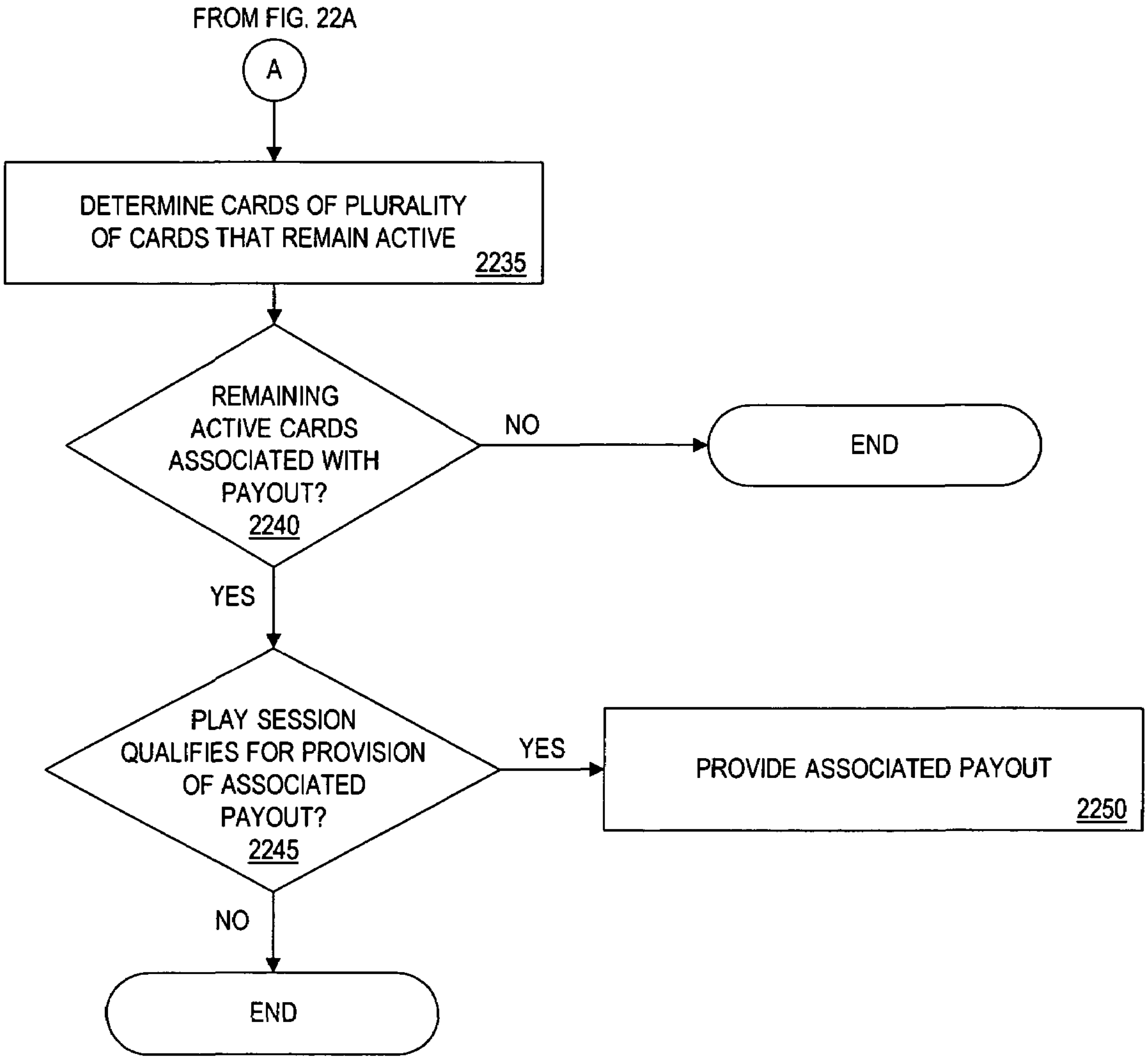

If an end of the play session is not determined in step 2230 (e.g., none of the conditions for terminating a play session have been satisfied), the process 2200 returns to step 2215, in which play of the primary card game is facilitated. If an end of the play session is determined in step 2230, the process 2230 continues to step 2235 (FIG. 22B).

In step 2235 it is determined which cards of each set of secondary cards remain active at the end of the play session. In other words, it is determined which cards of the active cards output in step 2210 have not been deactivated based on play of the primary card game.

It should be noted that, in one embodiment, a database may be used to track active cards comprising each set of secondary cards output in step 2210 as well as the deactivation of any of the cards during the play session. For example, in one embodiment a record in a database may be opened upon an initiation of a play session (e.g., the play session may be assigned a unique identifier that may serve as a primary key for the database). The record may store an indication of one or more of the following: (i) a number of sets of secondary cards output in step 2210, (ii) the one or more cards comprising each set, (iii) an indication of whether each respective card of a set is currently active or inactive (e.g., when initially output, all cards of each set will be active), and (iv) an indication of a payout currently corresponding to the cards that are active in each respective set of secondary cards. Such a database record may be updated throughout a play session (e.g., the status of a card may be updated as it is changed, the payout corresponding to a set of secondary cards may be updated as it is changed based on which cards are currently active). Such a record of a play session may also store additional information such as, for example, one or more of (i) a player identifier of a player associated with the play session, (ii) a time at which the play session was initiated, (iii) a time at which the play session was terminated, (iv) any payouts provided to a player as a result of the play session, and (v) information about one or more game plays of the primary card game (e.g., an indication of cards dealt, discarded, drawn, used to deactivate cards in a secondary set of cards, wager amounts, etc.).

In one embodiment, a player may be allowed to save his progress in a secondary card game of a play session, for subsequent retrieval and continuation of the secondary card game. For example, the number of secondary sets of cards and the cards active in each set may be stored in association with a player identifier of the player. Thus, "termination" of a play session, as the term is used herein unless specified otherwise, includes permanently ending the play session, pausing the play session (e.g., indefinitely or for a specified or maximum period of time), suspending the play session, and interrupting the play session (e.g., to allow completion of a bonus round of a primary game play). In embodiments in which a player may store his progress in a play session, a record in a database (such as the record described in the preceding paragraph) may be used to store a player's progress in the play session, for subsequent retrieval and continuation of the play session.

In step 2240 it is determined whether a payout is currently associated with any set of secondary cards, based on the cards remaining active in each of the sets of secondary cards. If no payout is associated with any of the sets of secondary cards, the process 2200 ends. Otherwise, the process 2200 continues to step 2245.

In step 2245 it is determined whether the play session qualifies for provision of the one or more payouts currently associated with the respective sets of secondary cards. For example, in one embodiment even if a payout is associated with a secondary set of cards upon termination of a play session, the play session (or, in one embodiment, the player associated with the play session) may not qualify for provision of the payout.

In one embodiment, a player may not qualify to receive a payout currently corresponding to a set of secondary cards unless the play session is terminated as a result of one or more qualifying conditions. For example, the player may only qualify to receive the payout currently corresponding to a set of secondary cards if the player completes fifteen game plays of the primary game or wins a payout of a predetermined magnitude as a result of a game play of the primary game but not if the play session is terminated as a result of the player cashing out, requesting to terminate game play or running out of sufficient credits to keep playing the primary game.

It should be noted that in one or more embodiments it may not be possible for a player to run out of sufficient credits to play the primary game before a play session is concluded because a player may pre-pay for a play session and thus for a minimum or predetermined number of game plays or time. For example, in one embodiment a player may be required to provide sufficient funds at the initiation of a play session to ensure that the player can play the primary card game for a minimum number of game plays or for a minimum duration of time. The following commonly-owned U.S. Patents and U.S. Patent Applications describe various methods and systems via which a player may pre-pay for a plurality of game plays of a primary game, thereby purchasing a play session that may be terminated upon a satisfaction of a predetermined condition: (i) U.S. Pat. No. 6,077,163 to Walker et al, filed Jun. 23, 1997 as U.S. application Ser. No. 08/880,838 and issued on Jun. 20, 2000; (ii) U.S. Pat. No. 6,319,127 to Walker et al., filed on Mar. 3, 2000 as U.S. application Ser. No. 09/518,760 and issued on Nov. 20, 2001; (iii) U.S. patent application Ser. No. 10/001,089, filed Nov. 2, 2001 in the name of Walker et al.; (iv) U.S. patent application Ser. No. 10/636,520, filed Aug. 7, 2003 in the name of Walker et al.; (v) U.S. patent application Ser. No. 10/420,066, filed Apr. 21, 2003 in the name of Walker et al. Each of the above Patents and Patent Applications are incorporated by reference herein for all purposes.

In one embodiment, if a player pre-pays for a play session that comprises a plurality of game plays of the primary game, one or more of the plurality of game plays may be automatically played on the player's behalf, without the player having to initiate each individual game play. Further, in one or more embodiments, decisions required during a game play of the primary game that is initially initiated on behalf of the player may also be made on behalf of the player. For example, a determination as to which cards of an initial poker hand to hold and which to discard may be made on behalf of the player (e.g., on a random basis or based on one or more rules, such as in accordance with perfect play strategy). Commonly-owned U.S. patent application Ser. No. 10/331,438 filed Dec. 27, 2002 in the name of Walker et al. describes various systems and methods for initiating and playing, on behalf of a player, game plays of a play session purchased by a player. This Patent Application is hereby incorporated by reference herein for all purposes.

Returning to step 2245, if it is determined that the play session (or, in one embodiment, the player associated with the play session) qualifies, at the end of a play session, for provision of a payout associated with a secondary set of cards, the process continues to step 2250. Otherwise, the process 2200 ends.

In step 2250 the payout is provided. Providing a payout may comprise, for example, increasing a credit meter balance of a gaming device by the number of credits corresponding to the payout to be provided, causing a hopper controller to release a number of coins or tokens corresponding to the payout to be provided, outputting a cashless gaming receipt having a value corresponding to the payout to be provided, crediting an account associated with the player associated with the play session, etc. Many other manners of providing a payout would be recognized by one of ordinary skill in the art upon reading the present disclosure.

Of course, in one or more embodiments, a payout associated with a secondary set of cards may be provided even before termination of a play session. For example, a player may qualify to receive an "early payout" (i.e., a payout for a set of secondary hands before a play session is terminated) upon the occurrence of one or more qualifying conditions. Examples of such qualifying conditions include, but are not limited to, (i) obtaining a designated symbol or outcome in a game play of a primary game, (ii) performing or agreeing to perform one or more activities (e.g., committing to play at least two more play sessions or ten more game plays upon termination of the current play session), (iii) a current date being the player's birthday, and (iv) not achieving a payout or a payout of at least a predetermined magnitude in a game play of the primary game for a predetermined number of consecutive game plays of the primary card game, etc.

Although not described with reference to process 2200 (FIGS. 22A and 22B), a secondary game in accordance with embodiments of the present invention may provide for cards being added to a set of secondary cards after the set of secondary cards is first output (e.g., as in step 2210 of process 2200). For example, one or more rules for the secondary game play may provide for adding a card to a set of secondary cards upon the satisfaction of one or more conditions. Examples of such conditions include, but are not limited to, one or more of the following: (i) an obtainment of a designated symbol, payout, or outcome in a game play of a primary game, (ii) an obtainment of an outcome, payout or symbol at a gaming device associated with the gaming device on which the secondary game is being played, (iii) an instruction from another device and/or a casino employee, (iv) a random determination via a random number generator, and (v) an input from a player. Examples of inputs from a player include a particular decision made by a player (such as deciding to discard or hold a particular card), a payment from the player for a card to be added, request by the player to terminate the play session before its conclusion, etc. In accordance with one embodiment, any card dealt to a primary hand may be used to deactivate a matching card in a set of secondary cards while any card discarded from a primary hand may be used to reactivate a matching card in a set of secondary cards.

In one embodiment, the rule in accordance with which a card is to be added to a set of secondary cards is a rule based on an identity of a player associated with the play session. For example, a card may be added to a set of secondary cards if at least one predetermined condition is satisfied (e.g., the set of secondary cards otherwise does not correspond to a payout and/or the play session is less than half over, etc.) but only if the player's status is a predetermined status (e.g., high roller, frequent player, first time player, etc.). In another example, a card may be added to a set of secondary cards if at least one predetermined condition is satisfied and the current date is the player's birthday or another significant date associated with the player. In yet another example, a card may be added to a set of secondary cards if at least one predetermined condition is satisfied but only if the player has at least a predetermined number of comp points associated with the player's player tracking card. In one embodiment, a card may be added to a set of secondary cards based on the player's identity irrespective of whether any other conditions are satisfied.

In one embodiment, the rule in accordance with which a card is to be added to a set of secondary cards is a rule based on game play activity that occurs during the play session. For example, a card may be added to a set of secondary cards if a player on average plays less than perfect strategy or if the player on average plays perfect strategy. In another example, a card may be added to a set of secondary cards if a player wagers a maximum amount for each game play of the primary card game. In yet another example, a card may be added to a set of secondary cards if a player discards a particular card from a particular set of initial cards for a game play of the primary card game.

In one embodiment, a card that has been previously deactivated may be reactivated. Reactivation of a card may be caused by, for example, an occurrence of a predetermined symbol, outcome or payout during a game play of the primary card game. For example, if a designated symbol or group of symbols is obtained by a player as an outcome or part of an outcome of a game play it may cause the last card to have been deactivated to be reactivated. In one embodiment, reactivation of a card may be caused by an event during one or more game plays of the primary card game (e.g., based on one or more rules). For example, if a card dealt in a game play of a primary card game causes deactivation of a card included in a set of secondary cards subsequently becomes part of a final winning hand or a hand that corresponds to a payout of at least a predetermined magnitude, the card included in the secondary set of cards that had been deactivated may be reactivated as a result. In another similar example, if a card dealt in a game play of a primary card game causes the deactivation of a card included in a secondary set of cards does not subsequently become part of a winning hand or a hand that corresponds to a payout of at least a predetermined magnitude, the card included in the secondary set of cards may be reactivated as a result.

In one embodiment, reactivation of a card may be caused by an indication from a player. For example, a player may collect, obtain, win or be given one or more "undo" cards or other indicia (e.g., at the initiation of a play session, as a result of an outcome of a game play, as a comp by a casino employee, etc.). The player may then, at his discretion, choose when to use the "undo" card or other indicia to reactivate a card of a secondary set of cards that had been deactivated.

An "undo" card or other indicia is any indicia, in any form (whether tangible or intangible) that, when applied to a deactivated card of a secondary set of cards, causes reactivation of the card. In one embodiment, an "undo" card may be provided to a player in intangible electronic form (e.g., as a card, symbol or other indicia that is output in a designated display area of a gaming device via which the player is playing the secondary game). In another embodiment, an "undo" card or other indicia may be provided to a player in the form of a code (e.g., alphanumeric code that a player may enter into a gaming device via a keypad or a bar code that a player may enter into a gaming device via a bar code scanner). In embodiments in which the player chooses when and how to apply such an "undo" card or other indicia, the player may be allowed to select which deactivated card is to be reactivated via the "undo" card. In other embodiments in which a player chooses when and how to apply an "undo" card or other indicia, a deactivated card may be selected on a random basis or based on a rule (e.g., the last card to have been deactivated), on behalf of the player.

In one embodiment, a player may qualify to receive an "undo" card or other indicia by satisfying one or more conditions. For example, depositing at least a predetermined amount of funds into the gaming device, maintaining a credit balance greater than a predetermined amount, and/or maintaining a predetermined rate of play may qualify the player to receive (or continue to receive) an "undo" card and/or to maintain availability of the "undo" card for usage by the player.

In one embodiment, an "undo" card or other indicia is a single use card, such that it becomes unavailable to a player once used. In another embodiment, an "undo" card may be reused multiple times.

In one embodiment, an "undo" card or other indicia may be provided to a player at a time other than during a play session or upon initiation of a play session. For example, one or more "undo" cards or other indicia may be associated with a player identifier as a gift or bonus from a casino to a player in exchange for the player performing an activity the casino determines to be beneficial or for any reason deemed sufficient by the casino. In one embodiment, a player may win an "undo" card or other indicia while playing a game unrelated to the secondary card game and/or the primary card game.

In embodiments in which an "undo" card or other indicia is provided to a player, the number of "undo" cards or other indicia to be provided may need to be determined. For example, a number of such "undo" cards or other indicia may be provided to a player at the initiation of a play session. The number may be determined, for example, via a random number generator. In another embodiment, the number may be determined based on data associated with the player to whom the "undo" cards or other indicia are to be provided. For example, a player associated with a first status may be provided with a first number of "undo" cards or other indicia while a player associated with a second status may be provided with a second number of"undo" cards or other indicia. In one embodiment, the number may be determined based on game play activity. For example, a player who practices "perfect" game play strategy may be provided with a first number of "undo" cards or other indicia while a player who practices less than perfect game play may be provided with a second number of "undo" cards or other indicia. In another example, a player whose credit meter balance is close to zero, who requests a cashout prior to a conclusion of a play session, or who in the past has terminated a play session before its conclusion may be provided with a greater number of "undo" cards or other indicia than another player.

In one or more embodiments, a card position, card, suit of a card, rank of a card, set of secondary cards, and/or rank of a set of secondary cards may be associated with a designation of "safe". For example, a memory or database may be accessed to determine that at least one of a card position, card, suit of a card, rank of a card, set of secondary cards, and/or rank of a set of secondary cards is associated with a designation of "safe". Such a database may be stored, for example, in a memory of a gaming device on which the game is being played and/or in the memory of another device (e.g., a server device operable to communicate with the gaming device). In such embodiments, a determination of whether at least one of a card position, card, suit of a card, rank of a card, set of secondary cards, and/or rank of a set of secondary cards is associated with a designation of "safe" may be performed after it is determined that at least one rule for deactivating a card of a set of secondary cards has been satisfied. If it is determined that at least one of a card position, card, suit of cards, rank of cards, set of secondary cards, and/or rank of a set of secondary cards is associated with a designation of "safe", it may be determined that a card that would otherwise have been deactivated due to the rule having been satisfied will remain active.

Determining that a card position is a position designated as a safe position may comprise, for example, determining that a card located in the safe position cannot be deactivated even if at least one rule for deactivating a card of a set of secondary cards (that would have otherwise caused deactivation of a card in the position) has been satisfied. Determining that a particular card has been designated as a safe card may comprise, for example, determining that the card cannot be deactivated even if a rule for deactivating a card of a set of secondary cards (that would have otherwise caused deactivation of the card) has been satisfied. Determining that a particular suit of cards is a suit designated as a safe suit may comprise, for example, determining that any card having the safe suit cannot be deactivated even if a rule for deactivating cards of a set of secondary cards has been satisfied. Determining that the particular rank is a rank designated as a safe rank may comprise, for example, determining that a card having the safe rank cannot be deactivated even if a rule for deactivating the card has been satisfied. Determining that a particular set of secondary cards has been designated as a safe set may comprise, for example, determining that a card in the particular set of secondary cards cannot be deactivated even if a rule for deactivating the card has been satisfied. Determining that a rank of a set of secondary cards has been designated as safe may comprise, for example, determining that a card included in a set of secondary cards having the rank cannot be deactivated even if a rule for deactivating the card has been satisfied.

In one embodiment, determining at least one a card position, card, suit of cards, rank of cards, set of secondary cards, and/or rank of a set of secondary cards is associated with a designation of "safe" may comprise receiving an indication of the designation of "safe" for the at least one of a card position, card, suit of cards, rank of cards, set of secondary cards, and/or rank of a set of secondary cards. Such an indication may be received from, for example, a processor of a gaming device on which the secondary game is being played, another computing device, and/or a player.

For example, in one embodiment a player may select at least one of a card position, card, suit of cards, rank of cards, set of secondary cards, and/or rank of a set of secondary cards to be designated as "safe". A player may be allowed to provide a "safe" designation in exchange for or as a result of, for example, (i) a fee, (ii) making a particular decision during game play, (iii) performing or promising to perform an activity, and/or (iv) a bonus won. In one embodiment, a player may be allowed to provide one or more "safe" designations as part of the rules for playing the secondary game.

In one embodiment, whether or not a player may be allowed to designate one or more of a card position, card, suit of cards, rank of cards, set of secondary cards, and/or rank of a set of secondary cards as "safe" (or a number of "safe" designations that a player may be allowed to provide) may be based on an identity of a player.

In another example, at least one of a card position, card, suit of cards, rank of cards, set of secondary cards, and/or rank of a set of secondary cards may be designated as "safe" as a result of a number generated by a random number generator. For example, at the initiation of a play session or during a play session a predetermined number (e.g., one) one or more of a card position, card, suit of cards, rank of cards, set of secondary cards, and/or rank of a set of secondary cards may be designated as "safe" as a result of a number generated by a random number generator.

In yet another example, at least one of a card position, card, suit of cards, rank of cards, set of secondary cards, and/or rank of a set of secondary cards may be designated as "safe" based on at least one predetermined rules for making such designations. For example, at the initiation of a play session the card having the highest rank may always be designated as a "safe" card or the card in the first position of a set of secondary cards may be designated as a "safe" card.

In one embodiment, a designation of "safe" for at least one of a card position, card, suit of cards, rank of cards, set of secondary cards, and/or rank of a set of secondary cards may be applicable for a single game play of the primary card game. In another example, the designation may be applicable for a plurality or maximum number of game plays. In yet another embodiment, the designation may be applicable for a plurality or maximum number of "uses". For example, if a particular card is designated as a safe card, that designation may only prevent the card from being deactivated a maximum of three times when it otherwise would have been deactivated in accordance with a rule that had been satisfied. The fourth time that a rule is satisfied that causes deactivation of the card, the safe designation may be determined to no longer apply.

In one or more embodiments, a position of a primary hand may be associated with a "safe" designation, such that any card dealt or drawn to the position (or discarded from the position, depending on the rules of the game) may not be utilized to deactivate a card from a set of secondary cards, even if a rule for deactivating a card from the set of secondary cards is satisfied (e.g., a card matching a card of the set of secondary cards is dealt to the position). A designation of "safe" for a position of a primary hand may be caused by, for example, an input from a player, an input from a casino employee (e.g., a dealer) and/or a signal from a processor (e.g., a processor of the video poker device being played or another computing device such as a server computer).

In embodiments in which a player selects which position, if any, of a primary hand is to be designated as a safe position, a player may be provided with an opportunity (e.g., in exchange for a fee or as part of the rules of the game) to designate a predetermined number (e.g., one) of positions of a primary game as safe. A player may be provided with such an opportunity, for example, (i) as a result of an outcome of a game play of the primary game (e.g., if a particular symbol, set of symbols, or payout is obtained along a payline), (ii) as a result of a decision made during game play (e.g., if the player plays with perfect strategy), (iii) on a random basis, (iv) in response to one or more inputs from a player (e.g., the player requests to cash out), (v) in response to one or more events during the play session (e.g., cards from the one or more sets of secondary cards are being deactivated at a rate that is greater than a predetermined rate) and/or (vi) based on any other criteria deemed desirable.

A designation of a position of a primary hand as a safe position may be effective, for example, for a predetermined number of game plays (e.g., one) of a play session, for an entire duration of a play session, and/or until one or more predetermined events occurs. As an example of the latter, a position of a primary hand may be designated as a safe position until a card that would have otherwise caused deactivation of a card in a set of secondary cards is dealt, for the third time during a play session, into the position. A record of a database (e.g., stored in the memory of a gaming device or of another device such as a server device in communication with the gaming device) may be used to track which position(s) of a primary hand are currently designated as safe position(s) and/or whether the designations are still effective.

In embodiments in which a manufacturer, operator or processor selects which position, if any, of a primary hand is to be designated as a safe hand, such a determination may be based, for example, on a number of a random number generator or one or more predetermined rules.

In one or more embodiments, an expiration condition may be associated with one or more sets of secondary cards. A satisfaction of an expiration condition may cause, for example, a new set of secondary cards (in which all cards are again active) to replace the existing set of secondary cards for which the expiration condition has been satisfied. Examples of expiration conditions include, for example, an occurrence of a predetermined number of game plays of the primary game, an occurrence of a predetermined amount of time since an initiation of the play session, a credit meter balance being less than a predetermined amount (e.g. for a predetermined number of game plays), a rate of play falling below a minimum rate, an occurrence of one or more predetermined events associated with play of the primary card game and/or the secondary card game. In one embodiment, a set of secondary cards is replaced with a new set of secondary cards if the value of the current set of secondary cards is equal to zero before an end of the play session is determined. For example, if no payout is associated with the cards that remain active for a particular set of secondary cards, the set may be replaced with a new set of secondary cards in which all cards are active.

In one or more embodiments, if during game play a value of a set of secondary cards is determined to be zero (e.g., no payout is associated with the cards that remain active for the set of secondary cards), the player may be provided with a consolation prize. A consolation prize may be in tangible or intangible form. Further, a consolation prize may or may not have a value or direct or guaranteed benefit associated with it.

For example, in one embodiment, the consolation prize may comprise designating the cards remaining active in a set of secondary cards the value of which is zero as "wild" cards (e.g., for the next play session and/or for the next predetermined number (e.g., one) of game plays of the primary game in the current play session).

As another example, a multiplier value may be determined based on one or more cards from a set of secondary cards the value of which is zero. The card based on which the multiplier value is determined may be selected, for example, based on one or more predetermined rules, For example, the last card to be deactivated before the value of the secondary cards was zero may be selected as the card based on which the multiplier value is to be determined. In another example, the card having the highest value or rank in the set of secondary cards the value of which is zero may be selected as the card based on which the multiplier value is determined.

In one embodiment, a player may be allowed to select any of the cards comprising the set of secondary cards to use as the basis for a multiplier value. The player may be allowed to make such a selection, for example, at the initiation of a play session, when the value of a set of secondary cards reaches zero, and/or at any other time.

In yet another example, a card of the cards comprising the set of secondary cards to be used as a multiplier may be selected on a random basis.

In one embodiment, using a card as a multiplier may comprise using the rank of the card as a multiplier value (e.g., a "6 of spades" may be determined to have a multiplier value of six and a "King of hearts" may be determined to have a multiplier value of ten).

The multiplier value may be applied to, for example, a payout of one or more game plays of the primary game. For example, the multiplier value may be applied to the payout of the next game play of the primary card game (e.g., if no payout corresponds to the outcome of the next game play, the payout is considered to be zero and the multiplier is applied, thus not changing the result of the game play). In another example, the multiplier value may be applied to a payout of a game play selected by a player. Of course, one or more constraints may be placed on such a player selection (e.g., the multiplier cannot be applied to a payout above a predetermined amount). In another example, the multiplier value may be applied to the next payout of a primary hand having a predetermined rank (e.g., a flush). In yet another example, the multiplier value may be applied to the next payout that is above a predetermined amount and/or below a predetermined amount.

In one embodiment, concepts of the game described with reference to process 2200 (FIGS. 22A and 22B) may be incorporated with concepts of the game described with reference to the process described with respect to FIG. 20. For example, in one embodiment a game may include both (i) one or more sets of secondary cards initially comprising all active cards that correspond to a payout and that are deactivated based on game play of a primary card game, and (ii) one or more secondary poker hands that are populated based on game play of a primary card game and/or events associated with the one or more sets of secondary cards of (i). For example, any card that is deactivated in a set of secondary cards in step 2225 may be removed from the set of secondary cards and used to populate a secondary poker hand. In another example, any card discarded from a primary hand may be used to populate a secondary poker hand (as described with reference to FIG. 20) while any card dealt and/or drawn to a primary hand may be used to deactivate a matching card in a set of secondary cards (or vice versa). Many other combinations of concepts from the various embodiments described herein will be obvious to one of ordinary skill in the art upon reading the present disclosure.

It should be noted that although some embodiment described herein have been described with reference to a play session that encompasses a plurality of game plays of the primary card game, the concepts described herein are equally applicable to a play session that spans only a single game play of the primary card game. For example, in one embodiment a player may be dealt a primary hand for a primary card game and one or more sets of secondary cards for a secondary card game, each of the secondary cards being associated with a payout. If, based on the primary card game, any one card is deactivated in a set of secondary cards, the player does not qualify to receive the payout associated with the set of secondary cards (or, in another embodiment, a payout no longer corresponds to the set of secondary cards). In one embodiment in which a play session comprises a single game play of a primary game, a player may only qualify to receive a payout or bonus for a secondary set of cards if the player does not qualify for a payout as a result of the game play for the primary game (e.g., or does not qualify for a payout of at least a predetermined magnitude).

Figure 23A:
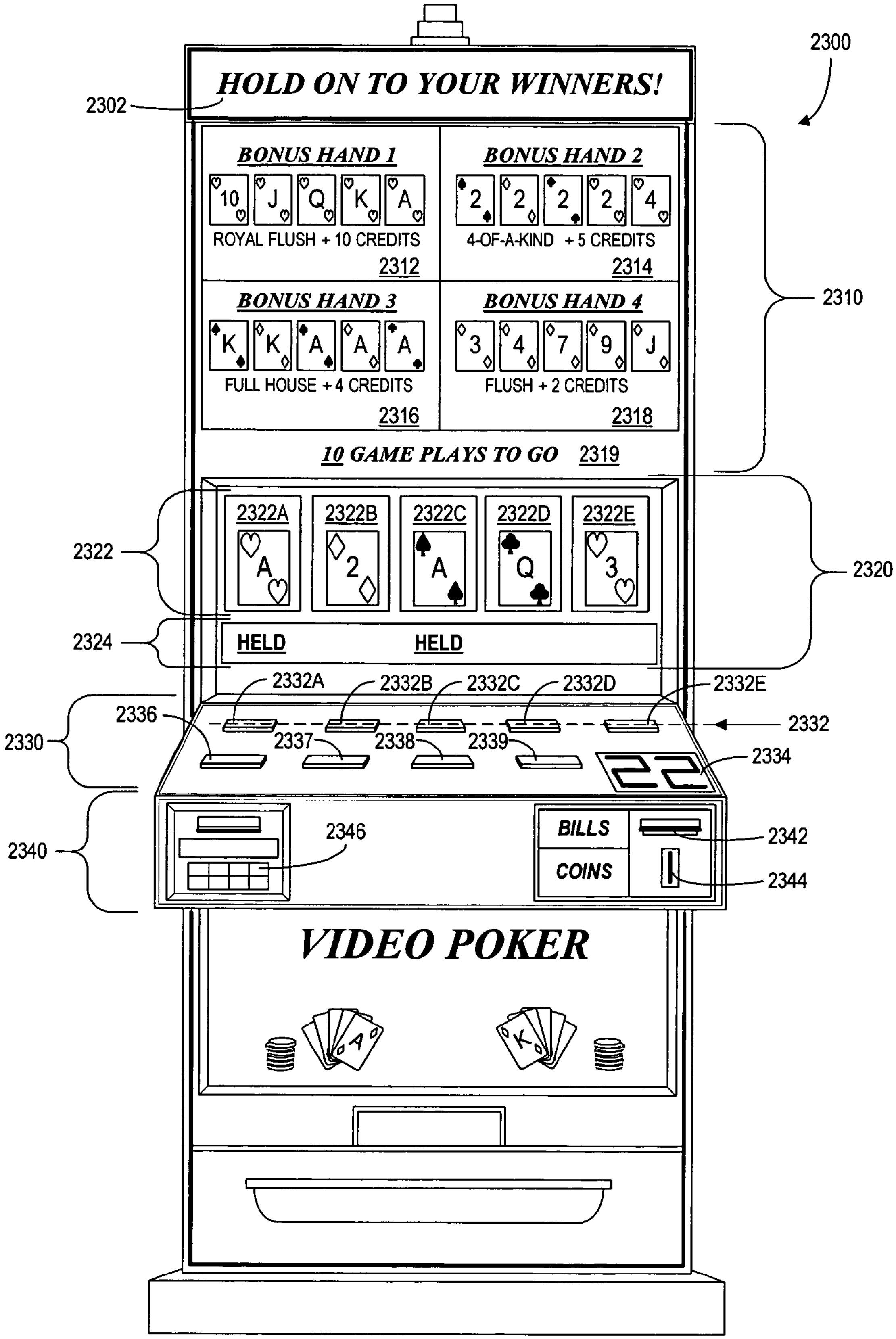
FIG. 23A is an example portion of an elevational view of a video poker device, depicting example information on video display areas of the video poker gaming device in accordance with an embodiment described herein.

Referring now to FIG. 23A, illustrated therein is a video poker gaming device 2300 in accordance with one or more embodiments described herein. Video poker gaming device 2300 comprises five main sections, 2302, 2310, 2320, 2330 and 2340. Section 2302 is a display area that displays an example title for a game in accordance with embodiments described herein.

Section 2310 comprises a display area for displaying information related to a secondary card game. In the embodiment of FIG. 23A, display area 2310 displays a plurality of sets of secondary cards. As can be seen, depicted in display area 2310 are four sets of secondary cards in the form of four bonus hands 2312, 2314, 2316 and 2318. Each of the four bonus hands 2312, 2314, 2316 and 2318 is a five card poker hand of a traditionally winning rank that is labeled underneath each respective bonus hand. Further, each of the four bonus hands 2312, 2314, 2316 and 2318 has an associated payout that is displayed underneath each respective bonus hand. For illustrative purposes, the bonus hands 2312, 2314, 2316 and 2318 are displayed at a time when each of the cards comprising each of the bonus hands are active (e.g., at the beginning or near the beginning of a play session).

Display area 2310 further indicates (in area 2319) to the player a duration of a play session remaining. In the embodiment of FIG. 23A, the duration of the play session is defined in terms of a number of game plays remaining in the play session (ten game plays are depicted as remaining). The number of game plays remaining may comprise, for example, the number of game plays of the primary game that are to be completed before a player may qualify to receive a payout, if any, corresponding to the bonus hands. Of course, as described herein, a play session may be defined in terms of a period of time or occurrences of one or more events besides (or in addition to) a number of game plays of the primary game. Thus, it should be understood that the display area 2319 may display different information, as appropriate, to inform the player of a remaining duration of a play session.

Section 2320 of video poker device 2300 displays information related to a primary card game. In the embodiment of FIG. 23A, display area 2320 is displaying the five cards of an initial hand of a poker game play (in subarea 2322), each of the five cards being displayed in a respective card position of positions 2322A, 2322B, 2322C, 2322D and 2322D. Display area 2322 also includes an indication of which of the cards of the initial hand the player has elected to hold (as depicted in subarea 2324).

Section 2330 includes a plurality of buttons that a player may manipulate in order to provide selections, signals or indications to video poker device 2300. For example, eac of the buttons 2332A, 2332B, 2332C, 2332D and 2332E correspond to a respective one of the card positions 2322A, 2322B, 2322C, 2322D and 2322E. The buttons 2332A through 2332E may each comprise a "hold" button that a player may actuate in order to indicate which cards of an initial hand are to be held. For example, if a player desires to hold a card currently being displayed in card position 2322A, the player may actuate button 2332A. In the embodiment illustrated in FIG. 23A, the player has elected to hold the card in position 2322A (the ace of hearts) and the card in position 2322C (the ace of spades). Thus, the card in position 2322B (the two of diamonds), the card in position 2322D (the queen of clubs) and the card in position 2322E (the three of hearts) are to be discarded based on the players selections.

Section 2330 includes other buttons that may be actuated by a player, buttons 2336, 2337, 2338, and 2339. Each of these buttons may comprise, for example, one of the following: (i) a deal button that a player may actuate to signal that a hand is to be dealt, (ii) a "bet 1" button that a player may actuate to indicate that a one credit is to be wagered on a game play, (iii) a "bet max" button that a player may acutate to indicate that the maximum allowable number of credits is to be wagered on a game play, and (iv) a "draw" button that a player may actuate to indicate that the player has finished selecting which cards are to be held and that replacement cards are to be output for the discarded cards. Section 2330 further includes a credit meter balance display 2334 that displays the number of credits currently available to a player for wagering. Of course, in other embodiments a video poker device may include touchscreen area instead of some or all of the buttons 2336-2339, which touchsreen areas the player may utilize to convey information to the gaming device in a manner similar to that described with respect to buttons 2336-2339.

Section 2340 of video poker device 2300 includes a variety of payment mechanisms that a player may utilize to provide payment for one or more game plays and/or other information. For example, a bill acceptor 2342 may be used to provide payment in the form of currency and/or cashless gaming receipts. Coin acceptor 2344 may be used to provide payment in the form of coins or tokens. Player tracking module 2346 may be utilized to provide a player identifier or other account identifier. Of course, other mechanisms for providing payment or other information may be included in video poker device 2300. For example, a smart card reader device, a credit or debit card reader device and/or a bar code reader device may be components of video poker device 2300.

Figure 23B:
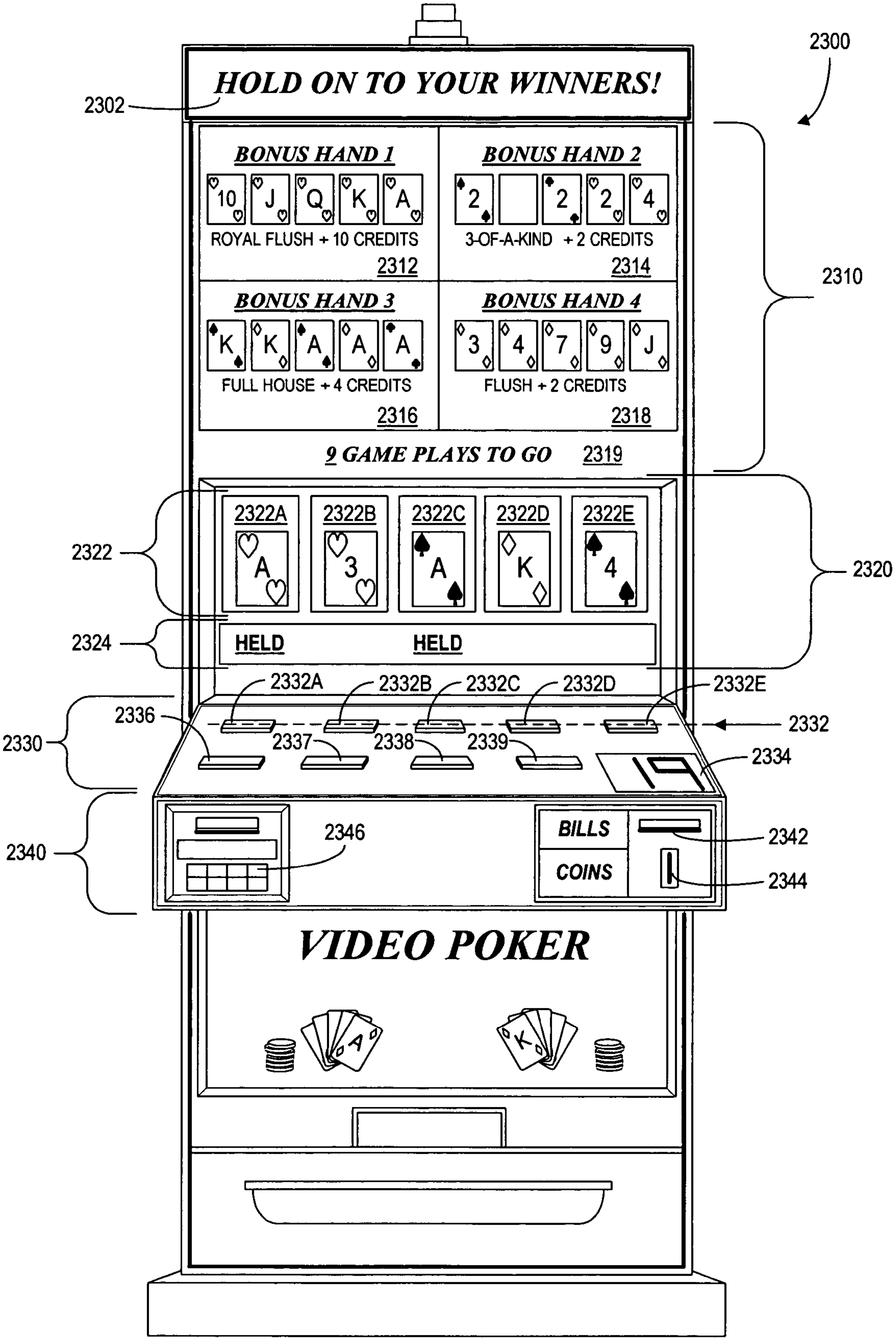
FIG. 23B depicts the example information of FIG. 23A as it may be changed based on a decision of a player during play of a primary game of video poker, in accordance with an embodiment described herein.

Referring now to FIG. 23B, depicted therein is video poker device 2300 upon execution of the players indication to discard the cards in positions 2322B, 2322C and 2322E. As can be seen, the cards in positions 2322B, 2322C and 2322E have been discarded and replacement cards have been drawn. As can also be seen, the discarding of the card from position 2322B (a two of diamonds) has caused the deactivation of the matching card in the second bonus hand displayed in display area 2314. Thus, in accordance with one embodiment, the two of diamonds card has been removed from the second bonus hand and the second bonus hand no longer corresponds to any payout. As can also be seen from the credit meter balance display 2334, three credits have been removed from the credit meter balance as a result of the player's wager for the game play. Further, the display area 2319 now shows that the remaining duration of the play session is nine game plays rather than ten game plays.

Figure 24:
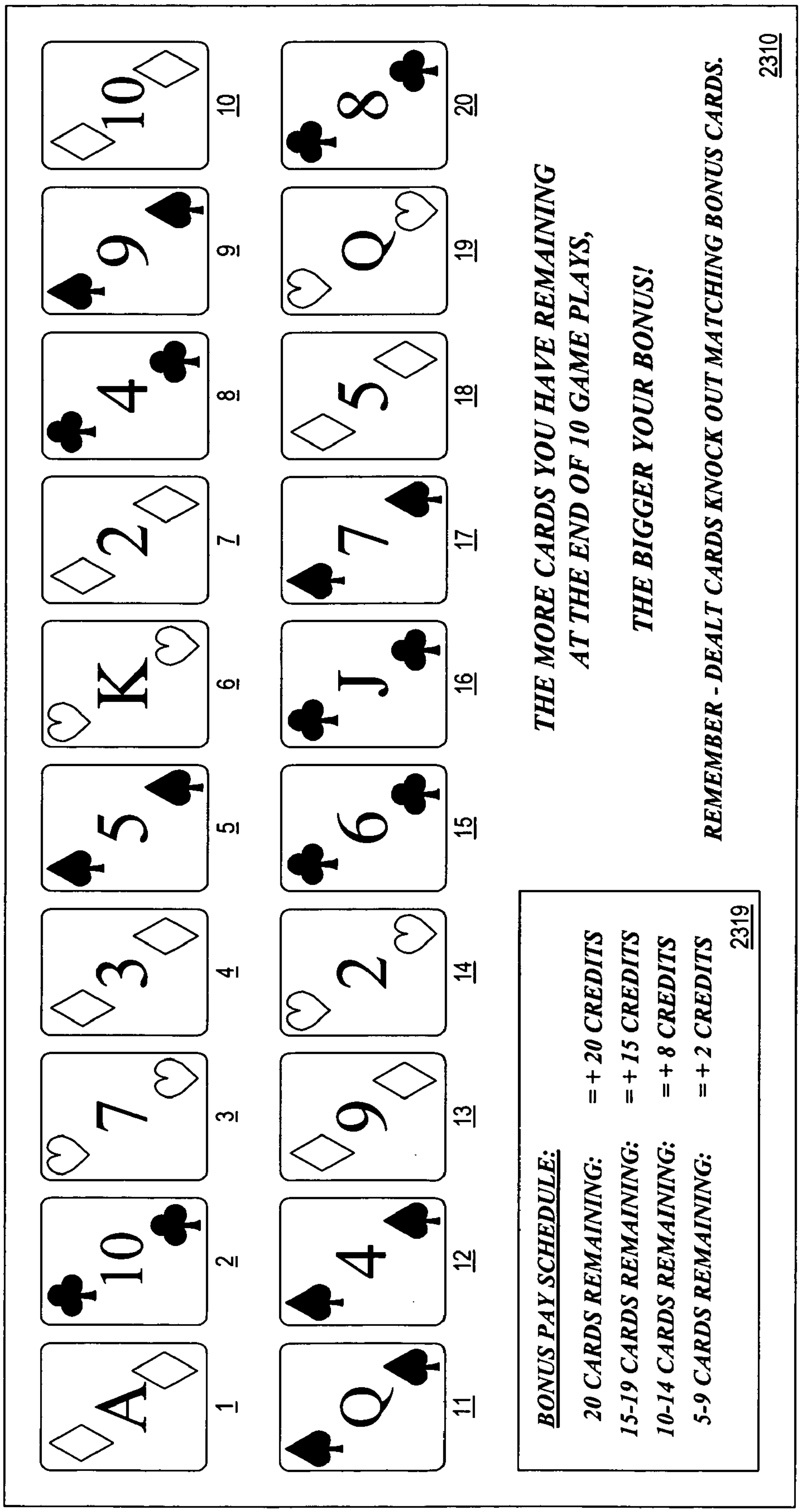
FIG. 24 depicts another example of information that may be displayed on a video display area of a video poker device, in accordance with an embodiment described herein.

Referring now to FIG. 24, illustrated therein is an example of information that may be displayed in display area 2310 in accordance with another embodiment described herein. As can be seen from FIG. 24, rather than displaying a plurality of winning poker hands (as had been displayed in display area 2310 of FIGS. 23A and 23B), in the embodiment of FIG. 24 a plurality (twenty in the example illustrated) of secondary cards are displayed without being grouped into any subsets of cards or hands of cards in particular. Also in accordance with an embodiment described herein, display area 2310 includes a sub-area 2319 that displays a bonus payout schedule. In accordance with the embodiment of FIG. 24, the bonus a player may qualify for at the end of a play session is based on the number of the twenty secondary cards initially dealt to the player that remain active at the end of the play session. In the example illustrated in FIG. 24, a player will qualify for a bonus of 20 credits if all of the twenty secondary cards initially dealt to the player remain active at the end of a play session. If 15-19 cards remain active at the end of the play session, the player will qualify for a fifteen credit bonus. If 10-14 cards remain active, the player will qualify for an eight credit bonus. If only 5-9 cards remain active, the player may qualify for only a two credit bonus. If less than five cards remain active at the end of the play session, the player will not qualify for any bonus. As also illustrated in the example message output to the player in display area 2310, the play session is defined by a duration of ten game plays. Further, as also illustrated via the example message, in accordance with the rules of the game any cards dealt in a primary card game cause deactivation of any matching cards in the set of secondary cards displayed in display area 2310.

It should be noted that the methods and systems described herein may be applied to any card game, such as poker, blackjack, pai gow, baccarat, let it ride, or bingo. It should further be noted that the methods and systems described herein may be applied to a video version of any of the aforementioned games (e.g., video poker, video blackjack).

Although the system and method disclosed herein has been described with respect to various specific embodiments, it is apparent that modifications, changes and enhancements can be made thereto without departing from the spirit and scope of the invention as defined by the appended claims.

For example, rather than outputting one or more sets of active secondary cards that are deactivated based on game play of a primary card game (e.g., wherein discarded cards, dealt cards and/or drawn cards cause deactivation of the active cards), a modification can be made such that the one or more sets of secondary cards initially output comprise inactive cards. In such a modification, game play of the primary card game may cause activation of the inactive cards comprising the one or more sets of secondary cards. For example, if a card is dealt in a primary card game that matches an inactive card in a set of secondary cards, it may cause activation of the matching card in the set of secondary cards. Thus, rather than causing a player to hope that a matching card will not be dealt in the primary card game (or tempting the player not to discard a matching card from the primary card game, depending on the rules of the game), this modification may instead cause a player to hope that a matching card is dealt (or tempt a player to discard a matching card in order to cause activation of the matching card).

In another example modification, concepts described herein may be applied to a reel slot machine game rather than a card game. For example, a plurality of reel symbols or reel symbol combinations may be provided as a secondary game and obtainment of a matching symbol or symbol combination during play of a primary game (e.g., along a payline) may cause deactivation of the symbol or set of symbols in the secondary game.

What is claimed is:

1. A method for playing a card game, comprising:

outputting at least one card comprising an initial hand of a primary card game;

outputting at least one plurality of cards comprising at least one initial set of secondary cards for a secondary card game, wherein each card of the primary card game is distinct from each card in the secondary card game, wherein the at least one plurality of cards is associated with at least one payout that is greater than zero, wherein each card of the at least one plurality of cards is active;

facilitating play of the primary card game for a duration of a play session, wherein play of the primary card game causes, in accordance with at least one rule, deactivation of at least one card included in the at least one initial set of secondary cards;

determining an end of the play session;

determining at least one final set of secondary cards, comprising determining the cards, if any, of the at least one initial set of secondary cards that remain active at the end of the play session;

determining at least one final payout for the secondary card game, comprising determining at least one payout associated with the at least one final set of secondary cards; and causing the at least one final payout to be provided.

2. The method of claim 1, wherein an active card comprises a card that is taken into account in determining whether a set of cards in which the card is included corresponds to a payout, wherein deactivation of a card comprises causing the card to become an inactive card, and further wherein an inactive card comprises a card that is not taken into account in determining whether a set of cards in which the card is included corresponds to a payout.

3. The method of claim 1, wherein deactivation of at least one card included in the at least one initial set of secondary cards comprises removal of the at least one card from the at least one initial set of secondary cards.

4. The method of claim 1, wherein deactivation of at least one card included in the at least one initial set of secondary cards comprises altering an appearance of the at least one card.

5. The method of claim 1, wherein the play session lasts a plurality of game plays of the primary card game.

6. The method of claim 1, wherein the play session lasts for a single game play of the primary card game.

7. The method of claim 1, wherein at least one of the at least one rule specifies that a card of the at least one initial set of secondary cards is to be deactivated if a matching card is dealt in a game play of the primary game.

8. The method of claim 1, wherein at least one of the at least one rule specifies that a card of the at least one initial set of secondary cards is to be deactivated if a matching card is discarded in a game play of the primary game.

9. The method of claim 1, wherein at least one of the at least one rule specifies that a card of the at least one initial set of secondary cards is to be deactivated if a matching card is drawn in a game play of the primary game.

10. The method of claim 9, wherein a matching card comprises one or more of:

a card having a suit that is a suit of a card in the at least one initial set of secondary cards;

a card having a rank that is a rank of a card in the at least one initial set of secondary cards;

a card having a symbol that is a symbol of a card in the at least one initial set of secondary cards;

a card having a value that is a value of a card in the at least one initial set of secondary cards; and a card dealt to a location that corresponds to a location of a card in the at least one initial set of secondary cards.

11. The method of claim 1, wherein determining an end of the play session comprises determining that at least one condition for terminating the play session has been satisfied.

12. The method of claim 11, wherein a matching card comprises one or more of:

a card having a suit that is a suit of a card in the at least one initial set of secondary cards;

a card having a rank that is a rank of a card in the at least one initial set of secondary cards;

a card having a symbol that is a symbol of a card in the at least one initial set of secondary cards;

a card having a value that is a value of a card in the at least one initial set of secondary cards; and a card dealt to a location that corresponds to a location of a card in the at least one initial set of secondary cards.

13. The method of claim 1, further comprising:

displaying, in association with the at least one initial set of secondary cards, the at least one payout associated with the at least one initial set of secondary cards.

14. The method of claim 1, wherein the at least one payout associated with the at least one initial set of secondary cards is not available for provision until the end of the play session, and further wherein the at least one payout associated with the at least one initial set of secondary cards is only available for provision at the end of the play session if all of the cards comprising the at least one initial set of secondary cards are active at the end of the play session, such that the at least one initial set of secondary cards is the at least one final set of secondary cards.

15. The method of claim 14, wherein a matching card comprises one or more of:

a card having a suit that is a suit of a card in the at least one initial set of secondary cards;

a card having a rank that is a rank of a card in the at least one initial set of secondary cards;

a card having a symbol that is a symbol of a card in the at least one initial set of secondary cards;

a card having a value that is a value of a card in the at least one initial set of secondary cards; and a card dealt to a location that corresponds to a location of a card in the at least one initial set of secondary cards.

16. The method of claim 1, further comprising:

determining, before the end of the play session, that at least one card of the at least one initial set of secondary cards has been deactivated in accordance with the at least one rule; and determining at least one intermediate set of secondary cards, comprising determining the cards of the at least one initial set of secondary cards that remain active upon the deactivation of the at least one card of the at least one initial set of secondary cards.

17. The method of claim 16, further comprising:

determining at least one payout associated with the at least one intermediate set of secondary cards; and displaying, in association with the at least one intermediate set of secondary cards, the at least one payout associated with the at least one intermediate set of secondary cards.

18. The method of claim 16, further comprising:

determining that a payout is not associated with the at least one intermediate set of secondary cards; and terminating, in response to the determination that a payout is not associated with the at least one intermediate set of secondary cards, the game play.

19. The method of claim 1, wherein the at least one initial set of secondary cards comprises a first initial set of secondary cards associated with a first payout and a second initial set of secondary cards associated with a second payout.

20. The method of claim 1, wherein the cards comprising the at least one initial set of secondary cards are determined via a random number generator upon an initiation of the play session.

21. The method of claim 1, wherein the cards comprising the at least one initial set of secondary cards are predetermined before an initiation of the play session.

22. The method of claim 1, wherein the at least one initial set of secondary cards comprises a hand having, in accordance with a payout schedule, a value greater than zero.

23. The method of claim 1, further comprising:

providing at least one game indicia that may be applied to a deactivated card in order to reactivate the deactivated card.

24. The method of claim 1, wherein the at least one rule in accordance with which deactivation of at least one card is caused is a rule based on an identity of a player associated with the play session.

25. The method of claim 1, wherein at least one card of the initial set of secondary cards corresponds to a card position, and further comprising:

determining that the card position is a position designated as a safe position, such that a card located in the safe position cannot be deactivated even if the at least one rule is satisfied.

26. The method of claim 1, wherein at least one card of the initial set of secondary cards corresponds to a particular suit, and further comprising:

determining that the particular suit is a suit designated as a safe suit, such that a card having the safe suit cannot be deactivated even if the at least one rule is satisfied.

27. The method of claim 1, wherein at least one card of the initial set of secondary cards corresponds to a particular rank, and further comprising:

determining that the particular rank is a rank designated as a safe rank, such that a card having the safe rank cannot be deactivated even if the at least one rule is satisfied.

28. The method of claim 1, wherein at least one card of the at least one card comprising the initial hand corresponds to a card position, and further comprising:

determining that the card position is a position designated as a safe position, such that a card dealt to the card position is not available for use in causing deactivation of a card in the initial set of secondary cards.

29. The method of claim 1, further comprising:

reactivating a card of the initial set of secondary cards that was previously deactivated.

30. The method of claim 1, wherein determining at least one payout associated with the at least one final set of secondary cards comprises:

determining whether the final set of secondary cards is a winning poker hand according to predetermined pay schedule for winning poker hands.

31. An apparatus comprising:

a processor; and a gaming device in communication with the processor, the storage device being capable of facilitating a wagering game and further configured to perform a method comprising:

outputting at least one card comprising an initial hand of a primary card game;

outputting at least one plurality of cards comprising at least one initial set of secondary cards for a secondary card game, wherein each card of the primary card game is distinct from each card in the secondary card game, wherein the at least one plurality of cards is associated with at least one payout that is greater than zero, wherein each card of the at least one plurality of cards is active;

facilitating play of the primary card game for a duration of a play session, wherein play of the primary card game causes, in accordance with at least one rule, deactivation of at least one card included in the at least one initial set of secondary cards;

determining an end of the play session;

determining at least one final set of secondary cards, comprising determining the cards, if any, of the at least one initial set of secondary cards that remain active at the end of the play session;

determining at least one final payout for the secondary card game, comprising determining at least one payout associated with the at least one final set of secondary cards; and causing the at least one final payout to be provided.

32. A computer readable medium comprising:

instructions capable of instructing a processor to perform a method comprising:

outputting at least one card comprising an initial hand of a primary card game;

outputting at least one plurality of cards comprising at least one initial set of secondary cards for a secondary card game, wherein each card of the primary card game is distinct from each card in the secondary card game, wherein the at least one plurality of cards is associated with at least one payout that is greater than zero, wherein each card of the at least one plurality of cards is active;

facilitating play of the primary card game for a duration of a play session, wherein play of the primary card game causes, in accordance with at least one rule, deactivation of at least one card included in the at least one initial set of secondary cards;

determining an end of the play session;

determining at least one final set of secondary cards, comprising determining the cards, if any, of the at least one initial set of secondary cards that remain active at the end of the play session;

determining at least one final payout for the secondary card game, comprising determining at least one payout associated with the at least one final set of secondary cards; and causing the at least one final payout to be provided.

* * * * *